US012739508B2

(12) United States Patent
Zhao et al.

(10) Patent No.: US 12,739,508 B2
(45) Date of Patent: Sep. 15, 2026

(54) DRIVING DEVICE AND ASSEMBLING METHOD THEREFOR, AND CAMERA MODULE

(71) Applicant: NINGBO SUNNY OPOTECH CO., LTD., Yuyao City (CN)

(72) Inventors: Bojie Zhao, Yuyao City (CN); Lifeng Yao, Yuyao City (CN)

(73) Assignee: NINGBO SUNNY OPOTECH CO., LTD., Yuyao City (CN)

( * ) Notice: Subject to any disclaimer, the term of this patent is extended or adjusted under 35 U.S.C. 154(b) by 73 days.

(21) Appl. No.: 18/838,410

(22) PCT Filed: Feb. 17, 2023

(86) PCT No.: PCT/CN2023/076816

§ 371 (c)(1),
(2) Date: Aug. 14, 2024

(87) PCT Pub. No.: WO2023/155889

PCT Pub. Date: Aug. 24, 2023

(65) Prior Publication Data

US 2025/0240527 A1 Jul. 24, 2025

(30) Foreign Application Priority Data

Feb. 18, 2022 (CN) ......................... 202210152616.5
Feb. 18, 2022 (CN) ......................... 202210152632.4

(51) Int. Cl.
*H04N 23/68* (2023.01)
*G02B 7/02* (2021.01)
*G02B 27/64* (2006.01)

(52) U.S. Cl.
CPC .......... *H04N 23/687* (2023.01); *G02B 7/026* (2013.01); *G02B 27/646* (2013.01)

(58) Field of Classification Search
CPC ..... H04N 23/687; G02B 7/026; G02B 27/646
(Continued)

(56) References Cited

U.S. PATENT DOCUMENTS

2005/0185530 A1 8/2005 Akanuma
2016/0097937 A1 4/2016 Lam
(Continued)

FOREIGN PATENT DOCUMENTS

CN 104635401 A 5/2015
CN 105204268 A 12/2015
(Continued)

OTHER PUBLICATIONS

International Search Report (PCT/ISA/210), issued in PCT/CN2023/076816, dated May 24, 2023.
(Continued)

*Primary Examiner* — Joel W Fosselman
(74) *Attorney, Agent, or Firm* — Birch, Stewart, Kolasch & Birch, LLP

(57) ABSTRACT

Disclosed are a driving device and an assembling method therefor, and a camera module. The driving device comprises a fixed portion having an accommodating cavity, an elastic member disposed in the accommodating cavity, a movable portion movably suspended in the accommodating cavity through the elastic member, and a driving portion for driving the movable portion to move relative to the fixed portion. In the driving device, respective portions of the elastic member thereof are arranged in a specific manner to avoid unexpected movement of a driven object in the process of driving the acted object to move, so as to reduce the tilt tolerance of the driving device and improve the accuracy of assembling the camera module. At least one first coil comprises a first sub-coil, a second sub-coil, a third sub-coil, and a fourth sub-coil, wherein an extending direc-
(Continued)

tion of a first lower rail is consistent with an extending direction of the first sub-coil, an extending direction of a second lower rail is consistent with an extending direction of the second sub-coil, an extending direction of a third lower rail is consistent with an extending direction of the third sub-coil, and an extending direction of a fourth lower rail is consistent with an extending direction of the fourth sub-coil.

16 Claims, 24 Drawing Sheets

(58) Field of Classification Search
USPC .......................................................... 396/55
See application file for complete search history.

(56) References Cited

U.S. PATENT DOCUMENTS

| | | | |
|---|---|---|---|
| 2016/0161757 | A1 | 6/2016 | Hee et al. |
| 2018/0338069 | A1 | 11/2018 | Hu et al. |
| 2020/0209439 | A1 | 7/2020 | Hu et al. |
| 2020/0228711 | A1 | 7/2020 | Awazu et al. |
| 2021/0072493 | A1 | 3/2021 | Zhu et al. |

FOREIGN PATENT DOCUMENTS

| | | | |
|---|---|---|---|
| CN | 208795986 | U | 4/2019 |
| CN | 110312059 | A | 10/2019 |
| CN | 111381343 | * | 7/2020 |
| CN | 113489888 | A | 10/2021 |
| CN | 113890978 | A | 1/2022 |
| CN | 115113358 | A | 9/2022 |
| CN | 116668810 | A | 8/2023 |
| CN | 118648296 | A | 9/2024 |
| KR | 10-2016-0010201 | A | 1/2016 |
| TW | 201109714 | A1 | 3/2011 |

OTHER PUBLICATIONS

Extended European Search Report for European Application No. 23755890.3, dated Mar. 24, 2025.
Chinese Office Action for Chinese Application No. 202210152632.4, dated Jul. 27, 2026

* cited by examiner

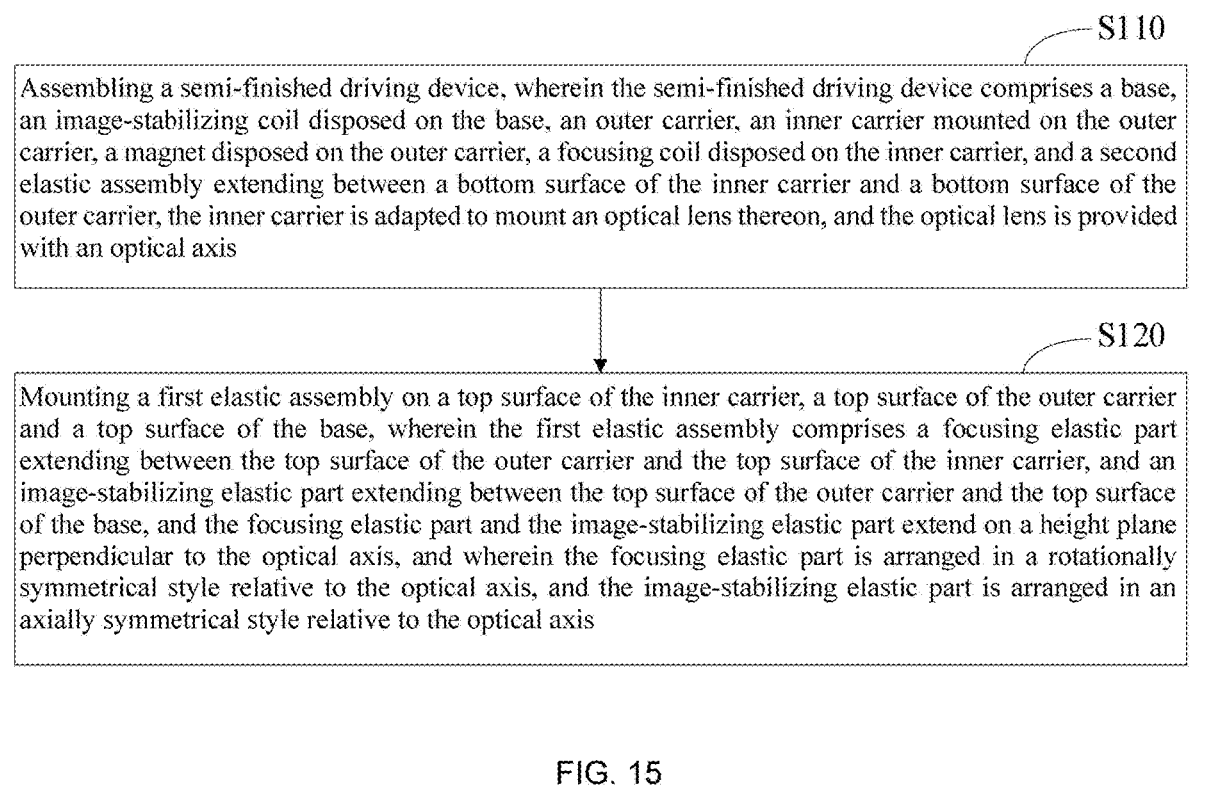

S110

Assembling a semi-finished driving device, wherein the semi-finished driving device comprises a base, an image-stabilizing coil disposed on the base, an outer carrier, an inner carrier mounted on the outer carrier, a magnet disposed on the outer carrier, a focusing coil disposed on the inner carrier, and a second elastic assembly extending between a bottom surface of the inner carrier and a bottom surface of the outer carrier, the inner carrier is adapted to mount an optical lens thereon, and the optical lens is provided with an optical axis

S120

Mounting a first elastic assembly on a top surface of the inner carrier, a top surface of the outer carrier and a top surface of the base, wherein the first elastic assembly comprises a focusing elastic part extending between the top surface of the outer carrier and the top surface of the inner carrier, and an image-stabilizing elastic part extending between the top surface of the outer carrier and the top surface of the base, and the focusing elastic part and the image-stabilizing elastic part extend on a height plane perpendicular to the optical axis, and wherein the focusing elastic part is arranged in a rotationally symmetrical style relative to the optical axis, and the image-stabilizing elastic part is arranged in an axially symmetrical style relative to the optical axis

FIG. 15

DRIVING DEVICE AND ASSEMBLING METHOD THEREFOR, AND CAMERA MODULE

CROSS REFERENCE TO RELATED APPLICATIONS

This application is the National Phase of PCT International Application No. PCT/CN2023/076816, filed on Feb. 17, 2023, which claims priority under 35 U.S.C. 119(a) to patents application Nos. 202210152616.5 and 202210152632.4, both filed in China on Feb. 18, 2022, all of which are hereby expressly incorporated by reference into the present application.

TECHNICAL FIELD

The present application relates to the field of camera modules, and in particular to a driving device and an assembly method therefor, and a camera module.

BACKGROUND

With the popularity of mobile electronic devices, the related technologies of camera modules for helping users obtain images (e.g., videos or pictures) used in the mobile electronic devices have been developed and advanced rapidly, and in recent years, the camera modules have been widely applied in many fields such as medical treatment, security and industrial production.

With the changes and development of market demand, consumers have more and more diverse requirements for camera modules. For example, camera modules are required to have image-stabilizing and focusing functions to improve imaging quality. The optical focusing (AF) function (or the function of Auto Focus) refers to a function of, by linearly moving a bracket or photosensitive chip provided with a lens element in the direction of an optical axis, forming a clear image at an image sensor (CMOS, CCD, etc.) located at the rear of the lens element. The optical image-stabilizing (OIS: Optical Image Stabilization) function refers to a function of, by adaptively moving a bracket or photosensitive chip provided with a lens element in a direction of compensating for shake when the lens element shakes due to the shake, improving the clarity or definition of images. A motor is an indispensable element of a high-definition camera module. During the operation of the camera module, the motor can drive the lens to move to achieve optical focusing and optical image-stabilizing functions during capture.

In order to meet the increasingly broad market demand, the size and weight of optical components (such as photosensitive chips and optical lenses) configured in camera modules of terminal devices are getting larger and larger, and the requirements for the driving force of the motor are also getting higher and higher.

Specifically, as terminal devices develop towards miniaturization and thinness, current terminal devices (e.g., mobile phones) have great restrictions on the volume of camera modules. However, in order to meet the driving force for optical components, the volume occupied by the motor needs to increase as the volume and weight of the optical components it drives increase. As the volume of the camera modules is limited by the miniaturization of terminal devices and the optical components develop towards larger volumes and heavier weights, it is difficult for the driving force that existing motors can provide to increase correspondingly.

Moreover, in order to achieve better optical focusing and optical image-stabilizing functions, it is necessary to drive the optical components over a long stroke (stroke: distance of run). However, without increasing the volume of the motor, it is difficult to increase the driving force of the existing motors. Under the premise of limited driving force, the heavier the optical components, the shorter the stroke the motor can drive the optical components to move, which will affect the focusing and image-stabilizing capabilities.

In addition, the heavier the optical components, the slower the speed at which the motor drives the optical components, and the longer it takes for the optical components to reach a predetermined position, which will also affect the focusing and image-stabilizing functions. In order to meet the driving speed of the motor for the optical components, the structure of the motor needs to be changed, which will lead to a complex motor structure, an increase in the number of parts, and an increase in the thickness of the device body.

SUMMARY

One advantage of the present application is that a driving device and an assembly method therefor, and a camera module are provided, wherein in the driving device of the camera module, respective portions of the elastic member thereof are arranged in a specific manner to avoid unexpected movement of a driven object in the process of driving the acted object to move, so as to reduce the tilt tolerance of the driving device and improve the accuracy of assembling the camera module.

Another advantage of the present application is that a driving device and an assembly method therefor, and a camera module are provided, wherein in the driving device, a focusing elastic part of an elastic member is arranged in a rotationally symmetrical manner relative to an optical axis set by an optical lens, and in the process of driving the acted object to move along a Z-axis direction to perform optical focusing, the focusing elastic part can suppress the acted object from producing translational movement along an X-axis direction and a Y-axis direction, and can also suppress the acted object from producing rotational movement along the Z-axis direction. In this way, the flatness of the elastic member is improved, so as to reduce the tilt tolerance of the driving device and improve the accuracy of assembling the camera module.

Still another advantage of the present application is that a driving device and an assembly method therefor, and a camera module are provided, wherein in the driving device, the image-stabilizing elastic part of the elastic member is arranged in an axially symmetrical manner relative to the X-axis and the Y-axis, and in the process of driving the acted object to move along the X-axis direction and the Y-axis direction in a plane perpendicular to the optical axis, the image-stabilizing elastic part can suppress an outer carrier from producing a rotational movement around the Z-axis direction. In this way, the flatness of the elastic member is improved, so as to reduce the tilt tolerance of the driving device and improve the accuracy of assembling the camera module.

Still another advantage of the present application is that a driving device and an assembly method therefor, and a camera module are provided, wherein the driving device can be assembled sequentially along the direction of an optical axis during the assembly process, which can not only make the assembly manner of the driving device simpler and save costs, but also reduce the assembly tolerance of the driving device during the assembly process and improve the accuracy of assembling the driving device.

One advantage of the present application is that a driving device and a camera module are provided, wherein the driving device can provide a larger placement space for the driving components of its driving portion, so that the volume of the driving components of the driving portion can be increased so as to increase the driving force that the driving portion can provide.

Another advantage of the present application is that a driving device and a camera module are provided, wherein the driving device mainly increases the placement space of the driving components by reasonably arranging the driving components (for example, coils) of the driving portion and the guide support structure, and can increase the driving force of the driving portion without adding components, so as to simplify the design scheme for increasing the driving force of the driving portion and avoid complicating the structure of the driving portion.

Still another advantage of the present application is that a driving device and a camera module are provided, wherein the reasonable arrangement of the driving components of the driving portion and the guide support structure can not only increase the driving force of the driving portion, but also avoid mutual interference between the components of the guide support structure and other components.

Still another advantage of the present application is that a driving device and a camera module are provided, wherein in the driving device, respective portions of the elastic member thereof are arranged in a specific manner to avoid unexpected movement of a driven object in the process of driving the acted object to move, so as to reduce the tilt tolerance of the driving device and improve the accuracy of assembling the camera module.

Other advantages and features of the present application will become apparent from the following description, and may be achieved by the means and combinations particularly pointed out in the claims.

To achieve at least one of the above advantages, according to one aspect of the present application, the present application provides a driving device, comprising:

a fixed portion having an accommodating cavity;

an elastic member disposed in the accommodating cavity;

a movable portion movably suspended in the accommodating cavity through the elastic member, wherein the movable portion is adapted to mount an optical lens therein, and the optical lens is provided with an optical axis; and a driving portion for driving the movable portion to move relative to the fixed portion;

wherein the elastic member comprises a first elastic assembly extending between the fixed portion and the movable portion, the first elastic assembly comprises a focusing elastic part and an image-stabilizing elastic part, and the focusing elastic part and the image-stabilizing elastic part extend in a plane perpendicular to the optical axis; and wherein the focusing elastic part is arranged in a rotationally symmetrical manner relative to the optical axis, and the image-stabilizing elastic part is arranged in an axially symmetrical manner relative to the optical axis.

In the driving device according to an embodiment of the present application, the movable portion comprises an outer carrier and an inner carrier movably mounted to the outer carrier, and the inner carrier is adapted to mount the optical lens therein.

In the driving device according to an embodiment of the present application, the focusing elastic part extends between the inner carrier and the outer carrier, and the image-stabilizing elastic part extends between the outer carrier and the fixed portion; and wherein the driving portion is adapted to drive the inner carrier to move relative to the outer carrier along a direction set by the optical axis to perform optical focusing, and the driving portion is adapted to drive the outer carrier to take along the inner carrier carrying the optical lens to move in a plane perpendicular to the optical axis to perform optical image-stabilizing.

In the driving device according to an embodiment of the present application, the focusing elastic part extends between the outer carrier and the fixed portion, and the image-stabilizing elastic part extends between the inner carrier and the outer carrier; and wherein the driving portion is adapted to drive the inner carrier to move relative to the outer carrier in a plane perpendicular to the optical axis to perform optical image-stabilizing, and the driving portion is adapted to drive the outer carrier to take along the inner carrier carrying the optical lens to move along a direction set by the optical axis to perform optical focusing.

In the driving device according to an embodiment of the present application, the first elastic assembly further comprises an elastic connecting portion connecting the focusing elastic part and the image-stabilizing elastic part.

In the driving device according to an embodiment of the present application, the fixed portion comprises an upper cover and a base which are engaged with each other to form the accommodating cavity, and wherein the image-stabilizing elastic part extends between the outer carrier and the base.

In the driving device according to an embodiment of the present application, at least a part of the focusing elastic part and the image-stabilizing elastic part are connected to each other.

In the driving device according to an embodiment of the present application, the focusing elastic part comprises a first focusing elastic unit and a second focusing elastic unit, and the first focusing elastic unit and the second focusing elastic unit are rotationally symmetric with respect to the optical axis; and wherein the first focusing elastic unit comprises a first focusing elastic inner contour portion fixed to the inner carrier, a first focusing elastic outer contour portion fixed to the outer carrier, and a first focusing elastic deformation portion extending between the first focusing elastic inner contour portion and the first focusing elastic outer contour portion, and the second focusing elastic unit comprises a second focusing elastic inner contour portion fixed to the inner carrier, a second focusing elastic outer contour portion fixed to the outer carrier, and a second focusing elastic deformation portion extending between the second focusing elastic inner contour portion and the second focusing elastic outer contour portion.

In the driving device according to an embodiment of the present application, the first focusing elastic deformation portion and/or the second focusing elastic deformation portion comprises a plurality of bending sections extending along an X-axis direction set by an X-axis or a Y-axis direction set by a Y-axis.

In the driving device according to an embodiment of the present application, the image-stabilizing elastic part comprises a first image-stabilizing elastic unit and a fourth image-stabilizing elastic unit which are symmetrically distributed with respect to the X-axis, and a second image-stabilizing elastic unit and a third image-stabilizing elastic unit which are symmetrically distributed with respect to the X-axis; and wherein the first image-stabilizing elastic unit and the second image-stabilizing elastic unit are symmetrically distributed with respect to the Y-axis, the third image-stabilizing elastic unit and the fourth image-stabilizing elastic unit are symmetrically distributed with respect to the Y-axis, the first image-stabilizing elastic unit is connected to the first focusing elastic unit, and the third image-stabilizing elastic unit is connected to the second focusing elastic unit.

In the driving device according to an embodiment of the present application, the first image-stabilizing elastic unit, the second image-stabilizing elastic unit, the third image-stabilizing elastic unit and the fourth image-stabilizing elastic unit are located at four corners of the driving device.

In the driving device according to an embodiment of the present application, the first image-stabilizing elastic unit comprises a first image-stabilizing elastic inner contour portion fixed to the outer carrier, a first image-stabilizing elastic outer contour portion fixed to the base, and a first image-stabilizing elastic deformation portion integrally connecting the first image-stabilizing elastic inner contour portion and the first image-stabilizing elastic outer contour portion; the second image-stabilizing elastic unit comprises a second image-stabilizing elastic inner contour portion fixed to the outer carrier, a second image-stabilizing elastic outer contour portion fixed to the base, and a second image-stabilizing elastic deformation portion integrally connecting the second image-stabilizing elastic inner contour portion and the second image-stabilizing elastic outer contour portion; the third image-stabilizing elastic unit comprises a third image-stabilizing elastic inner contour portion fixed to the outer carrier, a third image-stabilizing elastic outer contour portion fixed to the base, and a third image-stabilizing elastic deformation portion integrally connecting the third image-stabilizing elastic inner contour portion and the third image-stabilizing elastic outer contour portion; and the fourth image-stabilizing elastic unit comprises a fourth image-stabilizing elastic inner contour portion fixed to the outer carrier, a fourth image-stabilizing elastic outer contour portion fixed to the base, and a fourth image-stabilizing elastic deformation portion integrally connecting the fourth image-stabilizing elastic inner contour portion and the fourth image-stabilizing elastic outer contour portion.

In the driving device according to an embodiment of the present application, the elastic member further comprises a second elastic assembly extending between the inner carrier and the outer carrier, and the first elastic assembly and the second elastic assembly are oppositely disposed on two opposite sides of the movable portion.

In the driving device according to an embodiment of the present application, the second elastic assembly comprises a second elastic inner contour portion fixed to the inner carrier, a second elastic outer contour portion fixed to the outer carrier, and a second elastic deformation portion extending between the second elastic inner contour portion and the second elastic outer contour portion.

In the driving device according to an embodiment of the present application, the driving portion comprises a magnet disposed on the outer carrier, a focusing coil disposed on the inner carrier and corresponding to the magnet, and an image-stabilizing coil disposed on the fixed portion and corresponding to the magnet.

In the driving device according to an embodiment of the present application, the magnet and the focusing coil correspond to each other in a first direction, and the magnet and the image-stabilizing coil correspond to each other in a second direction, wherein the first direction is perpendicular to the second direction.

In the driving device according to an embodiment of the present application, the driving device further comprises a guide support mechanism disposed between the fixed portion and the movable portion.

According to one aspect of the present application, the present application provides a driving device, comprising:

a fixed portion having an accommodating cavity;

an elastic member disposed in the accommodating cavity;

a movable portion movably suspended in the accommodating cavity through the elastic member, wherein the movable portion is adapted to mount an optical lens therein, and the optical lens is provided with an optical axis; and a driving portion for driving the movable portion to move relative to the fixed portion;

a guide support structure formed between the movable portion and the fixed portion;

wherein the driving portion comprises at least one magnet disposed on the movable portion and at least one first coil disposed on the fixed portion and corresponding to the at least one magnet, and wherein the at least one first coil extends on the fixed portion along a direction set by a side of the fixed portion, and an extending direction of the guide support structure on the fixed portion is consistent with an extending direction of the at least one first coil.

In the driving device according to an embodiment of the present application, the at least one first coil is located on a side of the fixed portion.

In the driving device according to an embodiment of the present application, the fixed portion comprises an upper cover and a base which are engaged with each other to form the accommodating cavity, the movable portion comprises an outer carrier and an inner carrier which is movably mounted to the outer carrier, and the inner carrier is adapted to mount the optical lens therein, wherein the at least one first coil is disposed on the base, and the at least one magnet is disposed on the outer carrier, and wherein the at least one first coil and the at least one magnet of the driving portion are adapted to drive the outer carrier to take along the inner carrier carrying the optical lens to move in a plane perpendicular to the optical axis to perform optical image-stabilizing.

In the driving device according to an embodiment of the present application, the driving portion further comprises a second coil disposed on the inner carrier and corresponding to the magnet, and the at least one magnet and the second coil of the driving portion are adapted to drive the inner carrier to move relative to the outer carrier along a direction set by the optical axis to perform optical focusing.

In the driving device according to an embodiment of the present application, the base has a first side, a second side, a third side and a fourth side that are mutually enclosed to form a rectangle, the first side and the third side extend along an X-axis direction set by an X-axis, and the second side and the fourth side extend along a Y-axis direction set by a Y-axis; and wherein the at least one first coil comprises four first coils, and the four first coils are located on the first side, the second side, the third side and the fourth side, respectively, and extend along the first side, the second side, the third side and the fourth side, respectively.

In the driving device according to an embodiment of the present application, the guide support structure comprises a first guide support unit, a second guide support unit, a third guide support unit and a fourth guide support unit; wherein the first guide support unit comprises a first lower rail recessedly formed on the first side of the base, a first upper rail recessedly formed on the outer carrier and corresponding to the first lower rail, and at least one first ball erected between the first upper rail and the first lower rail; and the second guide support unit comprises a second lower rail recessedly formed on the second side of the base, a second upper rail recessedly formed on the outer carrier and corresponding to the second lower rail, and at least one second ball erected between the second upper rail and the second lower rail; the third guide support unit comprises a third lower rail recessedly formed on the third side of the base, a third upper rail recessedly formed on the outer carrier and corresponding to the third lower rail, and at least one third ball erected between the third upper rail and the third lower rail; the fourth guide support unit comprises a fourth lower rail recessedly formed on the fourth side of the base, a fourth upper rail recessedly formed on the outer carrier and corresponding to the fourth lower rail, and at least one fourth ball erected between the fourth upper rail and the fourth lower rail; wherein the at least one first coil comprises a first sub-coil, a second sub-coil, a third sub-coil and a fourth sub-coil, an extending direction of the first lower rail is consistent with an extending direction of the first sub-coil, an extending direction of the second lower rail is consistent with an extending direction of the second sub-coil, an extending direction of the third lower rail is consistent with an extending direction of the third sub-coil, and an extending direction of the fourth lower rail is consistent with an extending direction of the fourth sub-coil.

In the driving device according to an embodiment of the present application, the extending direction of the first upper rail is perpendicular to the extending direction of the first lower rail, the extending direction of the second lower rail is perpendicular to the extending direction of the second upper rail, the extending direction of the third lower rail is perpendicular to the extending direction of the third upper rail, and the extending direction of the fourth lower rail is perpendicular to the extending direction of the fourth upper rail.

In the driving device according to an embodiment of the present application, the extending direction of the first lower rail is perpendicular to the extending direction of the second lower rail, the extending direction of the second lower rail is perpendicular to the extending direction of the third lower rail, the extending direction of the third lower rail is perpendicular to the extending direction of the fourth lower rail, and the extending direction of the fourth lower rail is perpendicular to the extending direction of the first lower rail.

In the driving device according to an embodiment of the present application, the first lower rail, the second lower rail, the third lower rail and the fourth lower rail are rotationally symmetric with respect to the optical axis.

In the driving device according to an embodiment of the present application, the elastic member comprises a first elastic assembly extending between the fixed portion and the movable portion, the first elastic assembly comprises a focusing elastic part and an image-stabilizing elastic part, and the focusing elastic part and the image-stabilizing elastic part extend in a plane perpendicular to the optical axis; and wherein the focusing elastic part is arranged in a rotationally symmetrical manner relative to the optical axis, and the image-stabilizing elastic part is arranged in an axially symmetrical manner relative to the optical axis.

In the driving device according to an embodiment of the present application, the focusing elastic part extends between the inner carrier and the outer carrier, and the image-stabilizing elastic part extends between the outer carrier and the fixed portion.

In the driving device according to an embodiment of the present application, the focusing elastic part comprises a first focusing elastic unit and a second focusing elastic unit, and the first focusing elastic unit and the second focusing elastic unit are rotationally symmetric with respect to the optical axis; and wherein the first focusing elastic unit comprises a first focusing elastic inner contour portion fixed to the inner carrier, a first focusing elastic outer contour portion fixed to the outer carrier, and a first focusing elastic deformation portion extending between the first focusing elastic inner contour portion and the first focusing elastic outer contour portion, and the second focusing elastic unit comprises a second focusing elastic inner contour portion fixed to the inner carrier, a second focusing elastic outer contour portion fixed to the outer carrier, and a second focusing elastic deformation portion extending between the second focusing elastic inner contour portion and the second focusing elastic outer contour portion.

In the driving device according to an embodiment of the present application, the image-stabilizing elastic part comprises a first image-stabilizing elastic unit and a fourth image-stabilizing elastic unit which are symmetrically distributed with respect to the X-axis, and a second image-stabilizing elastic unit and a third image-stabilizing elastic unit which are symmetrically distributed with respect to the X-axis; and wherein the first image-stabilizing elastic unit and the second image-stabilizing elastic unit are symmetrically distributed with respect to the Y-axis, the third image-stabilizing elastic unit and the fourth image-stabilizing elastic unit are symmetrically distributed with respect to the Y-axis, the first image-stabilizing elastic unit is connected to the first focusing elastic unit, and the third image-stabilizing elastic unit is connected to the second focusing elastic unit.

In the driving device according to an embodiment of the present application, the elastic member further comprises a second elastic assembly extending between the inner carrier and the outer carrier, and the first elastic assembly and the second elastic assembly are oppositely disposed on two opposite sides of the movable portion; and wherein the second elastic assembly comprises a second elastic inner contour portion fixed to the inner carrier, a second elastic outer contour portion fixed to the outer carrier, and a second elastic deformation portion extending between the second elastic inner contour portion and the second elastic outer contour portion.

In the driving device according to an embodiment of the present application, the magnet and the second coil correspond to each other in a first direction, and the magnet and the first coil correspond to each other in a second direction, wherein the first direction is perpendicular to the second direction.

According to another aspect of the present application, the present application further provides a camera module, comprising:

- an optical lens;
- a photosensitive assembly; and
- the driving assembly as described above, wherein the optical lens is mounted in the driving device and maintained on an optical path of the photosensitive assembly.

According to still another aspect of the present application, the present application further provides an assembly method for a driving device, comprising:

assembling a semi-finished driving device, wherein the semi-finished driving device comprises a base, an image-stabilizing coil disposed on the base, an outer carrier, an inner carrier mounted to the outer carrier, a magnet disposed on the outer carrier, a focusing coil disposed on the inner carrier, and a second elastic assembly extending between a bottom surface of the inner carrier and a bottom surface of the outer carrier, the inner carrier is adapted to mount an optical lens thereon, and the optical lens is provided with an optical axis; and mounting a first elastic assembly on a top surface of the inner carrier, a top surface of the outer carrier and a top surface of the base, wherein the first elastic assembly comprises a focusing elastic part extending between the top surface of the outer carrier and the top surface of the inner carrier, and an image-stabilizing elastic part extending between the top surface of the outer carrier and the top surface of the base, and the focusing elastic part and the image-stabilizing elastic part extend in a height plane perpendicular to the optical axis, and wherein the focusing elastic part is arranged in a rotationally symmetrical manner relative to the optical axis, and the image-stabilizing elastic part is arranged in an axially symmetrical manner relative to the optical axis.

Further objects and advantages of the present application will be fully embodied through the understanding of the following description and the drawings.

These and other objects, characteristics and advantages of the present application are fully embodied through the following detailed description, drawings and claims.

BRIEF DESCRIPTION OF THE DRAWINGS

The above and other objects, features, and advantages of the present application will become more apparent from the detailed description of the embodiments of the present application in conjunction with the drawings. The drawings, which are used to provide a further understanding of the embodiments of the present application and constitute a part of the description, are used to explain the present application together with the embodiments of the present application, and do not constitute a limitation of the present application. In the drawings, the same reference signs generally represent the same components or steps.

FIG. 15 illustrates a schematic flowchart of an assembly method for the driving device according to an embodiment of the present application.

DETAILED DESCRIPTION

Hereinafter, exemplary embodiments according to the present application will be described in detail with reference to the drawings. Obviously, the described embodiments are only a part of the embodiments of the present application, rather than all the embodiments of the present application. It should be understood that the present application is not limited by the exemplary embodiments described herein.

Exemplary Camera Module

Figure 1:
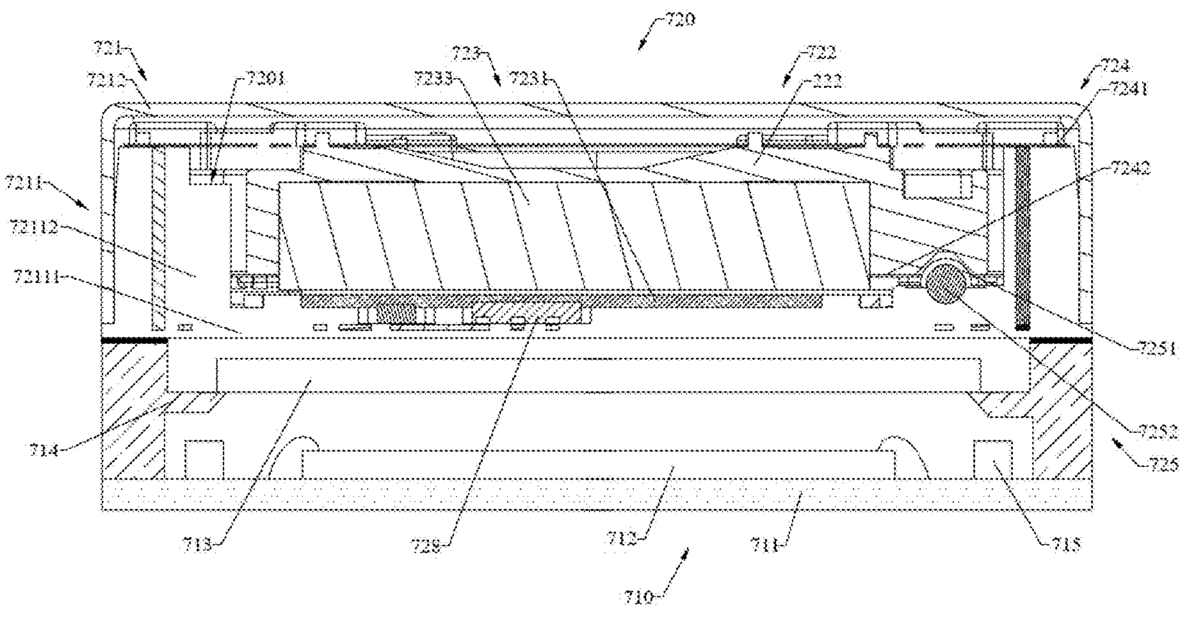
FIG. 1 illustrates a schematic view of a camera module according to an embodiment of the present application.

FIG. 1 is a schematic view of a camera module according to an embodiment of the present application. As shown in FIG. 1, the camera module according to the embodiment of the present application is illustrated, and includes: a photosensitive assembly 710, an optical lens (not illustrated in the figure) and a driving assembly, wherein the optical lens is maintained on a photosensitive path of the photosensitive assembly 710 so that the photosensitive assembly 710 can receive light projected from the optical lens for imaging, and the driving assembly is used to drive a target object (a photosensitive chip 712 and/or an optical lens) to move so as to achieve optical focusing and/or optical image-stabilizing.

In the embodiment of the present application, the photosensitive assembly 710 includes a circuit board 711, the photosensitive chip 712 electrically connected to the circuit board 711, and a filter element 713 maintained on a photosensitive path of the photosensitive chip 712, wherein the circuit board 711 forms a mounting substrate of the photosensitive assembly 710. The circuit board 711 may be implemented as a Printed Circuit Board (PCB), a software combination board, or a reinforced Flexible Printed Circuit (PFC). Moreover, in some examples, a reinforcing plate (not illustrated in the figure) may also be disposed below the circuit board 711. For example, a steel sheet is disposed below the circuit board 711, so as to strengthen the strength of the circuit board 711 and improve the heat dissipation performance of the photosensitive assembly 710 through the steel sheet.

The circuit board 711 includes a circuit board body, a connection belt and a connector part (wherein the connection belt and the connector part are not shown in the figure). The connection belt part is connected between the circuit board body and the connector part to achieve electrical conduction between the circuit board body and the connector part.

The photosensitive chip 712 includes a photosensitive area for receiving imaging light to achieve imaging and a non-photosensitive area surrounding the photosensitive area. The photosensitive chip 712 is electrically connected to the circuit board 711 through a pad of the photosensitive chip 712 located in the non-photosensitive area.

A specific implementation in which the photosensitive chip 712 is electrically connected to the circuit board 711 is not limited in the present application. For example, the photosensitive chip 712 may be electrically connected to the circuit board body of the circuit board 711 by means of wire bonding (gold wire), welding, flip-chip (FC), redistribution layer (RDL), or the like. In the embodiment of the present application, a surface of the circuit board 711 facing the optical lens is defined as a front surface of the circuit board 711, and a surface opposite to the front surface of the circuit board 711 is a bottom surface or back surface of the circuit board 711. The photosensitive chip 712 may be fixed to the front surface of the circuit board 711 or the back surface of the circuit board 711.

Correspondingly, in some embodiments of the present application, the photosensitive chip 712 is fixed to the front surface of the circuit board body by an adhesive medium. The circuit board body has a groove or a through hole (circuit board through hole) located in the central area thereof, and the photosensitive chip 712 is fixedly mounted in the groove or the circuit board through hole of the circuit board body. In other words, the photosensitive chip 712 is accommodated in the groove or the circuit board through hole of the circuit board body to reasonably utilize the height space occupied by the circuit board 711, reducing the influence of the thickness of the circuit board 711 on the thickness of the photosensitive assembly 710, and reducing the height of the camera module.

The filter element 713 maintained on the photosensitive path of the photosensitive chip 712 is used to filter the imaging light entering the photosensitive chip 712. In some implementations of the present application, the photosensitive assembly 710 further includes a filter element bracket 714 disposed on the circuit board 711, and the filter element 713 is mounted on the filter element bracket 714, and corresponds to at least a portion of the photosensitive area of the photosensitive chip 712, so as to be maintained on the photosensitive path of the photosensitive chip 712. Specifically, the filter element 713 may be fixed to the filter element bracket 714 by means of FC, that is, the filter element 713 is mounted on a side of the filter element bracket 714 away from the optical lens. The filter element 713 may also be mounted on a side of the filter element bracket 714 close to the optical lens.

The combination of the filter element bracket 714 and the circuit board 711 is not limited in the present application. In a specific implementation of the present application, the filter element bracket 714 is molded separately to form a structure independent of the circuit board 711, and the filter element bracket 714 is attached to the circuit board 711 by an adhesive, and may be used to support other components. In another specific implementation of the present application, the filter element bracket 714 and the circuit board 711 are integrally molded at a preset position of the circuit board body through a molding process. In still another specific implementation of the present application, the filter element bracket 714 is mounted on the circuit board 711 through a molded base. Specifically, the molded base is integrally molded at a preset position of the circuit board body through a molding process, and the filter element bracket 714 is fixed to the molded base. In this way, the filter element bracket 714 is mounted on the circuit board body.

In some implementations of the present application, the photosensitive assembly 710 further includes an electronic element 715 electrically connected to the circuit board 711, and the molded base has an accommodating cavity to enclose at least a portion of the circuit board 711 and the electronic element 715 in the accommodating cavity, so as to reduce the possibility of dust or other pollutants that may be carried on the surface of the circuit board 711 and/or the electronic element 715 to contaminate the photosensitive chip 712. In some implementations of the present application, the molded base not only encloses at least a portion of the circuit board 711 and the electronic element 715 in the accommodating cavity, but also encloses at least a portion of the non-photosensitive area of the photosensitive chip 712 in the accommodating cavity.

In other examples of the present application, a specific implementation in which the filter element 713 is maintained on the photosensitive path of the photosensitive chip 712 is not limited in the present application. For example, the filter element 713 may be implemented as a filter film and coated on the surface of a certain optical lens element of the optical lens to achieve a filtering effect.

In the embodiment of the present application, the photosensitive assembly 710 further includes an electrical connector (not shown in the figure) electrically connected to the circuit board 711 to achieve the electrical connection between the camera module and external equipment. Specifically, the electrical connector is connected to the connector part to electrically connect to the circuit board 711.

In the embodiment of the present application, the optical lens includes a lens barrel and at least one optical lens element mounted in the lens barrel. The optical lens is provided with an optical axis, and the optical lens element is arranged along a direction set by the optical axis. Those of ordinary skill in the art should know that the resolution of the optical lens is proportional to the number of optical lens elements within a certain range, that is, the higher the resolution, the greater the number of optical lens elements. In a specific implementation, the optical lens may be implemented as an integrated lens, or a split lens, wherein when the optical lens is implemented as an integrated lens, the optical lens includes a lens barrel, and all the optical lens elements are mounted in the lens barrel; and when the optical lens is implemented as a split optical lens, the optical lens is assembled from at least two partial lens units.

In the embodiment of the present application, the driving assembly is used to drive the optical lens and/or the photosensitive chip 712 to move to achieve optical focusing and/or optical image-stabilizing. Correspondingly, in some implementations of the present application, the driving assembly is only provided with a lens driving device, and the driving assembly drives the optical lens to move through the lens driving device to achieve optical focusing and/or optical image-stabilizing. In some embodiments of the present application, the driving assembly is only provided with a chip driving device, and the driving assembly drives the photosensitive chip 712 to move through the chip driving device to achieve optical focusing and/or optical image-stabilizing. In some embodiments of the present application, the driving assembly is provided with both a lens driving device and a chip driving device. The driving assembly drives a driven object corresponding thereto to move through any one of the lens driving device and the chip driving device to achieve optical focusing and/or optical image-stabilizing, or, the optical lens and the photosensitive chip 712 are driven to move through the lens driving device and the chip driving device to achieve optical focusing and/or optical image-stabilizing.

In the embodiment of the present application, the implementation of optical focusing and optical image-stabilizing is further explained by establishing a spatial coordinate system. A direction set by the optical axis is defined as a Z-axis direction (i.e., a direction set by the Z-axis), a first preset direction in a plane which is positioned perpendicular to the optical axis is an X-axis direction (i.e., a direction set by the X-axis), and a second preset direction in a plane which is positioned perpendicular to the optical axis is a Y-axis direction (i.e., a direction set by the Y-axis). In the embodiment of the present application, the X-axis direction and the Y-axis direction are perpendicular to each other, and the Z-axis direction is perpendicular to a plane where the X-axis direction and the Y-axis direction are located. In other words, the X-axis, Y-axis, and Z-axis constitute a three-dimensional Cartesian coordinate system.

In the embodiment of the present application, the driving assembly can achieve the optical focusing function by driving the optical lens and/or the photosensitive assembly 710 to move along the Z-axis direction, and achieve the optical image-stabilizing function by driving the optical lens and/or the photosensitive assembly 710 to move along the X-axis direction and the Y-axis direction. The driving assembly can also achieve the optical focusing function by driving the optical lens and/or the photosensitive assembly 710 to rotate around the Z-axis direction, and achieve the optical image-stabilizing function by driving the optical lens and/or the photosensitive assembly 710 to rotate around the X-axis and Y-axis directions.

For ease of explanation and understanding, the lens driving device will be taken as an example below to explain the structure and method for achieving optical focusing and optical image-stabilizing. A driving device 720 mentioned below specifically refers to the lens driving device.

Figure 2:
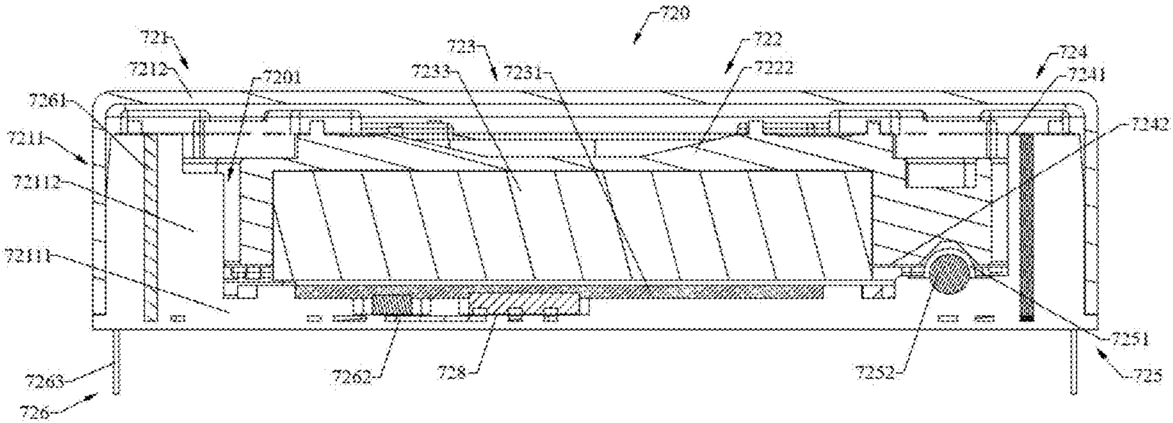
FIG. 2 illustrates a schematic view of a driving device of the camera module according to an embodiment of the present application.
Figure 3:
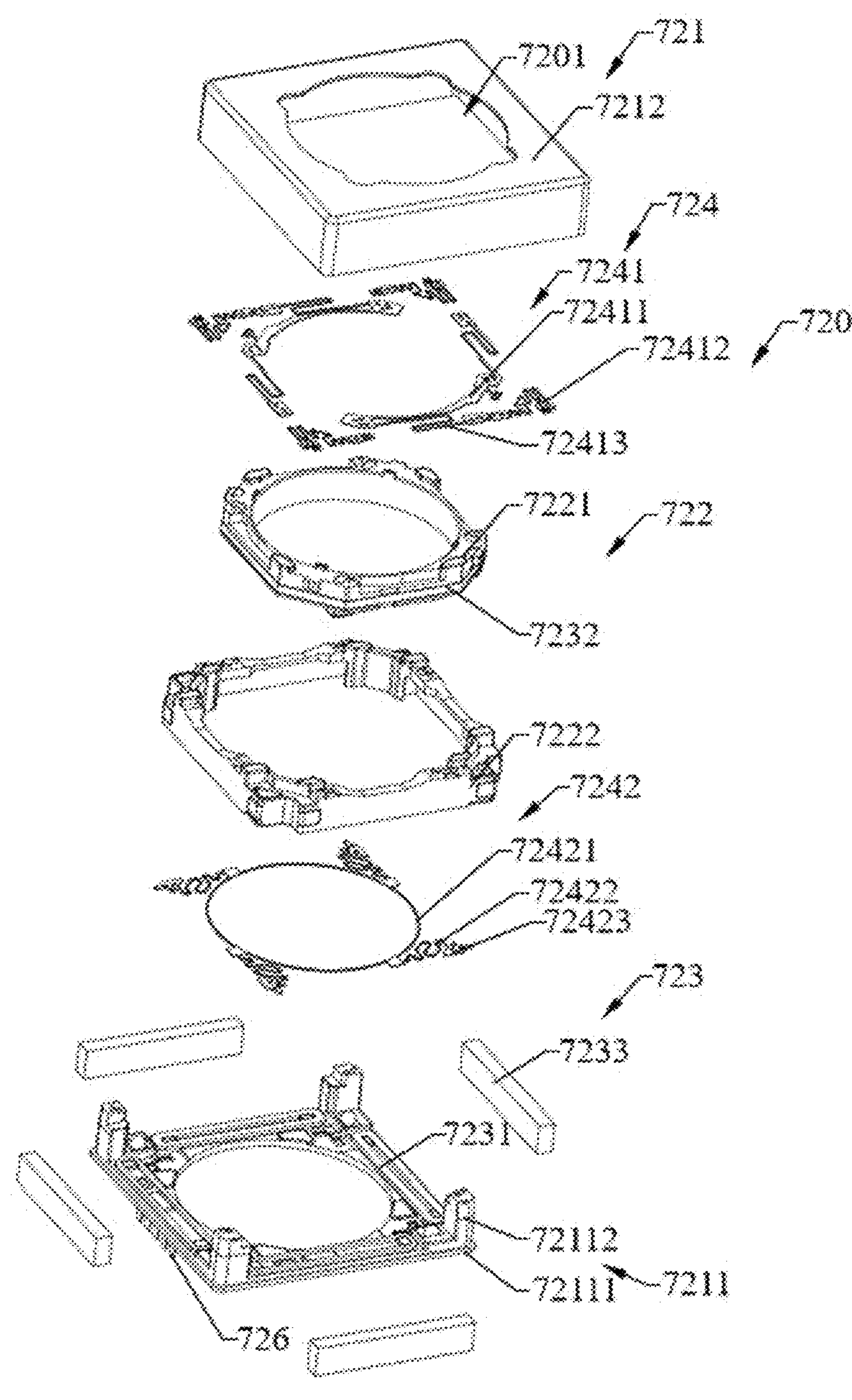
FIG. 3 illustrates an exploded schematic view of the driving device according to an embodiment of the present application.
Figure 4:
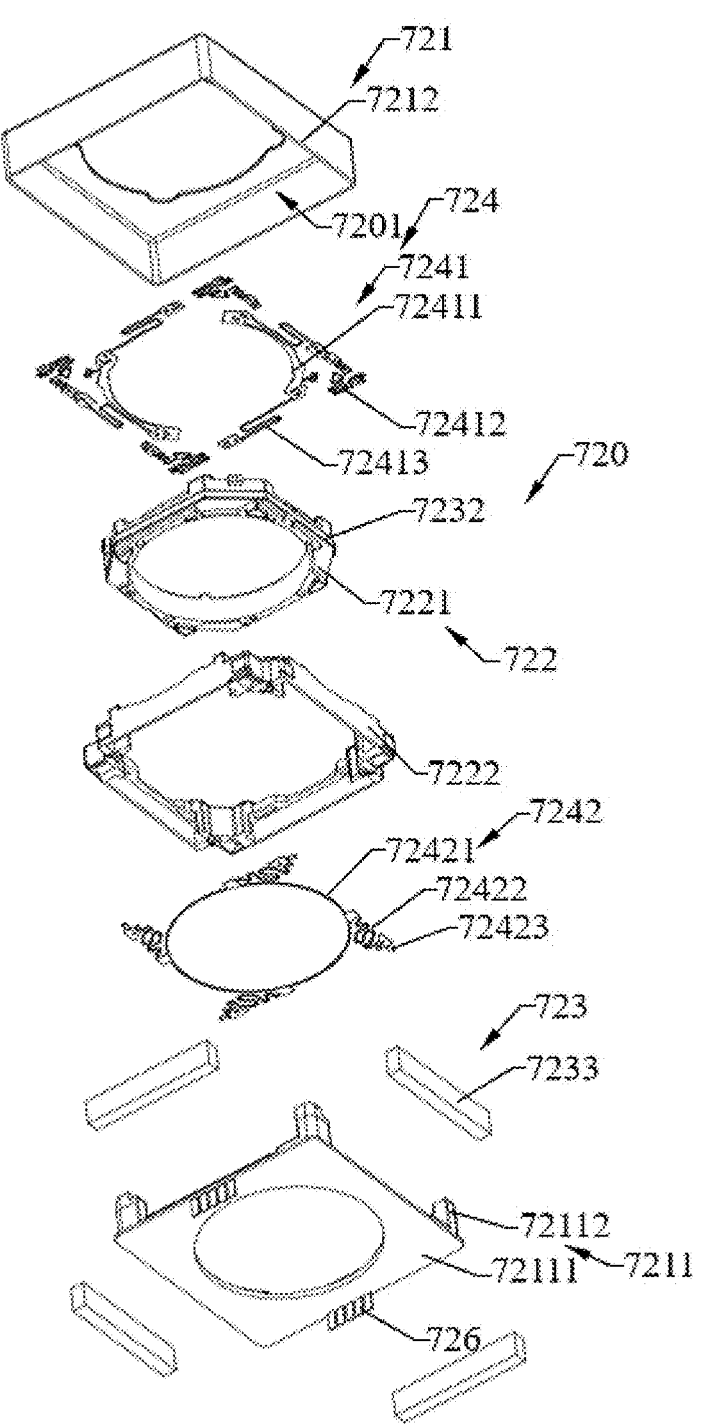
FIG. 4 illustrates another exploded schematic view of the driving device according to an embodiment of the present application.

As shown in FIGS. 2 to 4, in the embodiment of the present application, the driving device 720 includes a fixed portion 721 having an accommodating cavity 7201, a movable portion 722 suspended in the accommodating cavity 7201, and a driving portion 723 driving the movable portion 722 to move relative to the fixed portion 721. The movable portion 722 is adapted to mount an optical lens therein. In the process of the driving portion 723 driving the movable portion 722 to move relative to the fixed portion 721, the optical lens mounted on the movable portion 722 is driven to move along the Z-axis direction or along a plane perpendicular to the Z-axis, so as to achieve the optical focusing and optical image-stabilizing functions of the camera module.

In the embodiment of the present application, as shown in FIGS. 3 and 4, the fixed portion 721 includes an upper cover 7212 and a base 7211 that are engaged with each other to form the accommodating cavity 7201 for accommodating the movable portion 722 and the driving portion 723 therein, which can not only protect respective elements in the driving device 720 to avoid damage due to collision, but also be used to prevent dust, dirt or stray light from entering the interior of the driving device 720.

The upper cover 7212 and the base 7211 are each provided with an opening corresponding to the optical lens, so that light reflected by an object can enter the optical lens through the opening provided in the upper cover 7212 and reach the photosensitive assembly 710.

Figure 5:
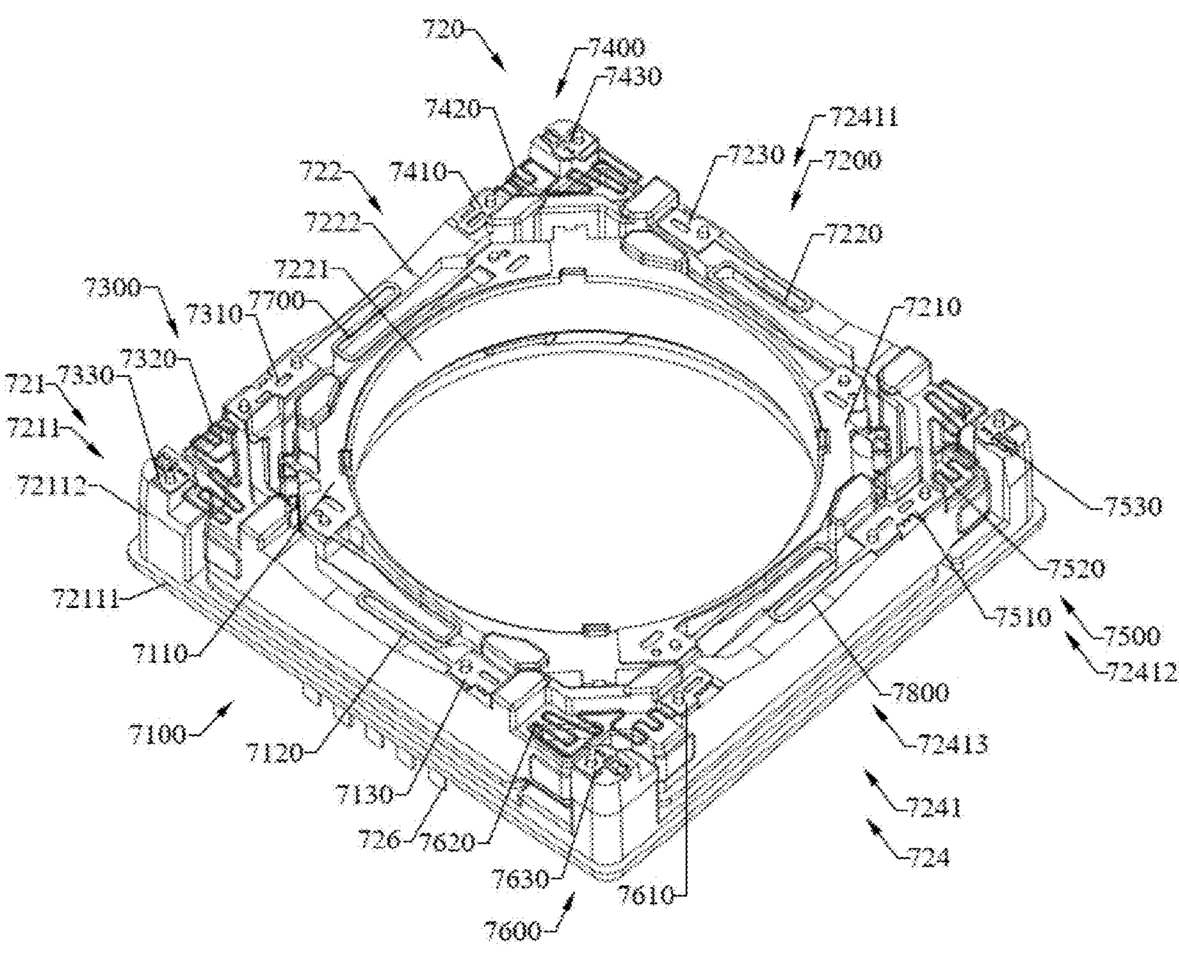
FIG. 5 illustrates a partial three-dimensional schematic view of the driving device according to an embodiment of the present application.

As shown in FIGS. 3 to 5, the base 7211 includes a base body 72111 and a base pillar (or base pillars) 72112 disposed on the base body 72111. The base pillar(s) 72112 integrally extends (extend) upward along the peripheral area of the base body 72111, so that the base pillar(s) 72112 and the surface of the base body 72111 form a mounting surface with a height difference. The number of the base pillar(s) 72112 is at least two, and preferably, the respective base pillars 72112 are oppositely disposed on the base body 72111, and are centrally symmetrical with a longitudinal center axis of the base body 72111 as an axis of symmetry. In a specific example of the present application, the respective base pillars 72112 are located at the respective four corners of the base body 72111, integrally extend upward along the four corner areas of the base body 72111, and are symmetrically distributed.

In the embodiment of the present application, a specific formation manner of the base pillar(s) 72112 is not limited in the present application. The base pillar(s) 72112 may be integrally molded with the base body 72111 through an injection molding process, or may be further molded on the molded base body 72111 through an injection molding process.

In the embodiment of the present application, the movable portion 722 is disposed in the fixed portion 721, and may move in the accommodating cavity 7201 of the fixed portion 721 under the action of the driving portion 723. The movable portion 722 includes an outer carrier 7222 and an inner carrier 7221 movably mounted to the outer carrier 7222, and the inner carrier 7221 is adapted to mount the optical lens therein. In other words, the optical lens is adapted to be mounted on the inner carrier 7221. In the embodiment of the present application, the inner carrier 7221 may be driven to move relative to the outer carrier 7222 alone, or may be driven by the outer carrier 7222 to move together with the outer carrier 7222. Further, the optical lens is driven to move by driving the outer carrier 7222 or the inner carrier 7221 to move, so as to achieve the optical focusing or optical image-stabilizing function.

Specifically, in some other implementations of the present application, when the outer carrier 7222 remains stationary and the inner carrier 7221 is driven to move relative to the outer carrier 7222, the inner carrier 7221 can drive the optical lens to move in the direction set by the optical axis to achieve the optical focusing function of the camera module. When the outer carrier 7222 is driven to move relative to the base 7211, the outer carrier 7222 can drive the inner carrier 7221 and the optical lens to move in a plane perpendicular to the optical axis to achieve the optical image-stabilizing function of the camera module. In some other implementations of the present application, when the outer carrier 7222 remains stationary and the inner carrier 7221 is driven to move relative to the outer carrier 7222, the inner carrier 7221 can drive the optical lens to move in a plane perpendicular to the optical axis to achieve the optical image-stabilizing function of the camera module. When the outer carrier 7222 is driven to move relative to the base 7211, the outer carrier 7222 can drive the inner carrier 7221 and the optical lens to move in the direction set by the optical axis to achieve the optical focusing function of the camera module.

It is worth mentioning that in some implementations of the present application, the lens barrel of the optical lens and the inner carrier 7221 have an integrated structure, that is, the inner carrier 7221 has the function of the lens barrel for accommodating a plurality of optical lens elements, and can also be used as a carrier to drive the optical lens to move. Further, the integrated structure of the lens barrel and the inner carrier 7221 can reduce the overall lateral size of the driving device 720, thereby reducing the lateral size of the camera module.

As shown in FIGS. 2 to 7, in the embodiment of the present application, the driving device 720 further includes an elastic member 724 disposed in the accommodating cavity 7201 of the fixed portion 721, which is adapted to drive the movable portion 722 to return/restore to an original position (i.e., a position when not driven by the driving portion 723, or a position before being driven by the driving portion 723), and the movable portion 722 is movably suspended in the accommodating cavity 7201 by the elastic member 724.

Figure 6:
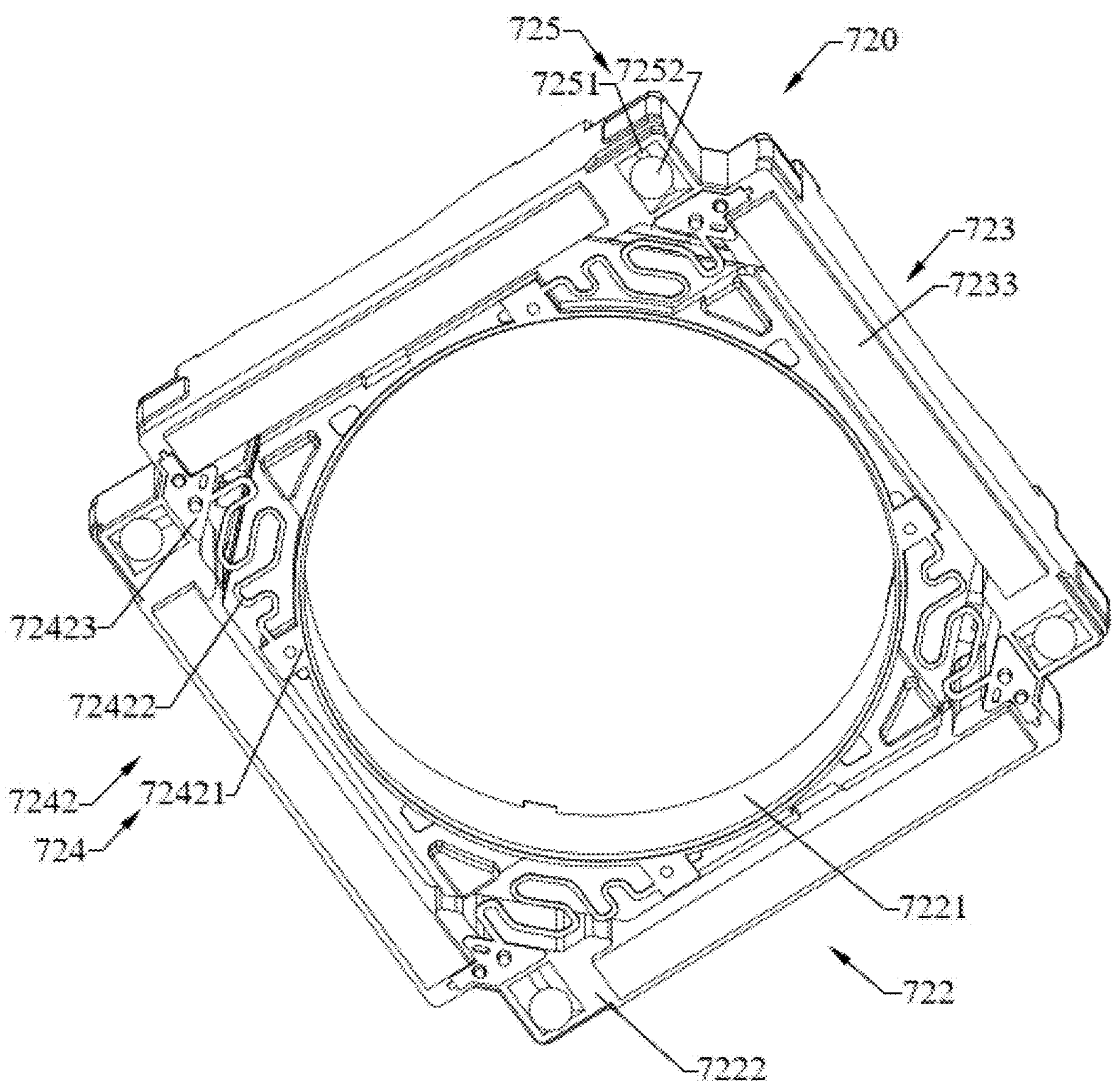
FIG. 6 illustrates another partial three-dimensional schematic view of the driving device according to an embodiment of the present application.
Figure 8:
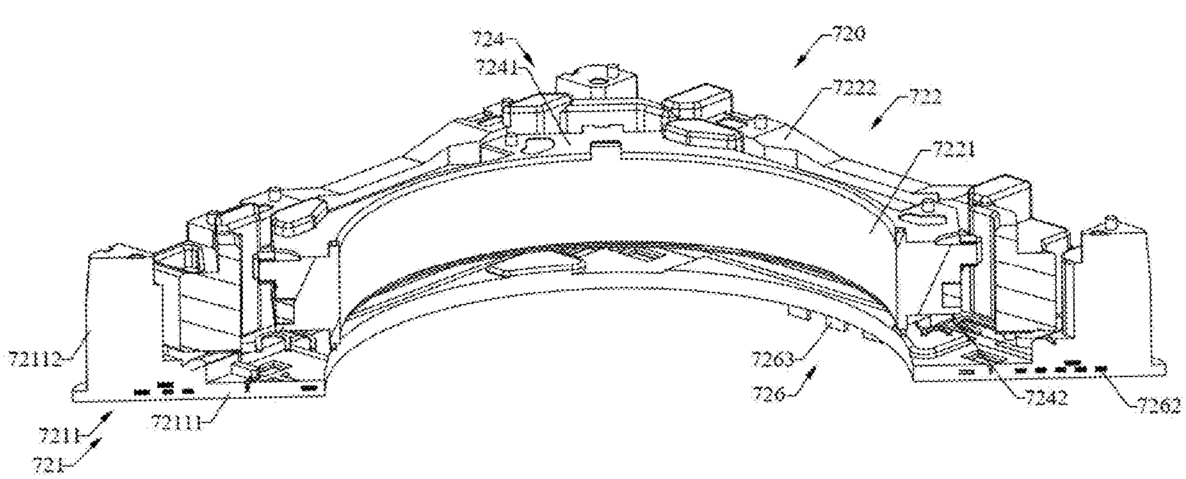
FIG. 8 illustrates another partial three-dimensional schematic view of the driving device according to an embodiment of the present application.

The elastic member 724 includes a first elastic assembly 7241 and a second elastic assembly 7242 extending between the inner carrier 7221 and the outer carrier 7222, and the first elastic assembly 7241 and the second elastic assembly 7242 are oppositely disposed on two opposite sides of the movable portion 722, as shown in FIGS. 5, 6 and 8. The first elastic assembly 7241 is located on a light incident side of the optical lens, and the second elastic assembly 7242 is located on a light exit side of the optical lens, so as to suspend the optical lens and the movable portion 722 in the accommodating cavity 7201 of the fixed portion 721 in a restorable manner.

Specifically, the first elastic assembly 7241 is a thin sheet-like structure as a whole, and the first elastic assembly 7241 includes a focusing elastic part 72411 and an image-stabilizing elastic part 72412, and the focusing elastic part 72411 and the image-stabilizing elastic part 72412 extend in a plane perpendicular to the optical axis.

In some implementations of the present application, optical image-stabilizing is achieved by driving the inner carrier 7221 to move relative to the outer carrier 7222, and optical focusing is achieved by driving the outer carrier 7222 to move relative to the fixed portion 721. Correspondingly, the focusing elastic part 72411 is disposed at the periphery of the image-stabilizing elastic part 72412, the image-stabilizing elastic part 72412 extends between the inner carrier 7221 and the outer carrier 7222, and the focusing elastic part 72411 extends between the outer carrier 7222 and the base 7211 of the fixed portion 721. The driving portion 723 is adapted to drive the inner carrier 7221 to move relative to the outer carrier 7222 in a plane perpendicular to the optical axis to perform optical image-stabilizing, and the driving portion 723 is adapted to drive the outer carrier 7222 to take along the inner carrier 7221 carrying the optical lens to move along the direction set by the optical axis to perform optical focusing.

In some other implementations of the present application, optical focusing is achieved by driving the inner carrier 7221 to move relative to the outer carrier 7222, and optical image-stabilizing is achieved by driving the outer carrier 7222 to move relative to the fixed portion 721. Correspondingly, the image-stabilizing elastic part 72412 is disposed at the periphery of the focusing elastic part 72411, the focusing elastic part 72411 extends between the inner carrier 7221 and the outer carrier 7222, and the image-stabilizing elastic part 72412 extends between the outer carrier 7222 and the base 7211 of the fixed portion 721. The driving portion 723 is adapted to drive the inner carrier 7221 to move relative to the outer carrier 7222 along the direction set by the optical axis to perform optical focusing, and the driving portion 723 is adapted to drive the outer carrier 7222 to take along the inner carrier 7221 carrying the optical lens to move in a plane perpendicular to the optical axis to perform optical image-stabilizing.

When the driving portion 723 drives the inner carrier 7221 to move along the direction set by the optical axis (i.e., the Z-axis direction), the focusing elastic part 72411 is deformed to accumulate elastic force. When the driving portion 723 stops driving, the elastic force of the focusing elastic part 72411 is released, driving the inner carrier 7221 to return/restore to an original position. When the driving portion 723 drives the outer carrier 7222 to move along the X-axis direction and the Y-axis direction in a plane perpendicular to the optical axis, the image-stabilizing elastic part 72412 is deformed to accumulate elastic force. When the driving portion 723 stops driving, the elastic force of the image-stabilizing elastic part 72412 is released, driving the outer carrier 7222 to return/restore to an original position.

It is worth mentioning that in order to prevent the inner carrier 7221 from colliding with the outer carrier 7222 or the fixed portion 721 during the process of the optical lens being driven by the inner carrier 7221 to move, thereby causing deformation or damage to the optical lens and a decrease in imaging quality, in the embodiment of the present application, first protrusions for anti-collision are respectively provided on the top and bottom surfaces of the inner carrier 7221. Preferably, the first protrusions are made of a material with a smaller elastic modulus than that of the inner carrier 7221, such as silicone. The first protrusions may be integrally molded on the inner carrier 7221 by means of injection molding, or may be fixed to the inner carrier 7221 by means of gluing. In this regard, it is not limited in the present application.

Similarly, second protrusions for anti-collision may be provided on the top and bottom surfaces of the outer carrier 7222, and the surfaces of the second protrusions protrude beyond the surface of the elastic member 724 to prevent the elastic member 724 from colliding with the base 7211 or the upper cover 7212 of the fixed portion 721 during the movement of the outer carrier 7222, causing damage to the elastic member 724.

The focusing elastic part 72411 has a focusing elastic inner contour portion, a focusing elastic outer contour portion, and a focusing elastic deformation portion extending between the focusing elastic inner contour portion and the focusing elastic outer contour portion, wherein the focusing elastic inner contour portion is fixed to the inner carrier 7221, and the focusing elastic outer contour portion is fixed to the outer carrier 7222.

Correspondingly, in a specific example of the present application, the top surfaces of the inner carrier 7221 and the outer carrier 7222 are each provided with an elastic mechanism mounting position. The focusing elastic inner contour portion is fixedly connected to the elastic mechanism mounting position on the top surface of the inner carrier 7221, the focusing elastic outer contour portion is fixedly connected to the elastic mechanism mounting position on the top surface of the outer carrier 7222, and the focusing elastic deformation portion extends outward from the focusing elastic inner contour portion to the focusing elastic outer contour portion, so that the inner carrier 7221 is suspended in the outer carrier 7222 through the focusing elastic deformation portion, a certain moving space is reserved for the inner carrier 7221 through the deformation of the focusing elastic deformation portion, and a certain restoring force is provided for the inner carrier 7221.

The focusing elastic deformation portion is bent and extended from the focusing elastic outer contour portion to the focusing elastic inner contour portion, so as to reserve sufficient space for the movement of the inner carrier 7221, which can not only provide a guarantee for the large movement stroke of the inner carrier 7221, but also reduce the driving resistance of the inner carrier 7221, and improve the optical focusing sensitivity of the camera module. It will be appreciated that the longer the length of the focusing elastic deformation portion, the more bends the focusing elastic deformation portion has, the smaller the deformation of the focusing elastic deformation portion itself after the deformation occurs, and the easier it is to restore the focusing elastic deformation portion after being stretched.

In particular, in the embodiment of the present application, the focusing elastic part 72411 is arranged in a rotationally symmetrical manner relative to the optical axis. This is because K values (elastic coefficients) of the elastic element with the axially symmetrical design in the X-axis direction and the Y-axis direction are quite different, which will cause the displacement of the inner carrier 7221 in one direction of the X-axis direction or the Y-axis direction to be relatively large, and the rotationally symmetrical elastic element can have a suppressive effect on the displacement in the one direction. Further, since the elastic coefficients (K values) of the rotationally symmetrical focusing elastic part 72411 in the X-axis direction and the Y-axis direction are the same, when the inner carrier 7221 moves along the Z-axis direction, the rotationally symmetrical focusing elastic part 72411 can suppress the movement of the inner carrier 7221 rotating around the Z-axis to a certain extent. Furthermore, the K value of the focusing elastic part 72411 in the X-axis direction and the Y-axis direction is very large, enabling the amplitude of the rotation of the inner carrier 7221 around the Z-axis to be smaller. It will be appreciated that the rotationally symmetrical layout manner enables the focusing elastic part 72411 to further improve the flatness of the first elastic assembly 7241, so as to reduce the tilt tolerance of the driving device 720 and improve the assembly accuracy of the camera module.

In the embodiment of the present application, the focusing elastic part 72411 includes at least two focusing elastic units distributed in a rotationally symmetrical manner relative to the optical axis, and the at least two focusing elastic units are independent of each other, that is, the focusing elastic part 72411 is a split structure. The number of focusing elastic units is not limited in the present application.

Figure 9:
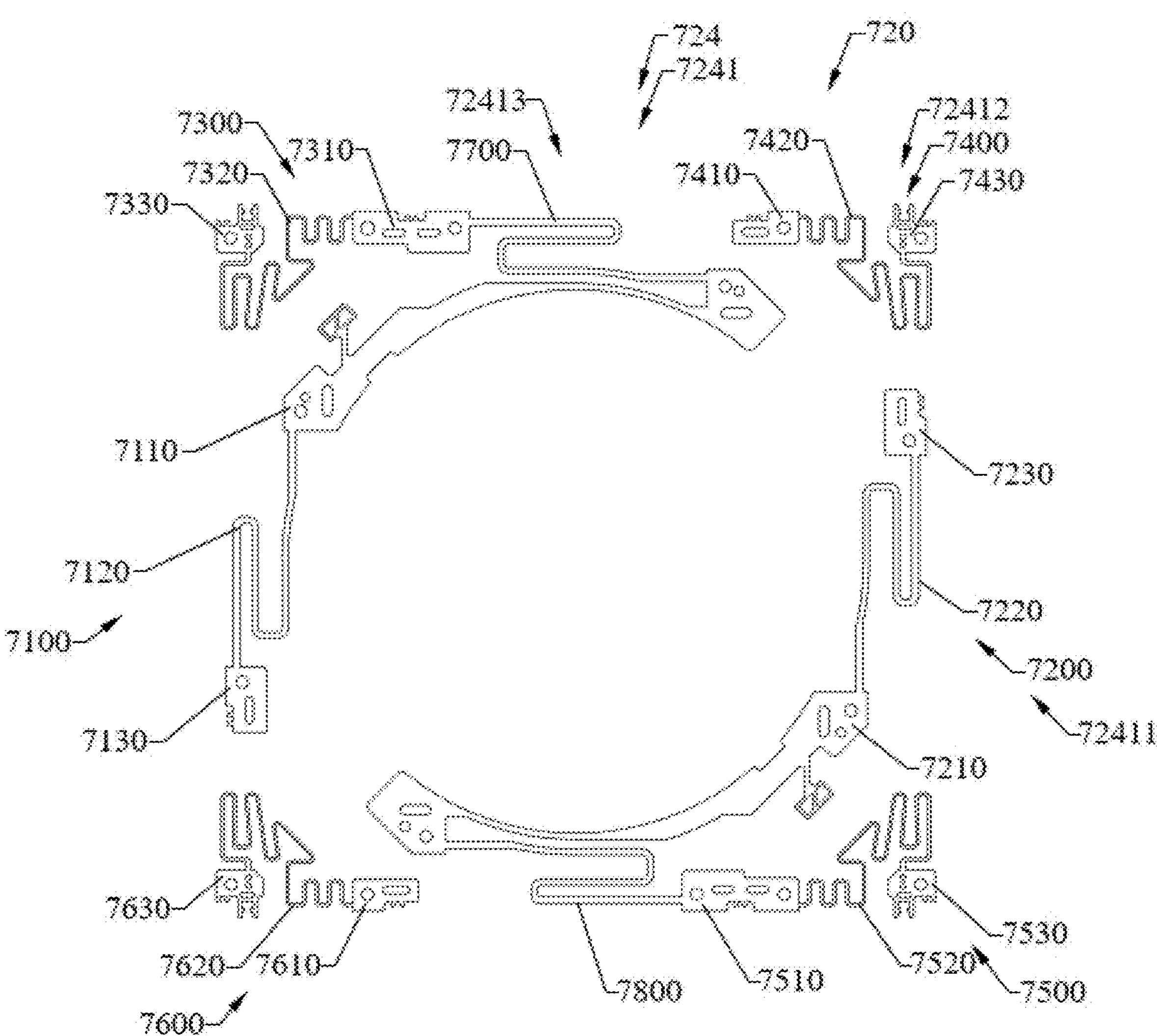
FIG. 9 illustrates a schematic plan view of the driving device according to an embodiment of the present application.

In a specific example of the present application, the focusing elastic part 72411 includes a first focusing elastic unit 7100 and a second focusing elastic unit 7200, and the first focusing elastic unit 7100 and the second focusing elastic unit 7200 are rotationally symmetric with respect to the optical axis, as shown in FIG. 9. The first focusing elastic unit 7100 includes a first focusing elastic inner contour portion 7110 fixed to the inner carrier 7221, a first focusing elastic outer contour portion 7130 fixed to the outer carrier 7222, and a first focusing elastic deformation portion 7120 extending between the first focusing elastic inner contour portion 7110 and the first focusing elastic outer contour portion 7130. The second focusing elastic unit 7200 includes a second focusing elastic inner contour portion 7210 fixed to the inner carrier 7221, a second focusing elastic outer contour portion 7230 fixed to the outer carrier 7222, and a second focusing elastic deformation portion 7220 extending between the second focusing elastic inner contour portion 7210 and the second focusing elastic outer contour portion 7230.

In a specific example of the present application, the first focusing elastic inner contour portion 7110 and the second focusing elastic inner contour portion 7210 form a hollow annular structure, so that when the first focusing elastic unit 7100 is fixedly sleeved on the inner carrier 7221, the middle area of the annular structure can correspond to the optical lens. The first focusing elastic outer contour portion 7130 and the second focusing elastic outer contour portion 7230 are disposed along the opposite sides of the driving device 720, respectively. The first focusing elastic deformation portion 7120 and/or the second focusing elastic deformation portion 7220 include a plurality of bending sections extending along the X-axis direction set by the X-axis or the Y-axis direction set by the Y-axis to provide a certain restoring force for the movement of the inner carrier 7221, wherein each bending section includes at least two straight sections and a curved section connecting the two straight sections.

It is worth mentioning that the focusing elastic deformation portion may be, but is not limited to, implemented as at least two spring wires connected between the focusing elastic outer contour portion and the focusing elastic inner contour portion. When the driving portion 723 generates a driving force to drive the inner carrier 7221 to displace, the focusing elastic deformation portion is driven to generate a reaction damping force balanced with the driving force, so that the inner carrier 7221 is stably maintained at a certain position along the optical axis to achieve the optical focusing function of the camera module.

In the embodiment of the present application, the image-stabilizing elastic part 72412 has an image-stabilizing elastic inner contour portion, an image-stabilizing elastic outer contour portion, and an image-stabilizing elastic deformation portion extending between the image-stabilizing elastic inner contour portion and the image-stabilizing elastic outer contour portion, wherein the image-stabilizing elastic inner contour portion is fixed to the outer carrier 7222, and the image-stabilizing elastic outer contour portion is fixed to the base 7211 of the fixed portion 721.

Correspondingly, in a specific example of the present application, an elastic mechanism mounting position is provided on the top surface of the base pillar(s) 72112 of the base 7211, the image-stabilizing elastic inner contour portion is fixedly connected to the elastic mechanism mounting position on the top surface of the outer carrier 7222, the image-stabilizing elastic outer contour portion is fixedly connected to the elastic mechanism mounting position on the top surface of the base pillar(s) 72112, and the image-stabilizing elastic deformation portion extends outward from the image-stabilizing elastic inner contour portion to the image-stabilizing elastic outer contour portion, so that the outer carrier 7222 is suspended on the base 7211 by the image-stabilizing elastic deformation portion, a certain moving space is reserved for the outer carrier 7222 through the deformation of the image-stabilizing elastic deformation portion, and a certain restoring force is provided for the outer carrier 7222.

The image-stabilizing elastic deformation portion is bent and extended from the image-stabilizing elastic outer contour portion to the image-stabilizing elastic inner contour portion, so as to reserve sufficient space for the movement of the outer carrier 7222, which can not only provide a guarantee for the large movement stroke of the outer carrier 7222, but also reduce the driving resistance of the inner carrier 7221, and improve the optical image-stabilizing sensitivity of the camera module. It will be appreciated that the longer the length of the image-stabilizing elastic deformation portion, the more bends the image-stabilizing elastic deformation portion has, the smaller the deformation of the image-stabilizing elastic deformation portion itself after the deformation occurs, and the easier it is to restore the image-stabilizing elastic deformation portion after being stretched.

Specifically, the image-stabilizing elastic deformation portion includes a plurality of interconnected bending sections extending along the X direction and a plurality of interconnected bending sections extending along the Y direction, wherein the plurality of interconnected bending sections extending along the X direction are interconnected with the plurality of interconnected bending sections extending along the Y direction, so that after the image-stabilizing elastic deformation portion is stretched in the X direction and the Y direction, corresponding restoring forces can be generated in the X direction and the Y direction, causing the outer carrier 7222 to return/restore to an original position (i.e., a position of the outer carrier 7222 before being driven to move by the driving portion 723) under the action of the image-stabilizing elastic unit.

In a specific example of the present application, the plurality of interconnected bending sections extending along the X direction is connected to the image-stabilizing elastic inner contour portion at one end, and the plurality of interconnected bending sections extending along the Y direction is connected to the image-stabilizing elastic outer contour portion at one end. In another specific example of the present application, the plurality of interconnected bending sections extending along the X direction is connected to the image-stabilizing elastic outer contour portion at one end, and the plurality of interconnected bending sections extending along the Y direction is connected to the image-stabilizing elastic inner contour portion at one end. In this regard, it is not limited in the present application.

In particular, in the embodiment of the present application, the image-stabilizing elastic part 72412 is arranged in an axially symmetrical manner relative to the optical axis. This is because the elastic element with a rotationally symmetrical design has a smaller K value in the direction of rotation along the Z-axis direction, which will cause the outer carrier 7222 to more easily produce rotational movement around the Z-axis direction during the translational movement along the X-axis direction and the Y-axis direction. The axially symmetrical image-stabilizing elastic part 72412 effectively improves the above problem. When the outer carrier 7222 moves along the X-axis direction and the Y-axis direction, the axially symmetrical image-stabilizing elastic part 72412 can suppress the outer carrier 7222 from producing rotational movement around the Z-axis. It will be appreciated that the axially symmetrical arrangement manner enables the image-stabilizing elastic part 72412 to further improve the flatness of the first elastic assembly 7241, so as to reduce the tilt tolerance of the driving device 720 and improve the assembly accuracy of the camera module.

In an embodiment of the present application, the image-stabilizing elastic part 72412 includes at least two image-stabilizing elastic units distributed in an axially symmetrical manner relative to the optical axis, and the at least two image-stabilizing elastic units are independent of each other, that is, the image-stabilizing elastic part 72412 is a split structure. The number of image-stabilizing elastic units is not limited in the present application.

In a specific example of the present application, the number of image-stabilizing elastic units is 74. Correspondingly, the image-stabilizing elastic part 72412 includes four image-stabilizing elastic units, and the four image-stabilizing elastic units are distributed in an axially symmetrical manner relative to the X-axis and the Y-axis. Specifically, the image-stabilizing elastic part 72412 includes a first image-stabilizing elastic unit 7300, a second image-stabilizing elastic unit 7400, a third image-stabilizing elastic unit 7500, and a fourth image-stabilizing elastic unit 7600 disposed in sequence along a clockwise direction, as shown in FIG. 9. The first image-stabilizing elastic unit 7300 and the fourth image-stabilizing elastic unit 7600 are symmetrically distributed with respect to the X-axis, the second image-stabilizing elastic unit 7400 and the third image-stabilizing elastic unit 7500 are symmetrically distributed with respect to the X-axis, the first image-stabilizing elastic unit 7300 and the second image-stabilizing elastic unit 7400 are symmetrically distributed with respect to the Y-axis, the third image-stabilizing elastic unit 7500 and the fourth image-stabilizing elastic unit 7600 are symmetrically distributed with respect to the Y-axis, and the first image-stabilizing elastic unit 7300, the second image-stabilizing elastic unit 7400, the third image-stabilizing elastic unit 7500 and the fourth image-stabilizing elastic unit 7600 are distributed in an axially symmetrical manner.

The first image-stabilizing elastic unit 7300, the second image-stabilizing elastic unit 7400, the third image-stabilizing elastic unit 7500 and the fourth image-stabilizing elastic unit 7600 are located at the four corners of the driving device 720, so that the outer carrier 7222 is subjected to more symmetrical forces under the action of the four image-stabilizing elastic units, thereby enabling the outer carrier 7222 to be stably suspended on the base 7211.

More specifically, the first image-stabilizing elastic unit 7300 includes a first image-stabilizing elastic inner contour portion 7310 fixed to the outer carrier 7222, a first image-stabilizing elastic outer contour portion 7330 fixed to the base 7211, and a first image-stabilizing elastic deformation portion 7320 integrally connecting the first image-stabilizing elastic inner contour portion 7310 and the first image-stabilizing elastic outer contour portion 7330. The second image-stabilizing elastic unit 7400 includes a second image-stabilizing elastic inner contour portion 7410 fixed to the outer carrier 7222, a second image-stabilizing elastic outer contour portion 7430 fixed to the base 7211, and a second image-stabilizing elastic deformation portion 7420 integrally connecting the second image-stabilizing elastic inner contour portion 7410 and the second image-stabilizing elastic outer contour portion 7430. The third image-stabilizing elastic unit 7500 includes a third image-stabilizing elastic inner contour portion 7510 fixed to the outer carrier 7222, a third image-stabilizing elastic outer contour portion 7530 fixed to the base 7211, and a third image-stabilizing elastic deformation portion 7520 integrally connecting the third image-stabilizing elastic inner contour portion 7510 and the third image-stabilizing elastic outer contour portion 7530. The fourth image-stabilizing elastic unit 7600 includes a fourth image-stabilizing elastic inner contour portion 7610 fixed to the outer carrier 7222, a fourth image-stabilizing elastic outer contour portion 7630 fixed to the base 7211, and a fourth image-stabilizing elastic deformation portion 7620 integrally connecting the fourth image-stabilizing elastic inner contour portion 7610 and the fourth image-stabilizing elastic outer contour portion 7630, as shown in FIG. 9.

It is worth mentioning that the first focusing elastic outer contour portion 7130 and the second focusing elastic outer contour portion 7230 of the two focusing elastic units are disposed on two opposite sides of the driving device 720 along the X-axis direction or the Y-axis direction, respectively. Such an arrangement enables the focusing elastic part 72411 and the image-stabilizing elastic part 72412 to fully utilize the spatial position of the lens driving device, and the focusing elastic part 72411 and the image-stabilizing elastic part 72412 can avoid interference with each other, thereby affecting the driving effect.

In summary, the first elastic assembly 7241 includes the focusing elastic part 72411 and the image-stabilizing elastic part 72412, wherein the focusing elastic part 72411 is arranged in a rotationally symmetrical manner around the Z axis, and the image-stabilizing elastic part 72412 is arranged in an axially symmetrical manner relative to the X axis and the Y axis. In this way, the driven object is prevented from unexpectedly moving in the process of driving the acted object to move. Specifically, on the one hand, when the driving portion 723 drives the inner carrier 7221 to move along the Z axis direction to perform optical focusing, the focusing elastic part 72411 can suppress the inner carrier 7221 from producing translational movement along the X-axis direction and the Y-axis direction, and can also suppress the inner carrier 7221 from producing rotational movement along the Z axis direction. On the other hand, when the driving portion 723 drives the outer carrier 7222 to move along the X axis direction and the Y axis direction to perform optical image-stabilizing, the image-stabilizing elastic part 72412 can suppress the outer carrier 7222 from producing rotational movement around the Z axis direction.

It is worth mentioning that in some implementations of the present application, the focusing elastic part 72411 and the image-stabilizing elastic part 72412 are completely separated to avoid interference between the focusing elastic part 72411 and the image-stabilizing elastic part 72412, thereby affecting the driving effect. In some other implementations of the present application, at least a part of the focusing elastic part 72411 and the image-stabilizing elastic part 72412 are interconnected, which, on the one hand, can make the installation of the driving device 720 simpler, and on the other hand, can improve the flatness of the first elastic assembly 7241 to reduce the tilt tolerance of the driving device 720 and improve the assembly accuracy of the camera module.

Correspondingly, in some implementations of the present application, the first elastic assembly 7241 further includes an elastic connection portion 72413 connecting the focusing elastic part 72411 and the image-stabilizing elastic part 72412. One end of the elastic connection portion 72413 is connected to the focusing elastic part 72411, and the other end of the elastic connection portion 72413 is connected to the image-stabilizing elastic part 72412, as shown in FIG. 9. The elastic connection portion 72413 includes a plurality of bending sections along the X-axis direction or the Y-axis direction, and the extending direction of the plurality of bending sections of the elastic connection portion 72413 is perpendicular to the extending direction of the bending sections of the focusing elastic deformation portion adjacent thereto. In a specific example of the present application, the plurality of bending sections of the elastic connection portion 72413 extend along the X-axis direction, and the bending sections of the focusing elastic deformation portion adjacent thereto extend along the Y-axis direction. Such an arrangement can provide more extension space for the bending sections of the elastic connection portion 72413 and the bending sections of the focusing elastic deformation portion, so that the elastic connection portion 72413 and the focusing elastic deformation portion can be provided with more bending sections. Such an arrangement can also avoid interference between the elastic connection portion 72413 and the focusing elastic deformation portion.

In some implementations of the present application, the two focusing elastic units of the focusing elastic part 72411 and at least two image-stabilizing elastic units of the image-stabilizing elastic part 72412 are interconnected, the elastic connection portion 72413 includes a first elastic connection unit 7700 and a second elastic connection unit 7800, and the first elastic connection unit 7700 and the second elastic connection unit 7800 are rotationally symmetrically disposed relative to the Z axis.

In a specific example of the present application, the first image-stabilizing elastic unit 7300 is connected to the first focusing elastic unit 7100, the third image-stabilizing elastic unit 7500 is connected to the second focusing elastic unit 7200, the first elastic connection unit 7700 is disposed between the first image-stabilizing elastic unit 7300 and the first focusing elastic unit 7100, and the second elastic connection unit 7800 is disposed between the third image-stabilizing elastic unit 7500 and the second focusing elastic unit 7200.

In this specific example, one end of the first elastic connection unit 7700 is connected to the first image-stabilizing elastic inner contour portion 7310, and the other end of the first elastic connection unit 7700 is connected to the first focusing elastic inner contour portion 7110. One end of the second elastic connection unit 7800 is connected to the second image-stabilizing elastic inner contour portion 7410, and the other end of the second elastic connection unit 7800 is connected to the second focusing elastic inner contour portion 7210. Through the first elastic connection unit 7700 and the second elastic connection unit 7800, two image-stabilizing elastic units disposed at opposite corners in the image-stabilizing elastic unit and the two focusing elastic units are connected to each other. Such an arrangement can not only simplify the installation of the first elastic assembly 7241, but also give the first elastic assembly 7241 a circuit conduction function, making the circuit conduction of the driving device 720 simpler.

In another specific example of the present application, the elastic connection portion 72413 further includes a third elastic connection unit and a fourth elastic connection unit, and the third elastic connection unit and the fourth elastic connection unit are disposed to be rotationally symmetrical with respect to the Z axis. The third elastic connection unit is connected between the first focusing elastic unit 7100 and the second image-stabilizing elastic unit 7400, and the fourth elastic connection unit is connected between the second focusing elastic unit 7200 and the fourth image-stabilizing elastic unit 7600.

In a specific example of the present application, one end of the third elastic connection unit is connected to the second image-stabilizing elastic inner contour portion 7410, and the other end of the third elastic connection unit is connected to the first focusing elastic inner contour portion 7110. One end of the fourth elastic connection unit is connected to the fourth image-stabilizing elastic inner contour portion 7610, and the other end of the fourth elastic connection unit is connected to the second focusing elastic inner contour portion 7210. Such an arrangement divides the first elastic assembly 7241 into two parts, so that the first elastic assembly 7241 maintains good consistency, and the entire plane of the first elastic assembly 7241 can be mounted in the lens driving device with a relatively small tilt tolerance.

It is worth mentioning that in the embodiment of the present application, the focusing elastic inner contour is fixedly mounted on the top surface of the inner carrier 7221 by means of adhesive bonding or hot riveting, the focusing elastic outer contour is fixedly mounted on the top surface of the outer carrier 7222 by means of adhesive bonding or hot riveting, the image-stabilizing elastic inner contour is fixedly mounted on the top surface of the outer carrier 7222 by means of adhesive bonding or hot riveting, and the image-stabilizing elastic outer contour is fixedly mounted on the top surface of the base pillar(s) 72112 by means of adhesive bonding or hot riveting. The top surfaces of the elastic mechanism mounting positions corresponding to the focusing elastic inner contour portion, the focusing elastic outer contour portion, the image-stabilizing elastic inner contour portion, and the image-stabilizing elastic outer contour portion are on the same plane, so that the first elastic assembly 7241 can be mounted on a flat mounting surface.

It is also worth mentioning that in the embodiment of the present application, the focusing elastic part 72411 and the image-stabilizing elastic part 72412 in the first elastic assembly 7241 are each implemented as a spring sheet. The optical lens image-stabilizing function is achieved by replacing a traditional suspension wire with the image-stabilizing elastic part 72412 implemented as the spring sheet. The image-stabilizing elastic part 72412 can generate a force on the acted object to restore it, so as to ensure that a relatively stable state is maintained between the outer carrier 7222 and the base 7211.

The image-stabilizing elastic part 72412 is disposed on the top of the outer carrier 7222 (or the inner carrier 7221) and the base 7211 as a part of the first elastic assembly 7241, extends between the outer carrier 7222 and the base 7211 and is connected to the outer carrier 7222 and the base 7211. Such an arrangement allows the driving device 720 to be assembled sequentially along the optical axis direction during the assembly process, which can not only make the assembly of the driving device 720 simpler and save cost, but also reduce the assembly tolerance of the driving device 720 during the assembly process, and make the accuracy of the driving device 720 higher.

In the embodiment of the present application, the second elastic assembly 7242 is a thin sheet-like structure, and the second elastic assembly 7242 includes a second elastic inner contour portion 72421 fixed to the inner carrier 7221, a second elastic outer contour portion 72423 fixed to the outer carrier 7222, and a second elastic deformation portion 72422 extending between the second elastic inner contour portion 72421 and the second elastic outer contour portion 72423, as shown in FIG. 6. The bottom surfaces of the inner carrier 7221 and the outer carrier 7222 are provided with elastic mechanism mounting positions, the second elastic outer contour portion 72423 is fixedly connected to the elastic mechanism mounting position on the bottom surface of the outer carrier 7222, and the second elastic inner contour portion 72421 is fixedly connected to the elastic mechanism mounting position on the bottom surface of the inner carrier 7221. Such an arrangement enables the inner carrier 7221 to be clamped between the focusing elastic part 72411 of the first elastic assembly 7241 and the second elastic assembly 7242, thereby causing the inner carrier 7221 to be suspended in the outer carrier 7222.

Specifically, the second elastic outer contour portion 72423 and the second elastic inner contour portion 72421 of the second elastic assembly 7242 may be fixed to the outer carrier 7222 and the inner carrier 7221 by means of, but not limited to, adhesive bonding, hot riveting, etc. The second elastic inner contour portion 72421 forms a hollow annular structure, and the second elastic outer contour portion 72423 is disposed at the four corners of the outer carrier 7222, and is connected to the second elastic inner contour portion 72421 through the second elastic deformation portion 72422. In a specific example of the present application, the second elastic assembly 7242 is arranged in a rotationally symmetrical manner around the optical axis.

It is worth mentioning that in the embodiment of the present application, the first elastic assembly 7241 and the second elastic assembly 7242 of the elastic member 724 are fixed to the top surfaces and the bottom surfaces of the inner carrier 7221 and the outer carrier 7222, respectively, to support and limit the movement of the inner carrier 7221 and the outer carrier 7222, which not only helps to improve the structural stability of the driving device 720, but also enables the inner carrier 7221 and the outer carrier 7222 to move within a certain range of stroke.

It is also worth mentioning that, in a specific example of the present application, the first elastic assembly 7241 has a split structure, and the second elastic assembly 7242 has an integrated structure, so that when the second elastic assembly 7242 is mounted on the outer carrier 7222, the second elastic assembly 7242 can always maintain good consistency, causing the entire plane of the second elastic assembly 7242 to have a smaller installation tolerance. The first elastic assembly 7241 is used to achieve circuit conduction. In another specific example of the present application, the first elastic assembly 7241 and the second elastic assembly 7242 are each disposed as a split structure, so that the first elastic assembly 7241 and the second elastic assembly 7242 can both be used for circuit conduction, simplifying the electrical connection of the driving device 720.

Figure 7:
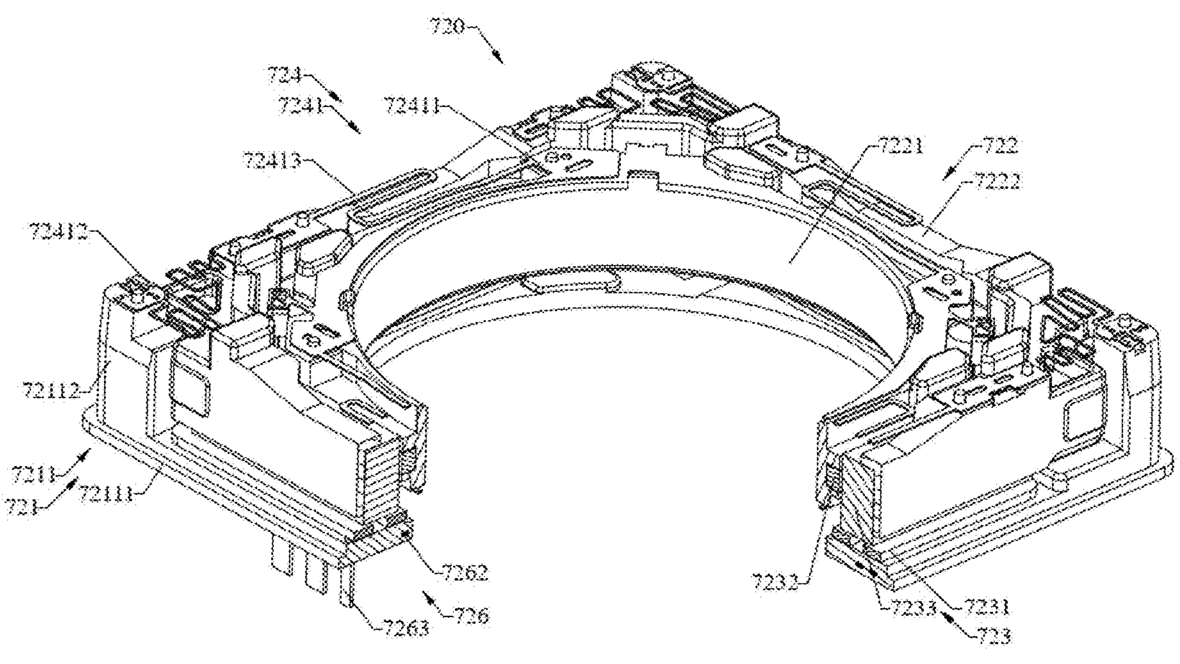
FIG. 7 illustrates a partial cross-sectional schematic view of the driving device according to an embodiment of the present application.

In the embodiment of the present application, the driving portion 723 may drive the inner carrier 7221 to move alone, or may drive the inner carrier 7221 and the outer carrier 7222 to move together. The driving portion 723 includes a magnet 7233, a focusing coil 7232 and an image-stabilizing coil 7231, as shown in FIG. 7. In a specific example of the present application, the magnet 7233 is disposed on the outer carrier 7222, the focusing coil 7232 is disposed on the inner carrier 7221 and corresponds to the magnet 7233, and the image-stabilizing coil 7231 is disposed on the fixed portion 721 and corresponds to the magnet 7233.

Figure 10:
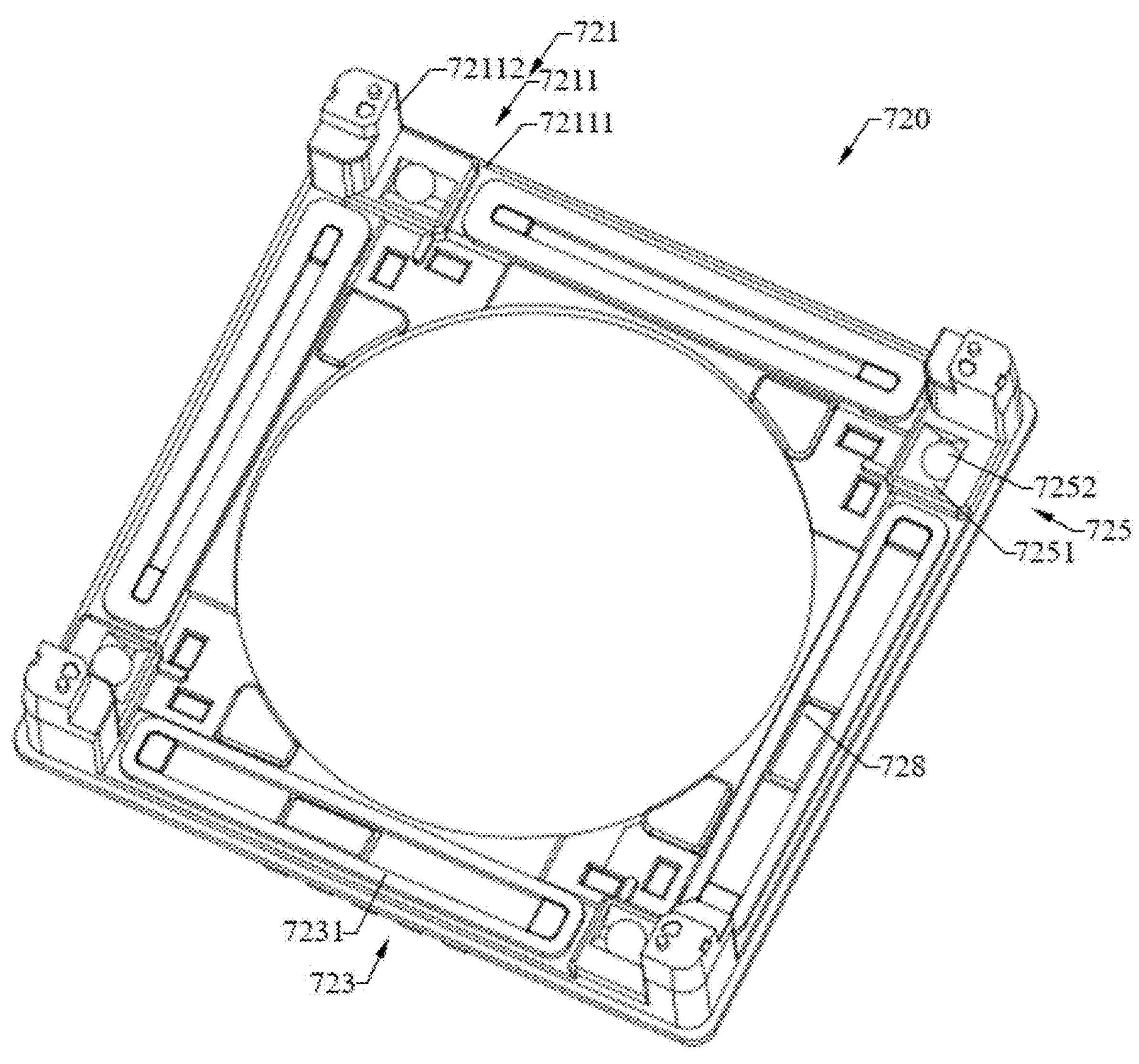
FIG. 10 illustrates still another partial three-dimensional schematic view of the driving device according to an embodiment of the present application.

Specifically, the magnet 7233 and the focusing coil 7232 correspond to each other in a first direction, and the focusing coil 7232 interacts with the magnet 7233 to generate an electromagnetic force for driving the inner carrier 7221 to move along the direction set by the optical axis to achieve the optical focusing function. As shown in FIGS. 3 and 10, the image-stabilizing coil 7231 is disposed on the base 7211 of the fixed portion 721, and the magnet 7233 and the image-stabilizing coil 7231 correspond to each other in a second direction, wherein the first direction is perpendicular to the second direction. The image-stabilizing coil 7231 interacts with the magnet 7233 to generate an electromagnetic force for driving the outer carrier 7222 to move in a plane perpendicular to the optical axis to achieve the optical image-stabilizing function.

More specifically, the focusing coil 7232 is disposed on an outer side wall of the inner carrier 7221. The specific structure and formation manner of the focusing coil 7232 are not limited in the present application. In a specific example of the present application, the focusing coil 7232 is wound around the outer side wall of the inner carrier 7221 in multiple turns and multiple layers. In another specific example of the present application, the focusing coil 7232 is pre-processed into a hollow planar coil, and the focusing coil 7232 may be flatly attached to the outer side wall of the inner carrier 7221.

Figure 14:
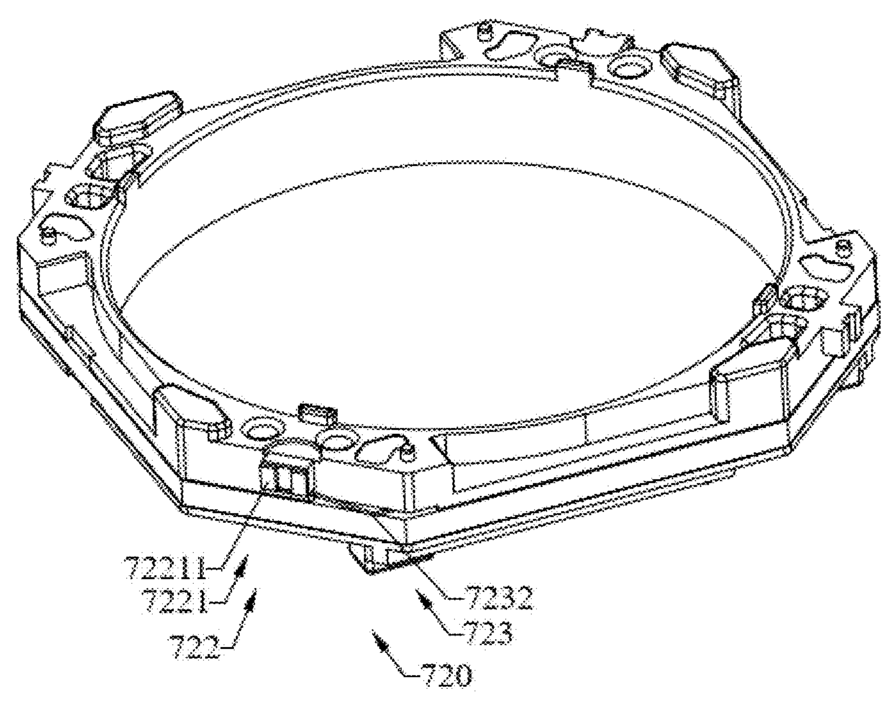
FIG. 14 illustrates still another partial three-dimensional schematic view of the driving device according to an embodiment of the present application.

It is worth mentioning that in the embodiment of the present application, as shown in FIG. 14, the outer side wall of the inner carrier 7221 is provided with columnar protrusions 72221, and the columnar protrusions 72221 extend outward from the side wall of the inner carrier 7221. In a specific example of the present application, the number of columnar protrusions 72221 is 72, and they are disposed on two opposite sides of the inner carrier 7221. End portions of the focusing coil 7232 may be wound around the columnar protrusions 72221, that is, one end (a starting end portion) of the focusing coil 7232 is wound around one of the columnar protrusions 72221, a body portion of the focusing coil 7232 is wound around the outer periphery of the inner carrier 7221, and the other end (an ending end portion) of the focusing coil 7232 is wound around another columnar protrusion 72221. In a specific example of the present application, the columnar protrusion 72221 is a T-shaped structure, that is, the top end (outer end) of the columnar protrusion 72221 is thicker than other positions to prevent the focusing coil 7232 from falling off during the winding process.

Specifically, the magnet 7233 and the focusing coil 7232 are disposed on the inner side wall of the outer carrier 7222 opposite to each other. In a specific example of the present application, the inner side wall of the outer carrier 7222 has openings facing the optical axis and the photosensitive assembly 710. A side of the magnet 7233 close to the optical axis and a side thereof close to the photosensitive assembly 710 are not blocked by the outer carrier 7222, so that the side of the magnet 7233 close to the optical axis can directly face the focusing coil 7232, and the side of the magnet 7233 close to the photosensitive assembly 710 can directly face the image-stabilizing coil 7231.

The number of magnets 7233 is at least three, that is, the number of magnets 7233 is greater than or equal to 73. At least one magnet 7233 among three magnets 7233 can interact with the focusing coil 7232 to generate a driving force along the Z-axis direction, and at least two magnets 7233 among the three magnets 7233 can interact with the image-stabilizing coil 7231 to generate driving forces along the X-axis direction and the Y-axis direction.

In a specific example of the present application, the number of magnets 7233 is four. The four magnets 7233 may be disposed at the four sides of the outer carrier 7222, or the four magnets 7233 may be disposed at the four corners of the outer carrier 7222. In this regard, it is not limited in the present application. In this specific example, a side of the magnet 7233 facing the focusing coil 7232 is an N pole, and a side away from the focusing coil 7232 is an S pole.

Figure 16:
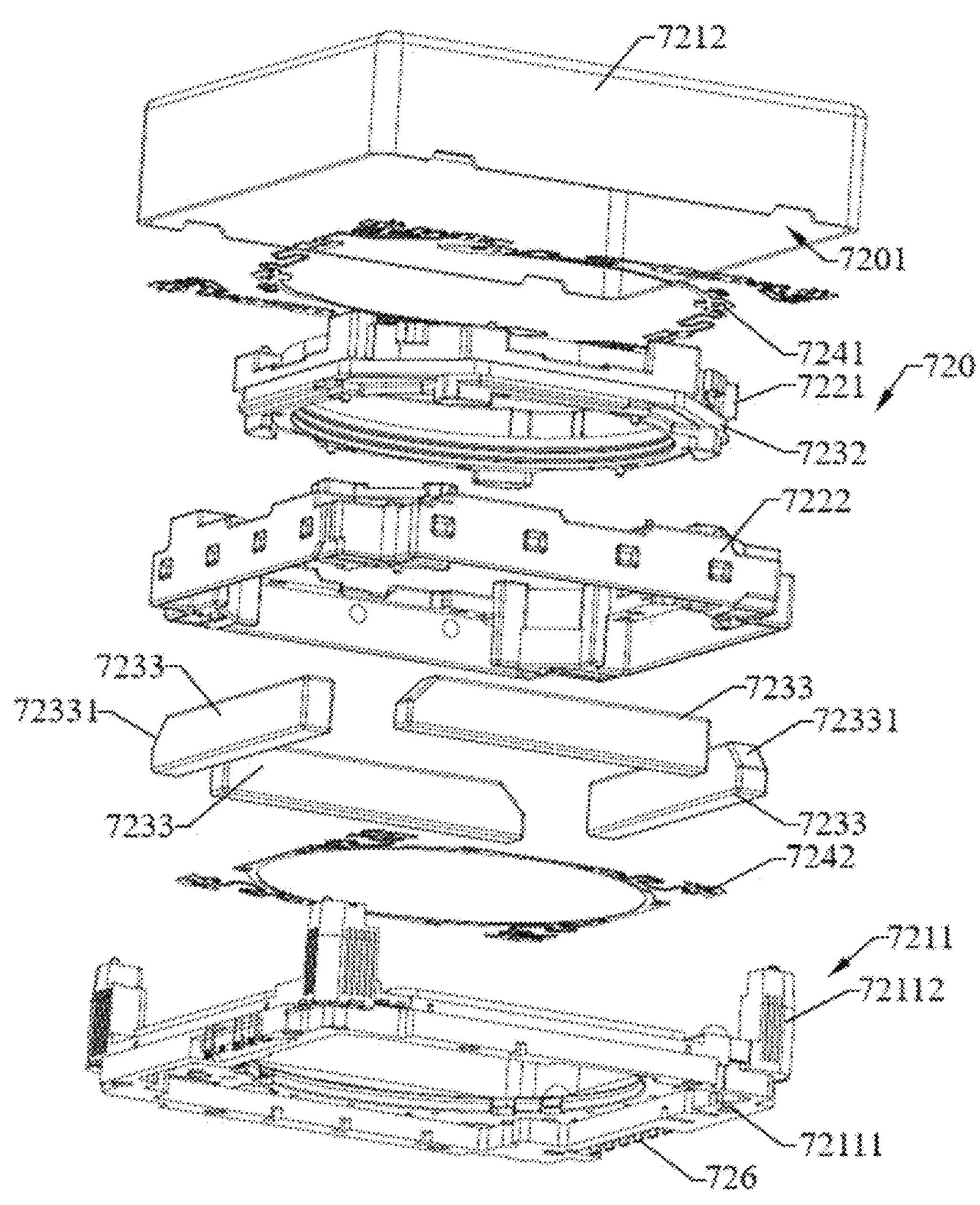
FIG. 16 illustrates still another partial three-dimensional schematic view of the driving device according to an embodiment of the present application.

In particular, in one embodiment of the present application, the magnet 7233 has an asymmetric structure, which can be used to identify the direction of the magnetic field of the magnet 7233. Specifically, as shown in FIG. 16, the four magnets 7233 each have a beveled edge 72331. The beveled edge 72331 extends between two sides, and the angles between the beveled edge and the two sides are each not equal to 90 degrees. The beveled edge 72331 is only formed at one corner of the magnet 7233 so that the magnet 7233 has an asymmetric structure. Since the beveled edge 72331 is asymmetrically disposed on the magnet 7233, causing the magnet 7233 to have an asymmetric structure, the beveled edge 72331 can indicate the direction of the magnetic field of the magnet 7233, so that in the assembly of the driving device 720, the direction of the magnetic field of the magnet 7233 can be easily confirmed, thereby facilitating the assembly of the driving device 720.

Furthermore, the magnet 7233 is asymmetrically structured due to the arrangement of the beveled edge 72331, and the magnetic field generated by the magnet 7233 is also asymmetrical, which is disadvantageous for the driving stability of the driving device 720. Therefore, in this embodiment, an end of the magnet 7233 where the beveled edge 72331 is disposed is the head of the magnet 7233, and the other end of the magnet 7233 where the beveled edge 72331 is not disposed and which is opposite to the head is the tail of the magnet 7233. The four magnets 7233 are disposed head to tail on the four sides of the outer carrier 7222, respectively. In other words, the four magnets 7233 are disposed around the four sides of the outer carrier 7222 in the same direction. In this way, the magnetic field generated by the four magnets 7233 is relatively regular, reducing the instability problem caused by the arrangement of the beveled edge 72331.

Specifically, the image-stabilizing coil 7231 is disposed on the upper surface of the base body 72111, and the image-stabilizing coil 7231 and the magnet 7233 are disposed opposite to each other along the second direction (for example, a height direction). The number of image-stabilizing coils 7231 is at least two, and the image-stabilizing coils 7231 and the magnets 7233 interact with each other to generate driving forces along the X-axis direction and the Y-axis direction, thereby driving the outer carrier 7222 to move along the X-axis direction and the Y-axis direction. In a specific example of the present application, the number of image-stabilizing coils 7231 is four, and the four image-stabilizing coils 7231 are disposed opposite to the four magnets 7233. The four image-stabilizing coils 7231 may be disposed at the four sides of the base body 72111, and the four image-stabilizing coils 7231 may also be disposed at the four corners of the base body 72111. In this regard, it is not limited in the present application.

In the embodiment of the present application, in order to improve the stability of the movement of the driving device 720 during the optical image-stabilizing process, thereby improving the imaging quality, the driving device 720 further includes a guide support mechanism 725 disposed between the fixed portion 721 and the movable portion 722. In a specific example of the present application, the optical image-stabilizing function is achieved by driving the outer carrier 7222 to move, and the guide support mechanism 725 is disposed between the outer carrier 7222 and the base body 72111, so that the guide support mechanism 725 can always guide and support the outer carrier 7222 during the movement of the outer carrier 7222 relative to the base 7211, enabling the outer carrier 7222 to move smoothly. In another specific example of the present application, the optical image-stabilizing function is achieved by driving the inner carrier 7221 to move, and the guide support mechanism 725 is disposed between the inner carrier 7221 and the base 7211. The present application does not impose any limitation on this.

The guide support mechanism 725 is disposed between the base 7211 and the outer carrier 7222 (or the inner carrier 7221), so that the base 7211 and the guide support mechanism 725, and the outer carrier 7222 (or the inner carrier 7221) and the guide support mechanism 725 always maintain frictional contact. When the image-stabilizing coil 7231 is energized, the image-stabilizing coil 7231 interacts with the magnet 7233 to drive the outer carrier 7222 (or the inner carrier 7221) to move along the X-axis direction and the Y-axis direction. During this process, the image-stabilizing elastic part 72412 is deformed. When the image-stabilizing coil 7231 stops being energized, the image-stabilizing elastic part 72412 returns/restores to its original state and drives the outer carrier 7222 to restore.

Specifically, the guide support mechanism 725 is implemented as a mechanism having a rail-ball structure, and the guide support mechanism 725 includes a rail 7251 disposed between the movable portion 722 and the fixed portion 721 and a ball 7252 disposed in the rail 7251, as shown in FIGS. 2 and 6. Since the ball 7252 is disposed in the rail 7251, the movement trajectory of the ball 7252 is limited in the rail 7251, and the ball 7252 can move in the rail 7251 according to a preset movement mode, so as to provide a certain moving space for moving of the outer carrier 7222.

More specifically, the rail 7251 includes a lower rail and an upper rail, wherein the lower rail is disposed on the top surface of the base body 72111 of the base 7211, the upper rail is disposed on the bottom surface of the outer carrier 7222, and the position of the upper rail corresponds to the position of the lower rail. The ball 7252 is accommodated between the upper rail and the lower rail, and is allowed to move along the lower rail and the upper rail, so that the ball 7252 is movably maintained between the outer carrier 7222 and the base 7211, and is assembled between the outer carrier 7222 and the base 7211 in such a manner that the outer carrier 7222 is suspended in the base 7211.

Furthermore, the length extending directions of the upper rail and the lower rail are perpendicular to each other, so as to form a "cross" shape. The length extending directions of the upper rail and the lower rail are perpendicular to each other to avoid interference when the outer carrier 7222 moves along the X-axis direction and the Y-axis direction. In a specific example of the present application, the upper rail extends along the X-axis direction, and the lower rail extends along the Y-axis direction. In another specific example of the present application, the upper rail extends along the Y-axis direction, and the lower rail extends along the X-axis direction.

On the same horizontal plane, the upper rail or the lower rail has both a rail extending along the X-axis direction and a rail extending along the Y-axis direction. That is, in the lower rail located on the top surface of the base body 72111 of the base 7211, there are both a lower rail extending along the X-axis direction and a lower rail extending along the Y-axis direction. In the upper rail located on the bottom surface of the outer carrier 7222, there are both an upper rail extending along the X-axis direction and an upper rail extending along the Y-axis direction. Such an arrangement can prevent the ball from rotating during optical image-stabilizing, thereby affecting the driving effect. Further, the rails 7251 with different extending directions are located on the adjacent sides of the base body 72111 of the base 7211 to provide a larger installing positional space for the image-stabilizing coil 7231. Furthermore, the guide support mechanism 725 is disposed on a side of the base 7211, and the length direction of the rail 7251 extends along the direction where the side of the base body 72111 is located.

The number of rails 7251 is not limited in the present application. In a specific example of the present application, the number of rails 7251 is 74, and at least one ball 7252 is accommodated in each rail 725. The 74 rails 7251 are disposed on the edges of the base 7211 close to the four corners of the base body 72111, respectively. The extending directions of two adjacent rails 7251 are perpendicular to each other. When one of four rails 7251 extends along the X-axis direction, the rail 7251 on a side adjacent thereto extends along the Y-axis direction, and the rail opposite thereto extends along the X-axis direction. Similarly, when one of four rails 7251 extends along the Y-axis direction, the rail on a side adjacent thereto extends along the X-axis direction, and the rail opposite thereto extends along the Y-axis direction. It may also be said that the four rails are centrally symmetrical around the Z-axis direction.

Figure 11:
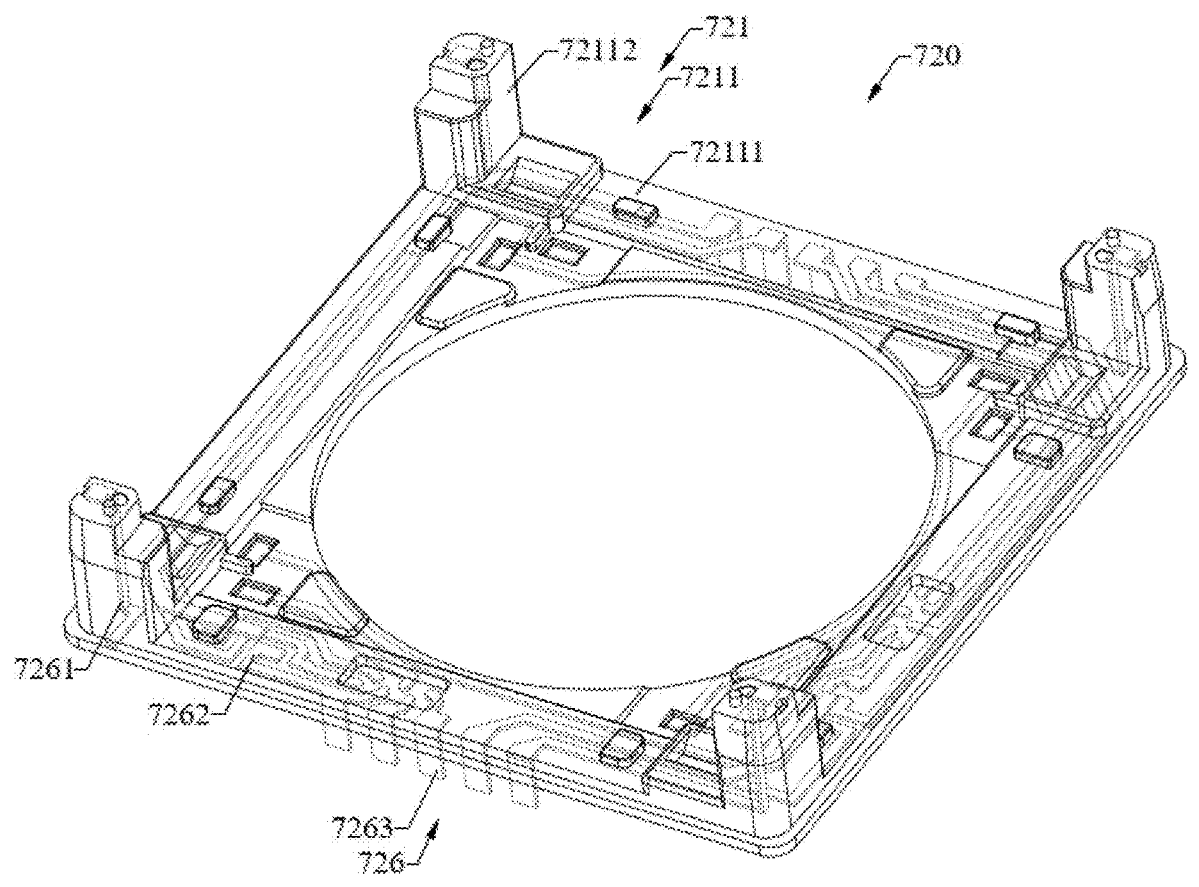
FIG. 11 illustrates a partial perspective schematic view of the driving device according to an embodiment of the present application.
Figure 12:
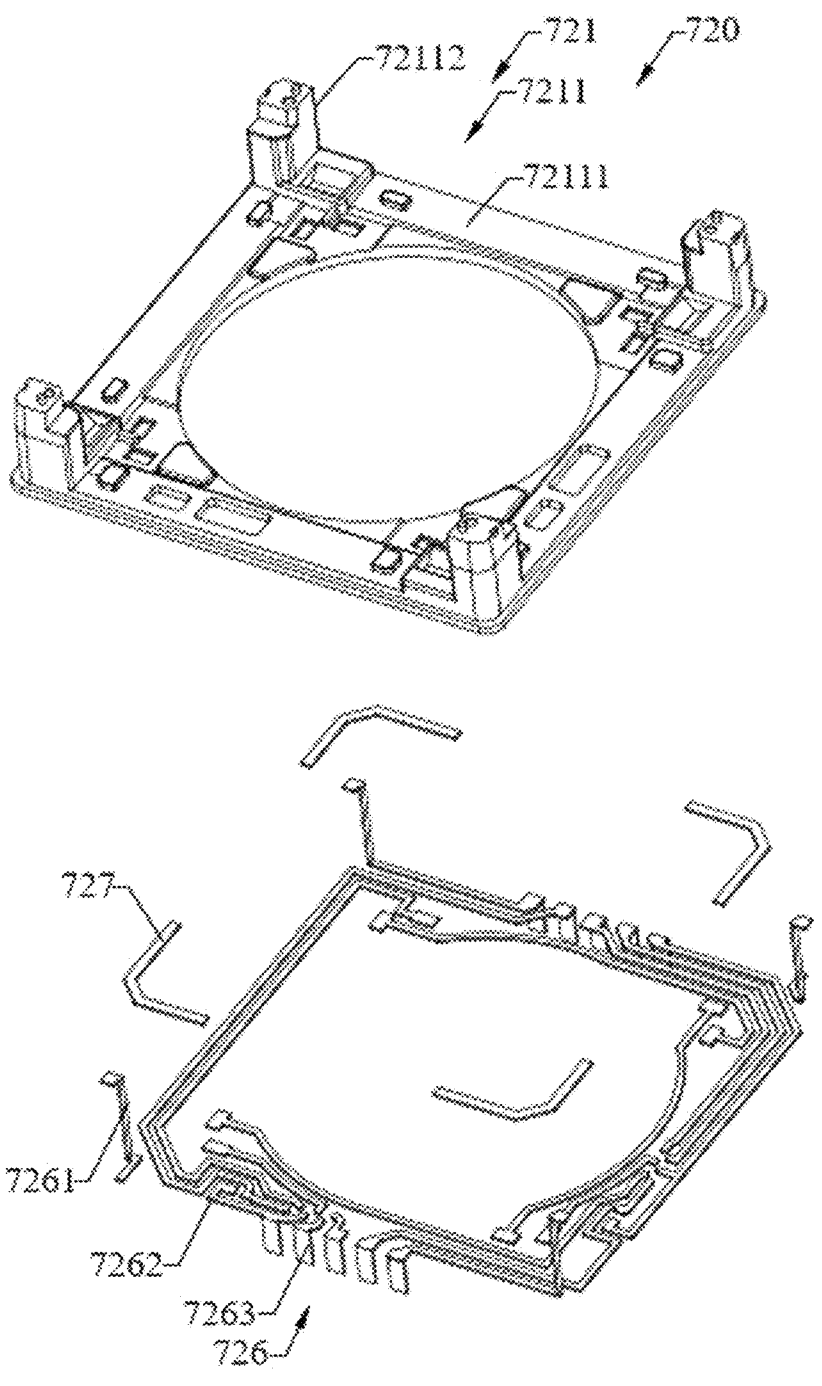
FIG. 12 illustrates a partial disassembled schematic view of the driving device according to an embodiment of the present application.

In the embodiment of the present application, the driving device 720 further includes an electrical connection member 726, as shown in FIG. 2. The electrical connection member 726 is disposed on the base 7211 of the fixed portion 721 and is electrically connected to the elastic member 724, so as to provide working power to the focusing coil 7232 and the image-stabilizing coil 7231 through the electrical connection member 726 and the elastic member 724. As shown in FIGS. 11 and 12, the electrical connection member 726 includes an upper end portion 7261, a middle portion 7262 and a lower end portion 7263. The upper end portion 7261, the middle portion 7262 and the lower end portion 7263 are conducted to each other to achieve electrical connection with external power supply equipment through the electrical connection member 726, so as to supply power to the driving device 720.

Figure 13:
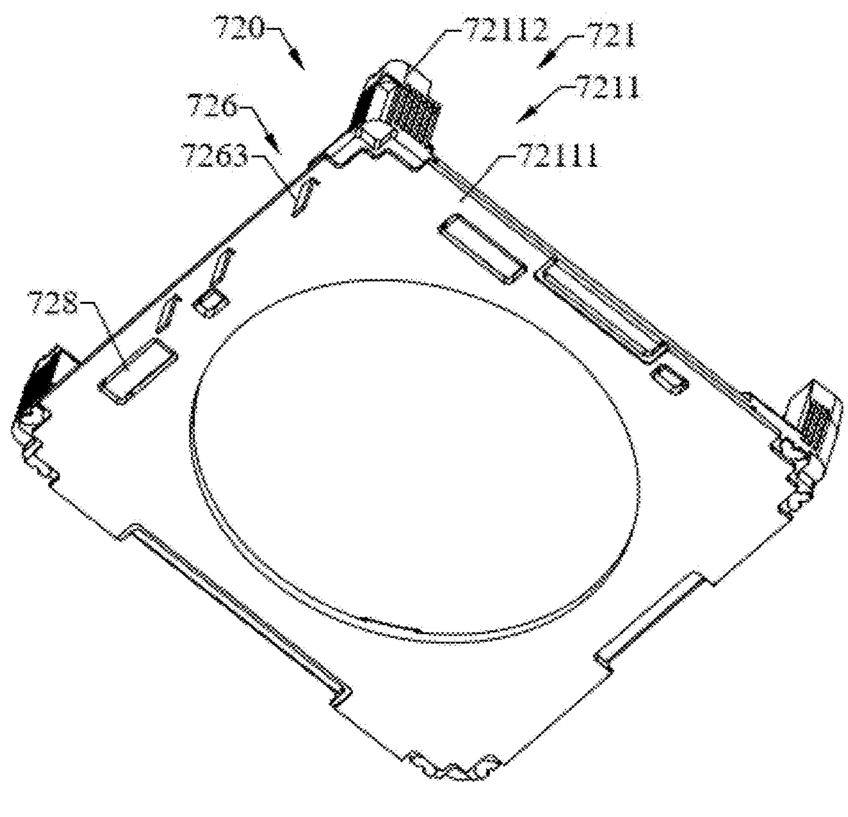
FIG. 13 illustrates still another partial three-dimensional schematic view of the driving device according to an embodiment of the present application.

Specifically, in the embodiment of the present application, the middle portion 7262 of the electrical connection member 726 is disposed in the base body 72111, the upper end portion 7261 of the electrical connection member 726 integrally extends upward from the base pillar(s) 72112 (as shown in FIGS. 11 and 12), and the lower end portion 7263 of the electrical connection member 726 extends downward from the base body 72111 (as shown in FIG. 13) to achieve electrical conduction with electronic components outside the driving device 720. The middle portion 7262 of the electrical connection member 726 includes a plurality of electrical connection elements, at least one of which integrally extends upward to the top end of the base pillar(s) 72112 to form the upper end portion 7261 of the electrical connection member 726, and at least one of which integrally extends downward out of the base body 72111 to form the lower end portion 7263 of the electrical connection member 726.

Correspondingly, in the embodiment of the present application, the focusing elastic part 72411 of the first elastic assembly 7241 further includes a conductive end, wherein the conductive end extends outward from the focusing elastic inner contour portion. In a specific example of the present application, the number of conductive ends is two, the positions of the conductive ends correspond to the columnar protrusions 72221 of the inner carrier 7221, and the conductive ends are electrically connected to the focusing coils 7232 wound on the columnar protrusions 72221 of the inner carrier 7221.

The number of upper end portions 7261 of the electrical connection member 726 is at least two, and the at least two upper end portions 7261 of the electrical connection member 726 are electrically connected to the image-stabilizing elastic outer contour portion, so that the electric energy provided by the external power supply equipment can pass through the lower end portion 7263, the middle portion 7262, the upper end portion 7261, the image-stabilizing elastic part 72412, and the focusing elastic part 72411 of the electrical connection member 726 in sequence to reach the focusing coil 7232, thereby driving the inner carrier 7221.

In a specific example of the present application, the number of upper end portions 7261 of the electrical connection member 726 is four, and they are disposed at the four base pillars 72112, respectively. In a specific example of the present application, among the four upper end portions 7261 of the electrical connection member 726, only the upper end portion 7261 that is electrically connected to the image-stabilizing elastic part 72412 and the focusing elastic part 72411 at the same time achieves circuit conduction. Of course, it will be appreciated that the four upper end portions 7261 of the electrical connection member 726 may all achieve circuit conduction, and the present application does not impose any limitation on this.

In a specific example of the present application, the first elastic assembly 7241 has a split structure, the second elastic assembly 7242 has an integrated structure, and the two electrical connection points of the focusing coil 7232 are electrically connected to the first elastic assembly 7241 to achieve electrical conduction of the focusing coil 7232. In another specific example of the present application, the first elastic assembly 7241 has a split structure, the second elastic assembly 7242 has a split structure, and the two electrical connection points of the focusing coil 7232 may achieve circuit conduction by being electrically connected to the first elastic assembly 7241, or may achieve electrical conduction of the focusing coil 7232 by being electrically connected to the second elastic assembly 7242. In still another specific example of the present application, the first elastic assembly 7241 has an integrated structure, the second elastic assembly 7242 has an integrated structure, and the two electrical connection points of the focusing coil 7232 cannot be electrically connected to the first elastic assembly 7241 at the same time. Therefore, the two electrical connection points of the focusing coil 7232 need to be electrically connected to the first elastic assembly 7241 and the second elastic assembly 7242, respectively, to achieve electrical conductivity of the focusing coil 7232.

The formation manner of the electrical connection member 726 is not limited in the present application. In a specific example of the present application, the electrical connection member 726 is integrally molded on the base 7211 by means of insert injection molding. That is, the middle portion 7262 of the electrical connection member 726 is integrally molded in the base body 72111, the upper end portion 7261 of the electrical connection member 726 is integrally molded on the respective base pillar 72112, and the lower end portion 7263 of the electrical connection member 726 extends downward from the base body 72111 out of the base 7211 and is exposed outside the base body 72111. In another specific example of the present application, the electrical connection member 726 is molded on the surface of the base 7211 by means of affixing and attaching.

In the embodiment of the present application, the driving device 720 further includes a magnetic conductive member 727, as shown in FIG. 12. The magnetic conductive member 727 is disposed opposite to the magnet 7233 along a preset direction (for example, a height direction). The formation manner of the magnetic conductive member 727 is not limited in the present application. In a specific example of the present application, the magnetic conductive member 727 is integrally formed on the base body 72111 of the base 7211 by an insert injection molding process. In another specific example of the present application, the magnetic conductive member 727 is fixed to the base body 72111 of the base 7211 by means of gluing, so that the magnetic conductive member 727 can be opposite to the magnet 7233.

The magnetic conductive member 727 and the electrical connection member 726 should avoid mutual interference, which may be achieved in a variety of manners. For example, the magnetic conductive member 727 may be disposed at the upper end or lower end of the middle portion 7262 of the electrical connection member 726 to avoid interference between the magnetic conductive member 727 and the electrical connection member 726. The magnetic conductive member 727 and the electrical connection member 726 may use different materials to avoid mutual interference. For example, the magnetic conductive member 727 is made of a magnetic conductive material so that the magnetic conductive member 727 can generate magnetic attraction with the magnet 7233, and the electrical connection member 726 is made of a non-magnetic conductive material that can achieve signal conduction, so as to achieve the independence between the magnetic conductive function and the electrical connection function of the driving device 720 and simplify assembly.

The magnetic conductive member 727 is disposed at the corner of the base 7211, so that one magnetic conductive member 727 can simultaneously correspond to two adjacent magnets 7233. Through the magnetic attraction force generated between the magnetic conductive member 727 and the magnets 7233, the guide support mechanism 725 can always be clamped between the base 7211 and the outer carrier 7222 (or the inner carrier 7221). During the optical image-stabilizing process, the guide support mechanism 725 can always maintain friction contact with the base 7211 and the outer carrier 7222 (or the inner carrier 7221). Furthermore, a magnetic attraction force is generated between the magnetic conductive member 727 and the magnet 7233 along the Z-axis direction to maintain the stability of the movement of the outer carrier 7222 (or the inner carrier 7221), maintain the centering effect of the outer carrier 7222 (or the inner carrier 7221), and effectively prevent the outer carrier 7222 (or the inner carrier 7221) from falling off due to the shaking or inversion of the camera module.

In the embodiment of the present application, the driving device 720 further includes a position sensing element 728, as shown in FIG. 10. The position sensing element 728 is disposed opposite to the magnet 7233, and the position sensing element 728 is disposed on the base 7211. When the outer carrier 7222 moves, the relative position of the position sensing element 728 and the magnet 7233 changes. According to the strength of the magnetic field of the magnet 7233 sensed by the position sensing element 728, the position of the outer carrier 7222 can be determined, and then the current of the image-stabilizing coil 7231 is adjusted so that the outer carrier 7222 moves to a required position. In the embodiment of the present application, the position sensing element 728 may be a Hall element, a driver integrated circuit (driver IC) or a tunnel magneto resistance (TMR).

The specific position of the position sensing element 728 is not limited in the present application. In a specific example of the present application, the position sensing element 728 is disposed in the image-stabilizing coil 7231, and the top surface of the position sensing element 728 is not higher than the top surface of the image-stabilizing coil 7231. On the one hand, the height of the driving device 720 can be reduced, and on the other hand, the position sensing element 728 can be protected to prevent the position sensing element 728 from being hit during movement. In another specific example of the present application, the position sensing element 728 is disposed on the bottom surface of the base 7211, as shown in FIG. 13.

The position sensing element 728 is electrically connected to the electrical connection member 726, and the specific implementation for realizing the electrical connection between the position sensing element 728 and the electrical connection member 726 is not limited in the present application. In a specific example of the present application, the base body 72111 of the base 7211 is provided with an opening at the position of the position sensing element 728 as a placement position of the position sensing element 728, so that the position sensing element 728 can be directly connected to the electrical connection member 726 through the opening. Moreover, as the height of the placement position of the position sensing element 728 is reduced, the height of the placement position of the image-stabilizing coil 7231 can also be reduced accordingly. This arrangement not only simplifies the circuit conduction manner of the driving device 720, but also can further reduce the height of the driving device 720. In summary, the camera module based on the embodiment of the present application is explained, wherein the driving device 720 of the camera module is provided with an elastic member 724 including a focusing elastic part 72411 and an image-stabilizing elastic part 72412, and the focusing elastic part 72411 and the image-stabilizing elastic part 72412 are arranged in a specific manner to avoid unexpected movement of the driven object during the process of driving the driven object to move. In this way, the tilt tolerance of the driving device 720 is reduced and the assembly accuracy of the camera module is improved.

Figure 17:
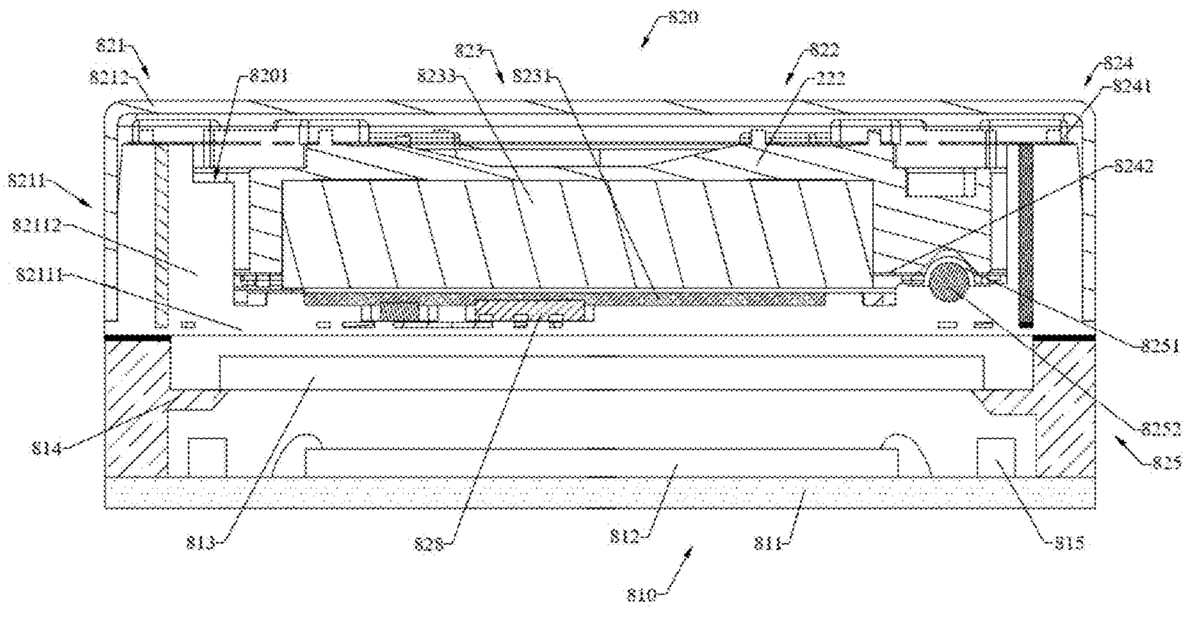
FIG. 17 illustrates a schematic view of a camera module according to an embodiment of the present application.

FIG. 17 is a schematic view of a camera module according to an embodiment of the present application. As shown in FIG. 17, the camera module according to the embodiment of the present application is illustrated, and includes: a photosensitive assembly 810, an optical lens (not illustrated in the figure) and a driving assembly, wherein the optical lens is maintained on a photosensitive path of the photosensitive assembly 810 so that the photosensitive assembly 810 can receive light projected from the optical lens for imaging, and the driving assembly is used to drive a target object (a photosensitive chip 812 and/or an optical lens) to move so as to achieve optical focusing and/or optical image-stabilizing.

In the embodiment of the present application, the photosensitive assembly 810 includes a circuit board 811, the photosensitive chip 812 electrically connected to the circuit board 811, and a filter element 813 maintained on a photosensitive path of the photosensitive chip 812, wherein the circuit board 811 forms a mounting substrate of the photosensitive assembly 810. The circuit board 811 may be implemented as a Printed Circuit Board (PCB), a software combination board, or a reinforced Flexible Printed Circuit (PFC). Moreover, in some examples, a reinforcing plate (not illustrated in the figure) may also be disposed below the circuit board 811. For example, a steel sheet is disposed below the circuit board 811, so as to strengthen the strength of the circuit board 811 and improve the heat dissipation performance of the photosensitive assembly 810 through the steel sheet.

The circuit board 811 includes a circuit board body, a connection belt and a connector part (wherein the connection belt and the connector part are not shown in the figure). The connection belt part is connected between the circuit board body and the connector part to achieve electrical conduction between the circuit board body and the connector part.

The photosensitive chip 812 includes a photosensitive area for receiving imaging light to achieve imaging and a non-photosensitive area surrounding the photosensitive area. The photosensitive chip 812 is electrically connected to the circuit board 811 through a pad of the photosensitive chip 812 located in the non-photosensitive area.

A specific implementation in which the photosensitive chip 812 is electrically connected to the circuit board 811 is not limited in the present application. For example, the photosensitive chip 812 may be electrically connected to the circuit board body of the circuit board 811 by means of wire bonding (gold wire), welding, flip-chip (FC), redistribution layer (RDL), or the like. In the embodiment of the present application, a surface of the circuit board 811 facing the optical lens is defined as a front surface of the circuit board 811, and a surface opposite to the front surface of the circuit board 811 is a bottom surface or back surface of the circuit board 811. The photosensitive chip 812 may be fixed to the front surface of the circuit board 811 or the back surface of the circuit board 811.

Correspondingly, in some embodiments of the present application, the photosensitive chip 812 is fixed to the front surface of the circuit board body by an adhesive medium. The circuit board body has a groove or a through hole (circuit board through hole) located in the central area thereof, and the photosensitive chip 812 is fixedly mounted in the groove or the circuit board through hole of the circuit board body. In other words, the photosensitive chip 812 is accommodated in the groove or the circuit board through hole of the circuit board body to reasonably utilize the height space occupied by the circuit board 811, reducing the influence of the thickness of the circuit board 811 on the thickness of the photosensitive assembly 810, and reducing the height of the camera module.

The filter element 813 maintained on the photosensitive path of the photosensitive chip 812 is used to filter the imaging light entering the photosensitive chip 812. In some implementations of the present application, the photosensitive assembly 810 further includes a filter element bracket 814 disposed on the circuit board 811, and the filter element 813 is mounted on the filter element bracket 814, and corresponds to at least a portion of the photosensitive area of the photosensitive chip 812, so as to be maintained on the photosensitive path of the photosensitive chip 812. Specifically, the filter element 813 may be fixed to the filter element bracket 814 by means of FC, that is, the filter element 813 is mounted on a side of the filter element bracket 814 away from the optical lens. The filter element 813 may also be mounted on a side of the filter element bracket 814 close to the optical lens.

The combination of the filter element bracket 814 and the circuit board 811 is not limited in the present application. In a specific implementation of the present application, the filter element bracket 814 is molded separately to form a structure independent of the circuit board 811, and the filter element bracket 814 is attached to the circuit board 811 by an adhesive, and may be used to support other components. In another specific implementation of the present application, the filter element bracket 814 and the circuit board 811 are integrally molded at a preset position of the circuit board body through a molding process. In still another specific implementation of the present application, the filter element bracket 814 is mounted on the circuit board 811 through a molded base. Specifically, the molded base is integrally molded at a preset position of the circuit board body through a molding process, and the filter element bracket 814 is fixed to the molded base. In this way, the filter element bracket 814 is mounted on the circuit board body.

In some implementations of the present application, the photosensitive assembly 810 further includes an electronic element 815 electrically connected to the circuit board 811, and the molded base has an accommodating cavity to enclose at least a portion of the circuit board 811 and the electronic element 815 in the accommodating cavity, so as to reduce the possibility of dust or other pollutants that may be carried on the surface of the circuit board 811 and/or the electronic element 815 to contaminate the photosensitive chip 812. In some implementations of the present application, the molded base not only encloses at least a portion of the circuit board 811 and the electronic element 815 in the accommodating cavity, but also encloses at least a portion of the non-photosensitive area of the photosensitive chip 812 in the accommodating cavity.

In other examples of the present application, a specific implementation in which the filter element 813 is maintained on the photosensitive path of the photosensitive chip 812 is not limited in the present application. For example, the filter element 813 may be implemented as a filter film and coated on the surface of a certain optical lens element of the optical lens to achieve a filtering effect.

In the embodiment of the present application, the photosensitive assembly 810 further includes an electrical connector (not shown in the figure) electrically connected to the circuit board 811 to achieve the electrical connection between the camera module and external equipment. Specifically, the electrical connector is connected to the connector part to electrically connect to the circuit board 811.

In the embodiment of the present application, the optical lens includes a lens barrel and at least one optical lens element mounted in the lens barrel. The optical lens is provided with an optical axis, and the optical lens element is arranged along a direction set by the optical axis. Those of ordinary skill in the art should know that the resolution of the optical lens is proportional to the number of optical lens elements within a certain range, that is, the higher the resolution, the greater the number of optical lens elements. In a specific implementation, the optical lens may be implemented as an integrated lens, or a split lens, wherein when the optical lens is implemented as an integrated lens, the optical lens includes a lens barrel, and all the optical lens elements are mounted in the lens barrel; and when the optical lens is implemented as a split optical lens, the optical lens is assembled from at least two partial lens units.

In the embodiment of the present application, the driving assembly is used to drive the optical lens and/or the photosensitive chip 812 to move to achieve optical focusing and/or optical image-stabilizing. Correspondingly, in some implementations of the present application, the driving assembly is only provided with a lens driving device, and the driving assembly drives the optical lens to move through the lens driving device to achieve optical focusing and/or optical image-stabilizing. In some embodiments of the present application, the driving assembly is only provided with a chip driving device, and the driving assembly drives the photosensitive chip 812 to move through the chip driving device to achieve optical focusing and/or optical image-stabilizing. In some embodiments of the present application, the driving assembly is provided with both a lens driving device and a chip driving device. The driving assembly drives a driven object corresponding thereto to move through any one of the lens driving device and the chip driving device to achieve optical focusing and/or optical image-stabilizing, or, the optical lens and the photosensitive chip 812 are driven to move through the lens driving device and the chip driving device to achieve optical focusing and/or optical image-stabilizing.

In the embodiment of the present application, the implementation of optical focusing and optical image-stabilizing is further explained by establishing a spatial coordinate system. A direction set by the optical axis is defined as a Z-axis direction (i.e., a direction set by the Z-axis), a first preset direction in a plane which is positioned perpendicular to the optical axis is an X-axis direction (i.e., a direction set by the X-axis), and a second preset direction in a plane which is positioned perpendicular to the optical axis is a Y-axis direction (i.e., a direction set by the Y-axis). In the embodiment of the present application, the X-axis direction and the Y-axis direction are perpendicular to each other, and the Z-axis direction is perpendicular to a plane where the X-axis direction and the Y-axis direction are located. In other words, the X-axis, Y-axis, and Z-axis constitute a three-dimensional Cartesian coordinate system.

In the embodiment of the present application, the driving assembly can achieve the optical focusing function by driving the optical lens and/or the photosensitive assembly 810 to move along the Z-axis direction, and achieve the optical image-stabilizing function by driving the optical lens and/or the photosensitive assembly 810 to move along the X-axis direction and the Y-axis direction. The driving assembly can also achieve the optical focusing function by driving the optical lens and/or the photosensitive assembly 810 to rotate around the Z-axis direction, and achieve the optical image-stabilizing function by driving the optical lens and/or the photosensitive assembly 810 to rotate around the X-axis and Y-axis directions.

For ease of explanation and understanding, the lens driving device will be taken as an example below to explain the structure and method for achieving optical focusing and optical image-stabilizing. A driving device 820 mentioned below specifically refers to the lens driving device.

Figure 18:
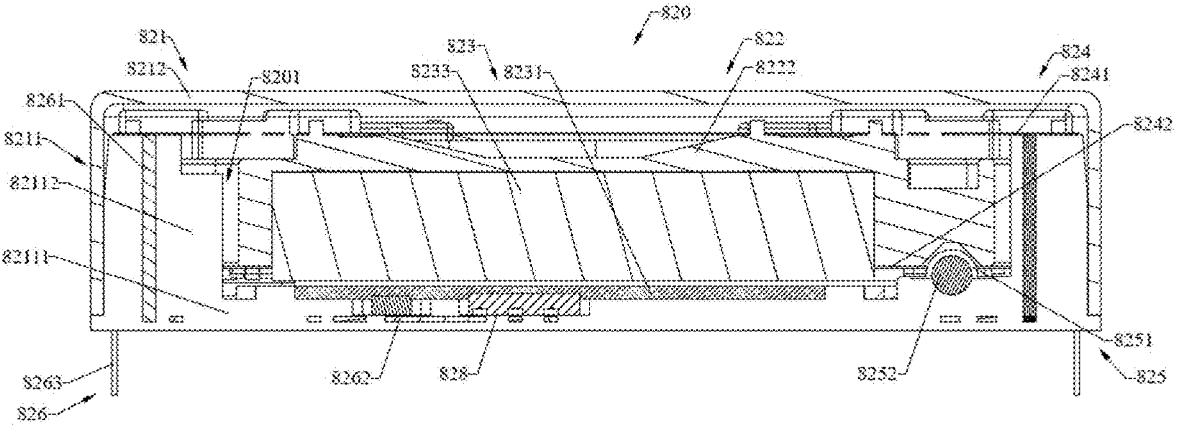
FIG. 18 illustrates a schematic view of a driving device of the camera module according to an embodiment of the present application.
Figure 19:
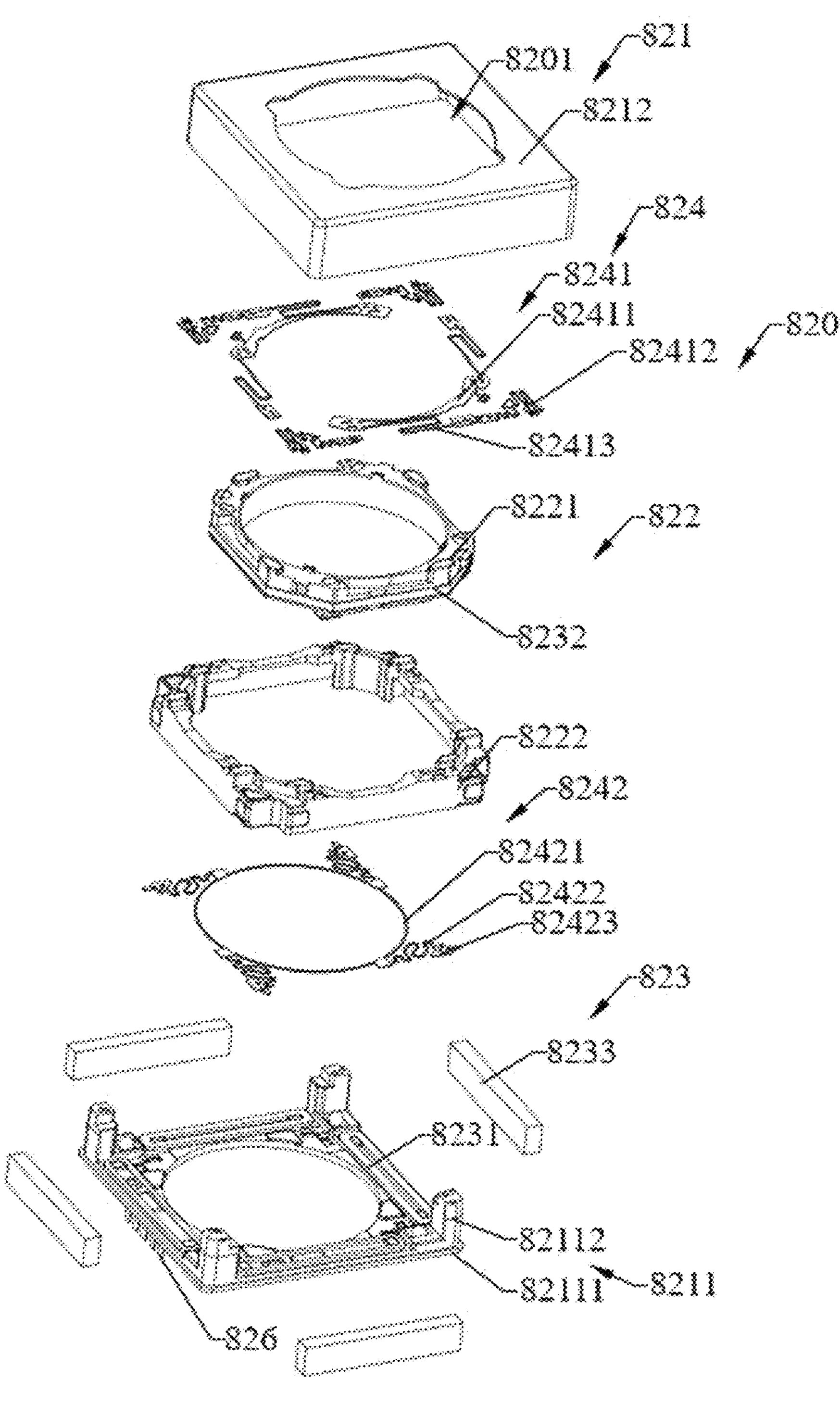
FIG. 19 illustrates an exploded schematic view of the driving device according to an embodiment of the present application.
Figure 20:
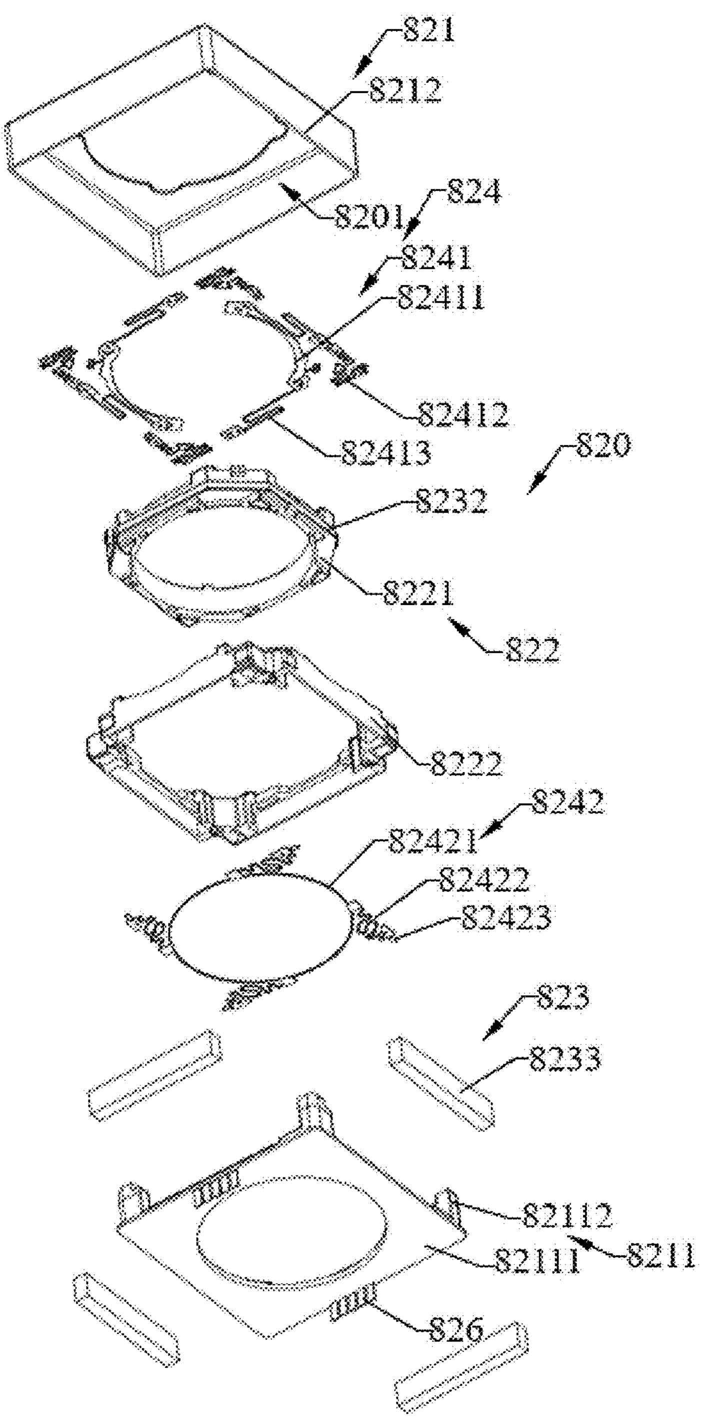
FIG. 20 illustrates another exploded schematic view of the driving device according to an embodiment of the present application.

As shown in FIGS. 18 to 20, in the embodiment of the present application, the driving device 820 includes a fixed portion 821 having an accommodating cavity 8201, a movable portion 822 suspended in the accommodating cavity 8201, and a driving portion 823 driving the movable portion 822 to move relative to the fixed portion 821. The movable portion 822 is adapted to mount an optical lens therein. In the process of the driving portion 823 driving the movable portion 822 to move relative to the fixed portion 821, the optical lens mounted on the movable portion 822 is driven to move along the Z-axis direction or along a plane perpendicular to the Z-axis, so as to achieve the optical focusing and optical image-stabilizing functions of the camera module.

In the embodiment of the present application, as shown in FIGS. 19 and 20, the fixed portion 821 includes an upper cover 8212 and a base 8211 that are engaged with each other to form the accommodating cavity 8201 for accommodating the movable portion 822 and the driving portion 823 therein, which can not only protect respective elements in the driving device 820 to avoid damage due to collision, but also be used to prevent dust, dirt or stray light from entering the interior of the driving device 820.

The upper cover 8212 and the base 8211 are each provided with an opening corresponding to the optical lens, so that light reflected by an object can enter the optical lens through the opening provided in the upper cover 8212 and reach the photosensitive assembly 810.

Figure 21:
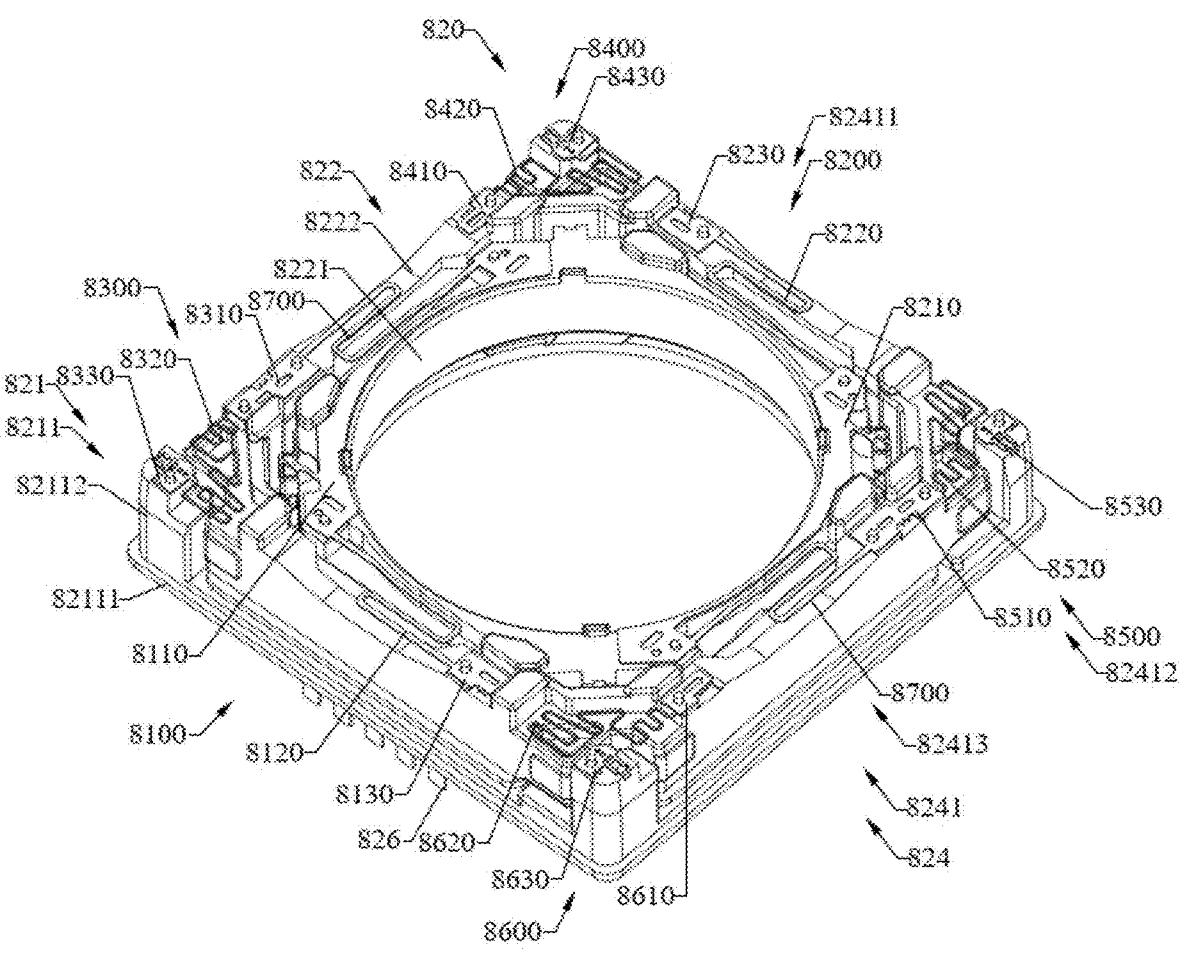
FIG. 21 illustrates a partial three-dimensional schematic view of the driving device according to an embodiment of the present application.

As shown in FIGS. 19 to 21, the base 8211 includes a base body 82111 and a base pillar (or base pillars) 82112 disposed on the base body 82111. The base pillar(s) 82112 integrally extends (extend) upward along the peripheral area of the base body 82111, so that the base pillar(s) 82112 and the surface of the base body 82111 form a mounting surface with a height difference. The number of the base pillar(s) 82112 is at least two, and preferably, the respective base pillars 82112 are oppositely disposed on the base body 82111, and are centrally symmetrical with a longitudinal center axis of the base body 82111 as an axis of symmetry. In a specific example of the present application, the respective base pillars 82112 are located at the respective four corners of the base body 82111, integrally extend upward along the four corner areas of the base body 82111, and are symmetrically distributed.

In the embodiment of the present application, a specific formation manner of the base pillar(s) 82112 is not limited in the present application. The base pillar(s) 82112 may be integrally molded with the base body 82111 through an injection molding process, or may be further molded on the molded base body 82111 through an injection molding process.

In the embodiment of the present application, the movable portion 822 is disposed in the fixed portion 821, and may move in the accommodating cavity 8201 of the fixed portion 821 under the action of the driving portion 823. The movable portion 822 includes an outer carrier 8222 and an inner carrier 8221 movably mounted to the outer carrier 8222, and the inner carrier 8221 is adapted to mount the optical lens therein. In other words, the optical lens is adapted to be mounted on the inner carrier 8221. In the embodiment of the present application, the inner carrier 8221 may be driven to move relative to the outer carrier 8222 alone, or may be driven by the outer carrier 8222 to move together with the outer carrier 8222. Further, the optical lens is driven to move by driving the outer carrier 8222 or the inner carrier 8221 to move, so as to achieve the optical focusing or optical image-stabilizing function.

Specifically, in some other implementations of the present application, when the outer carrier 8222 remains stationary and the inner carrier 8221 is driven to move relative to the outer carrier 8222, the inner carrier 8221 can drive the optical lens to move in the direction set by the optical axis to achieve the optical focusing function of the camera module. When the outer carrier 8222 is driven to move relative to the base 8211, the outer carrier 8222 can drive the inner carrier 8221 and the optical lens to move in a plane perpendicular to the optical axis to achieve the optical image-stabilizing function of the camera module. In some other implementations of the present application, when the outer carrier 8222 remains stationary and the inner carrier 8221 is driven to move relative to the outer carrier 8222, the inner carrier 8221 can drive the optical lens to move in a plane perpendicular to the optical axis to achieve the optical image-stabilizing function of the camera module. When the outer carrier 8222 is driven to move relative to the base 8211, the outer carrier 8222 can drive the inner carrier 8221 and the optical lens to move in the direction set by the optical axis to achieve the optical focusing function of the camera module.

It is worth mentioning that in some implementations of the present application, the lens barrel of the optical lens and the inner carrier 8221 have an integrated structure, that is, the inner carrier 8221 has the function of the lens barrel for accommodating a plurality of optical lens elements, and can also be used as a carrier to drive the optical lens to move. Further, the integrated structure of the lens barrel and the inner carrier 8221 can reduce the overall lateral size of the driving device 820, thereby reducing the lateral size of the camera module.

As shown in FIGS. 18 to 22, in the embodiment of the present application, the driving device 820 further includes an elastic member 824 disposed in the accommodating cavity 8201 of the fixed portion 821, which is adapted to drive the movable portion 822 to return/restore to an original position (i.e., a position when not driven by the driving portion 823, or a position before being driven by the driving portion 823), and the movable portion 822 is movably suspended in the accommodating cavity 8201 by the elastic member 824.

Figure 23:
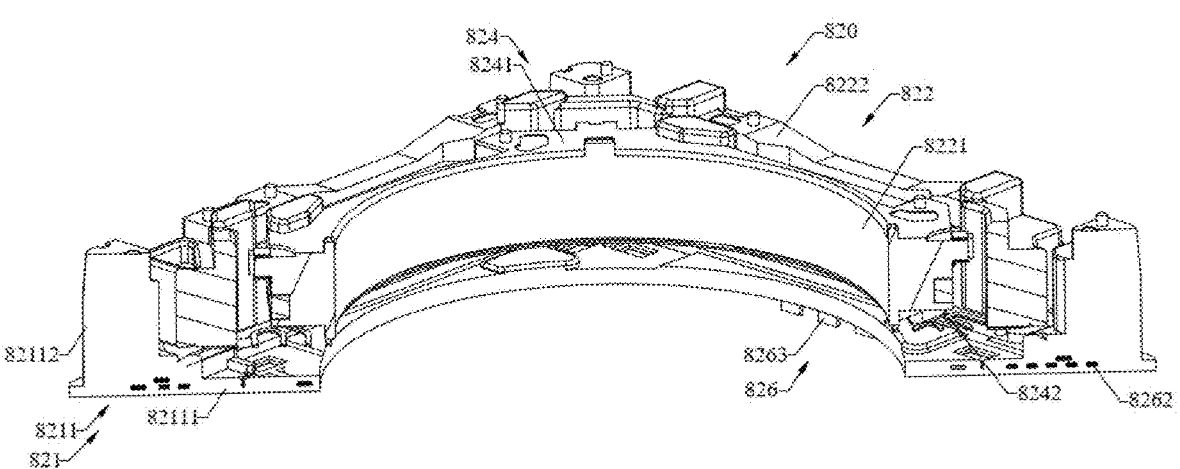
FIG. 23 illustrates another partial three-dimensional schematic view of the driving device according to an embodiment of the present application.

The elastic member 824 includes a first elastic assembly 8241 and a second elastic assembly 8242 extending between the inner carrier 8221 and the outer carrier 8222, and the first elastic assembly 8241 and the second elastic assembly 8242 are oppositely disposed on two opposite sides of the movable portion 822, as shown in FIGS. 21 and 23. The first elastic assembly 8241 is located on a light incident side of the optical lens, and the second elastic assembly 8242 is located on a light exit side of the optical lens, so as to suspend the optical lens and the movable portion 822 in the accommodating cavity 8201 of the fixed portion 821 in a restorable manner.

Specifically, the first elastic assembly 8241 is a thin sheet-like structure as a whole, and the first elastic assembly 8241 includes a focusing elastic part 82411 and an image-stabilizing elastic part 82412, and the focusing elastic part 82411 and the image-stabilizing elastic part 82412 extend in a plane perpendicular to the optical axis.

In some implementations of the present application, optical image-stabilizing is achieved by driving the inner carrier 8221 to move relative to the outer carrier 8222, and optical focusing is achieved by driving the outer carrier 8222 to move relative to the fixed portion 821. Correspondingly, the focusing elastic part 82411 is disposed at the periphery of the image-stabilizing elastic part 82412, the image-stabilizing elastic part 82412 extends between the inner carrier 8221 and the outer carrier 8222, and the focusing elastic part 82411 extends between the outer carrier 8222 and the base 8211 of the fixed portion 821. The driving portion 823 is adapted to drive the inner carrier 8221 to move relative to the outer carrier 8222 in a plane perpendicular to the optical axis to perform optical image-stabilizing, and the driving portion 823 is adapted to drive the outer carrier 8222 to take along the inner carrier 8221 carrying the optical lens to move along the direction set by the optical axis to perform optical focusing.

In some other implementations of the present application, optical focusing is achieved by driving the inner carrier 8221 to move relative to the outer carrier 8222, and optical image-stabilizing is achieved by driving the outer carrier 8222 to move relative to the fixed portion 821. Correspondingly, the image-stabilizing elastic part 82412 is disposed at the periphery of the focusing elastic part 82411, the focusing elastic part 82411 extends between the inner carrier 8221 and the outer carrier 8222, and the image-stabilizing elastic part 82412 extends between the outer carrier 8222 and the base 8211 of the fixed portion 821. The driving portion 823 is adapted to drive the inner carrier 8221 to move relative to the outer carrier 8222 along the direction set by the optical axis to perform optical focusing, and the driving portion 823 is adapted to drive the outer carrier 8222 to take along the inner carrier 8221 carrying the optical lens to move in a plane perpendicular to the optical axis to perform optical image-stabilizing.

When the driving portion 823 drives the inner carrier 8221 to move along the direction set by the optical axis (i.e., the Z-axis direction), the focusing elastic part 82411 is deformed to accumulate elastic force. When the driving portion 823 stops driving, the elastic force of the focusing elastic part 82411 is released, driving the inner carrier 8221 to return/restore to an original position. When the driving portion 823 drives the outer carrier 8222 to move along the X-axis direction and the Y-axis direction in a plane perpendicular to the optical axis, the image-stabilizing elastic part 82412 is deformed to accumulate elastic force. When the driving portion 823 stops driving, the elastic force of the image-stabilizing elastic part 82412 is released, driving the outer carrier 8222 to return/restore to an original position.

It is worth mentioning that in order to prevent the inner carrier 8221 from colliding with the outer carrier 8222 or the fixed portion 821 during the process of the optical lens being driven by the inner carrier 8221 to move, thereby causing deformation or damage to the optical lens and a decrease in imaging quality, in the embodiment of the present application, first protrusions for anti-collision are respectively provided on the top and bottom surfaces of the inner carrier 7221. Preferably, the first protrusions are made of a material with a smaller elastic modulus than that of the inner carrier 8221, such as silicone. The first protrusions may be integrally molded on the inner carrier 8221 by means of injection molding, or may be fixed to the inner carrier 8221 by means of gluing. In this regard, it is not limited in the present application.

Similarly, second protrusions for anti-collision may be provided on the top and bottom surfaces of the outer carrier 8222, and the surfaces of the second protrusions protrude beyond the surface of the elastic member 824 to prevent the elastic member 824 from colliding with the base 8211 or the upper cover 8212 of the fixed portion 821 during the movement of the outer carrier 8222, causing damage to the elastic member 824.

The focusing elastic part 82411 has a focusing elastic inner contour portion, a focusing elastic outer contour portion, and a focusing elastic deformation portion extending between the focusing elastic inner contour portion and the focusing elastic outer contour portion, wherein the focusing elastic inner contour portion is fixed to the inner carrier 8221, and the focusing elastic outer contour portion is fixed to the outer carrier 8222.

Correspondingly, in a specific example of the present application, the top surfaces of the inner carrier 8221 and the outer carrier 8222 are each provided with an elastic mechanism mounting position. The focusing elastic inner contour portion is fixedly connected to the elastic mechanism mounting position on the top surface of the inner carrier 8221, the focusing elastic outer contour portion is fixedly connected to the elastic mechanism mounting position on the top surface of the outer carrier 8222, and the focusing elastic deformation portion extends outward from the focusing elastic inner contour portion to the focusing elastic outer contour portion, so that the inner carrier 8221 is suspended in the outer carrier 8222 through the focusing elastic deformation portion, a certain moving space is reserved for the inner carrier 8221 through the deformation of the focusing elastic deformation portion, and a certain restoring force is provided for the inner carrier 8221.

The focusing elastic deformation portion is bent and extended from the focusing elastic outer contour portion to the focusing elastic inner contour portion, so as to reserve sufficient space for the movement of the inner carrier 8221, which can not only provide a guarantee for the large movement stroke of the inner carrier 8221, but also reduce the driving resistance of the inner carrier 8221, and improve the optical focusing sensitivity of the camera module. It will be appreciated that the longer the length of the focusing elastic deformation portion, the more bends the focusing elastic deformation portion has, the smaller the deformation of the focusing elastic deformation portion itself after the deformation occurs, and the easier it is to restore the focusing elastic deformation portion after being stretched.

In particular, in the embodiment of the present application, the focusing elastic part 82411 is arranged in a rotationally symmetrical manner relative to the optical axis. This is because K values (elastic coefficients) of the elastic element with the axially symmetrical design in the X-axis direction and the Y-axis direction are quite different, which will cause the displacement of the inner carrier 8221 in one direction of the X-axis direction or the Y-axis direction to be relatively large, and the rotationally symmetrical elastic element can have a suppressive effect on the displacement in the one direction. Further, since the elastic coefficients (K values) of the rotationally symmetrical focusing elastic part 82411 in the X-axis direction and the Y-axis direction are the same, when the inner carrier 8221 moves along the Z-axis direction, the rotationally symmetrical focusing elastic part 82411 can suppress the movement of the inner carrier 8221 rotating around the Z-axis to a certain extent. Furthermore, the K value of the focusing elastic part 82411 in the X-axis direction and the Y-axis direction is very large, enabling the amplitude of the rotation of the inner carrier 8221 around the Z-axis to be smaller. It will be appreciated that the rotationally symmetrical layout manner enables the focusing elastic part 82411 to further improve the flatness of the first elastic assembly 8241, so as to reduce the tilt tolerance of the driving device 820 and improve the assembly accuracy of the camera module.

In the embodiment of the present application, the focusing elastic part 82411 includes at least two focusing elastic units distributed in a rotationally symmetrical manner relative to the optical axis, and the at least two focusing elastic units are independent of each other, that is, the focusing elastic part 82411 is a split structure. The number of focusing elastic units is not limited in the present application.

Figure 24:
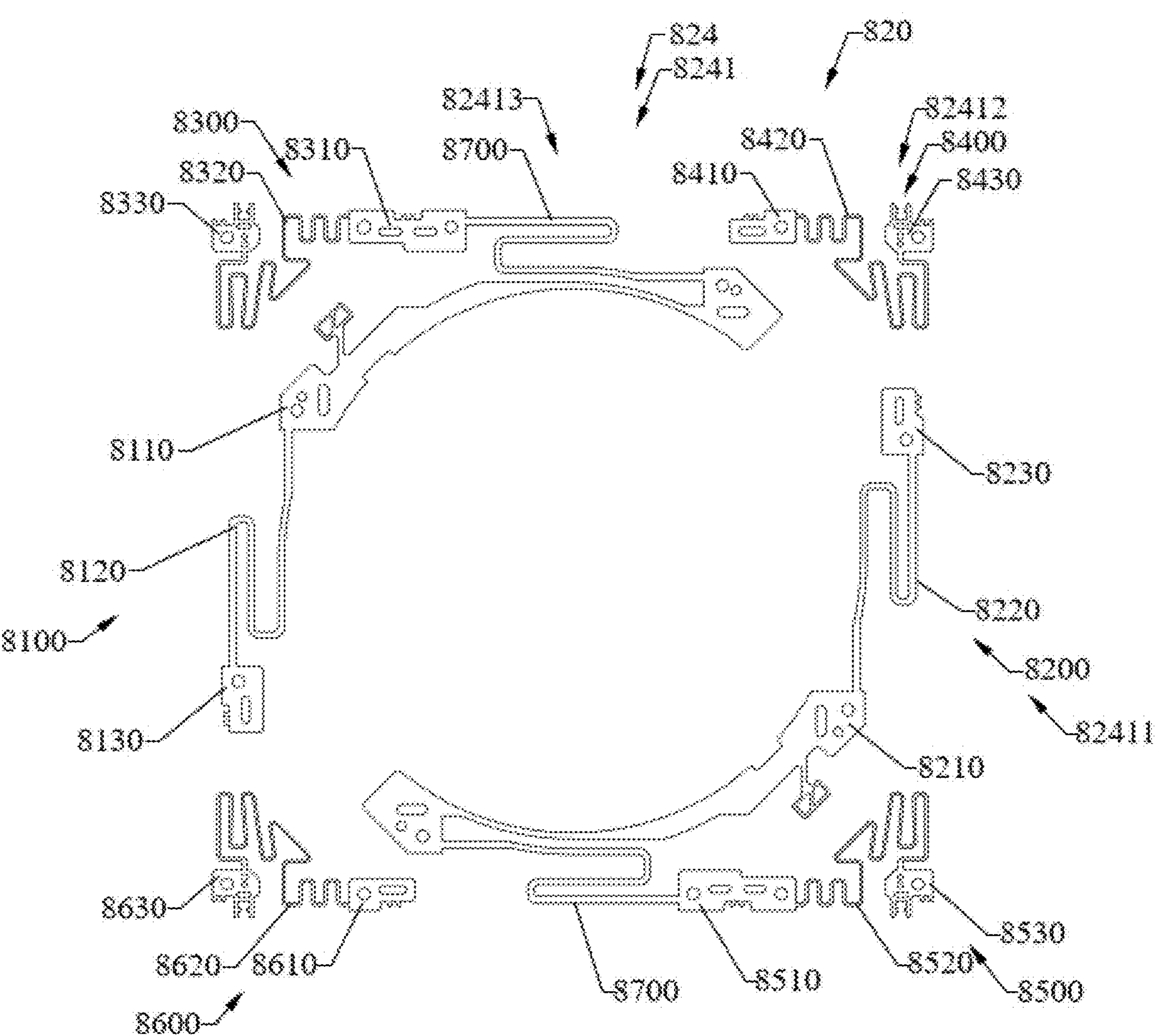
FIG. 24 illustrates another partial three-dimensional schematic view of the driving device according to an embodiment of the present application, showing the arrangement manner of a first elastic assembly.

In a specific example of the present application, the focusing elastic part 82411 includes a first focusing elastic unit 8100 and a second focusing elastic unit 8200, and the first focusing elastic unit 8100 and the second focusing elastic unit 8200 are rotationally symmetric with respect to the optical axis, as shown in FIG. 24. The first focusing elastic unit 8100 includes a first focusing elastic inner contour portion 8110 fixed to the inner carrier 8221, a first focusing elastic outer contour portion 8130 fixed to the outer carrier 8222, and a first focusing elastic deformation portion 8120 extending between the first focusing elastic inner contour portion 8110 and the first focusing elastic outer contour portion 8130. The second focusing elastic unit 8200 includes a second focusing elastic inner contour portion 8210 fixed to the inner carrier 8221, a second focusing elastic outer contour portion 8230 fixed to the outer carrier 8222, and a second focusing elastic deformation portion 8220 extending between the second focusing elastic inner contour portion 8210 and the second focusing elastic outer contour portion 8230.

In a specific example of the present application, the first focusing elastic inner contour portion 8110 and the second focusing elastic inner contour portion 8210 form a hollow annular structure, so that when the first focusing elastic unit 8100 is fixedly sleeved on the inner carrier 8221, the middle area of the annular structure can correspond to the optical lens. The first focusing elastic outer contour portion 8130 and the second focusing elastic outer contour portion 8230 are disposed along the opposite sides of the driving device 820, respectively. The first focusing elastic deformation portion 8120 and/or the second focusing elastic deformation portion 8220 include a plurality of bending sections extending along the X-axis direction set by the X-axis or the Y-axis direction set by the Y-axis to provide a certain restoring force for the movement of the inner carrier 8221, wherein each bending section includes at least two straight sections and a curved section connecting the two straight sections.

It is worth mentioning that the focusing elastic deformation portion may be, but is not limited to, implemented as at least two spring wires connected between the focusing elastic outer contour portion and the focusing elastic inner contour portion. When the driving portion 823 generates a driving force to drive the inner carrier 8221 to displace, the focusing elastic deformation portion is driven to generate a reaction damping force balanced with the driving force, so that the inner carrier 8221 is stably maintained at a certain position along the optical axis to achieve the optical focusing function of the camera module.

In the embodiment of the present application, the image-stabilizing elastic part 82412 has an image-stabilizing elastic inner contour portion, an image-stabilizing elastic outer contour portion, and an image-stabilizing elastic deformation portion extending between the image-stabilizing elastic inner contour portion and the image-stabilizing elastic outer contour portion, wherein the image-stabilizing elastic inner contour portion is fixed to the outer carrier 8222, and the image-stabilizing elastic outer contour portion is fixed to the base 8211 of the fixed portion 821.

Correspondingly, in a specific example of the present application, an elastic mechanism mounting position is provided on the top surface of the base pillar(s) 82112 of the base 8211, the image-stabilizing elastic inner contour portion is fixedly connected to the elastic mechanism mounting position on the top surface of the outer carrier 8222, the image-stabilizing elastic outer contour portion is fixedly connected to the elastic mechanism mounting position on the top surface of the base pillar(s) 82112, and the image-stabilizing elastic deformation portion extends outward from the image-stabilizing elastic inner contour portion to the image-stabilizing elastic outer contour portion, so that the outer carrier 8222 is suspended on the base 8211 by the image-stabilizing elastic deformation portion, a certain moving space is reserved for the outer carrier 8222 through the deformation of the image-stabilizing elastic deformation portion, and a certain restoring force is provided for the outer carrier 8222.

The image-stabilizing elastic deformation portion is bent and extended from the image-stabilizing elastic outer contour portion to the image-stabilizing elastic inner contour portion, so as to reserve sufficient space for the movement of the outer carrier 8222, which can not only provide a guarantee for the large movement stroke of the outer carrier 8222, but also reduce the driving resistance of the inner carrier 8221, and improve the optical image-stabilizing sensitivity of the camera module. It will be appreciated that the longer the length of the image-stabilizing elastic deformation portion, the more bends the image-stabilizing elastic deformation portion has, the smaller the deformation of the image-stabilizing elastic deformation portion itself after the deformation occurs, and the easier it is to restore the image-stabilizing elastic deformation portion after being stretched.

Specifically, the image-stabilizing elastic deformation portion includes a plurality of interconnected bending sections extending along the X direction and a plurality of interconnected bending sections extending along the Y direction, wherein the plurality of interconnected bending sections extending along the X direction are interconnected with the plurality of interconnected bending sections extending along the Y direction, so that after the image-stabilizing elastic deformation portion is stretched in the X direction and the Y direction, corresponding restoring forces can be generated in the X direction and the Y direction, causing the outer carrier 8222 to return/restore to an original position (i.e., a position of the outer carrier 8222 before being driven to move by the driving portion 823) under the action of the image-stabilizing elastic unit.

In a specific example of the present application, the plurality of interconnected bending sections extending along the X direction is connected to the image-stabilizing elastic inner contour portion at one end, and the plurality of interconnected bending sections extending along the Y direction is connected to the image-stabilizing elastic outer contour portion at one end. In another specific example of the present application, the plurality of interconnected bending sections extending along the X direction is connected to the image-stabilizing elastic outer contour portion at one end, and the plurality of interconnected bending sections extending along the Y direction is connected to the image-stabilizing elastic inner contour portion at one end. In this regard, it is not limited in the present application.

In particular, in the embodiment of the present application, the image-stabilizing elastic part 82412 is arranged in an axially symmetrical manner relative to the optical axis. This is because the elastic element with a rotationally symmetrical design has a smaller K value in the direction of rotation along the Z-axis direction, which will cause the outer carrier 8222 to more easily produce rotational movement around the Z-axis direction during the translational movement along the X-axis direction and the Y-axis direction. The axially symmetrical image-stabilizing elastic part 82412 effectively improves the above problem. When the outer carrier 8222 moves along the X-axis direction and the Y-axis direction, the axially symmetrical image-stabilizing elastic part 82412 can suppress the outer carrier 8222 from producing rotational movement around the Z-axis. It will be appreciated that the axially symmetrical arrangement manner enables the image-stabilizing elastic part 82412 to further improve the flatness of the first elastic assembly 8241, so as to reduce the tilt tolerance of the driving device 820 and improve the assembly accuracy of the camera module.

In an embodiment of the present application, the image-stabilizing elastic part 82412 includes at least two image-stabilizing elastic units distributed in an axially symmetrical manner relative to the optical axis, and the at least two image-stabilizing elastic units are independent of each other, that is, the image-stabilizing elastic part 82412 is a split structure. The number of image-stabilizing elastic units is not limited in the present application.

In a specific example of the present application, the number of image-stabilizing elastic units is 84. Correspondingly, the image-stabilizing elastic part 82412 includes a first image-stabilizing elastic unit 8300, a second image-stabilizing elastic unit 8400, a third image-stabilizing elastic unit 8500, and a fourth image-stabilizing elastic unit 8600 disposed in sequence along a clockwise direction, as shown in FIG. 24. The first image-stabilizing elastic unit 8300 and the fourth image-stabilizing elastic unit 8600 are symmetrically distributed with respect to the X-axis, the second image-stabilizing elastic unit 8400 and the third image-stabilizing elastic unit 8500 are symmetrically distributed with respect to the X-axis, the first image-stabilizing elastic unit 8300 and the second image-stabilizing elastic unit 8400 are symmetrically distributed with respect to the Y-axis, the third image-stabilizing elastic unit 8500 and the fourth image-stabilizing elastic unit 8600 are symmetrically distributed with respect to the Y-axis, and the first image-stabilizing elastic unit 8300, the second image-stabilizing elastic unit 8400, the third image-stabilizing elastic unit 8500 and the fourth image-stabilizing elastic unit 8600 are distributed in an axially symmetrical manner.

The first image-stabilizing elastic unit 8300, the second image-stabilizing elastic unit 8400, the third image-stabilizing elastic unit 8500 and the fourth image-stabilizing elastic unit 8600 are located at the four corners of the driving device 820, so that the outer carrier 8222 is subjected to more symmetrical forces under the action of the four image-stabilizing elastic units, thereby enabling the outer carrier 8222 to be stably suspended on the base 8211.

More specifically, the first image-stabilizing elastic unit 8300 includes a first image-stabilizing elastic inner contour portion 8310 fixed to the outer carrier 8222, a first image-stabilizing elastic outer contour portion 8330 fixed to the base 8211, and a first image-stabilizing elastic deformation portion 8320 integrally connecting the first image-stabilizing elastic inner contour portion 8310 and the first image-stabilizing elastic outer contour portion 8330. The second image-stabilizing elastic unit 8400 includes a second image-stabilizing elastic inner contour portion 8410 fixed to the outer carrier 8222, a second image-stabilizing elastic outer contour portion 8430 fixed to the base 8211, and a second image-stabilizing elastic deformation portion 8420 integrally connecting the second image-stabilizing elastic inner contour portion 8410 and the second image-stabilizing elastic outer contour portion 8430. The third image-stabilizing elastic unit 8500 includes a third image-stabilizing elastic inner contour portion 8510 fixed to the outer carrier 8222, a third image-stabilizing elastic outer contour portion 8530 fixed to the base 8211, and a third image-stabilizing elastic deformation portion 8520 integrally connecting the third image-stabilizing elastic inner contour portion 8510 and the third image-stabilizing elastic outer contour portion 8530. The fourth image-stabilizing elastic unit 8600 includes a fourth image-stabilizing elastic inner contour portion 8610 fixed to the outer carrier 8222, a fourth image-stabilizing elastic outer contour portion 8630 fixed to the base 8211, and a fourth image-stabilizing elastic deformation portion 8620 integrally connecting the fourth image-stabilizing elastic inner contour portion 8610 and the fourth image-stabilizing elastic outer contour portion 8630, as shown in FIG. 24.

It is worth mentioning that the first focusing elastic outer contour portion 8130 and the second focusing elastic outer contour portion 8230 of the two focusing elastic units are disposed on two opposite sides of the driving device 820 along the X-axis direction or the Y-axis direction, respectively. Such an arrangement enables the focusing elastic part 82411 and the image-stabilizing elastic part 82412 to fully utilize the spatial position of the lens driving device, and the focusing elastic part 82411 and the image-stabilizing elastic part 82412 can avoid interference with each other, thereby affecting the driving effect.

In summary, the first elastic assembly 8241 includes the focusing elastic part 82411 and the image-stabilizing elastic part 82412, wherein the focusing elastic part 82411 is arranged in a rotationally symmetrical manner around the Z axis, and the image-stabilizing elastic part 82412 is arranged in an axially symmetrical manner relative to the X axis and the Y axis. In this way, the driven object is prevented from unexpectedly moving in the process of driving the acted object to move. Specifically, on the one hand, when the driving portion 823 drives the inner carrier 8221 to move along the Z axis direction to perform optical focusing, the focusing elastic part 82411 can suppress the inner carrier 8221 from producing translational movement along the X-axis direction and the Y-axis direction, and can also suppress the inner carrier 8221 from producing rotational movement along the Z axis direction. On the other hand, when the driving portion 823 drives the outer carrier 8222 to move along the X axis direction and the Y axis direction to perform optical image-stabilizing, the image-stabilizing elastic part 82412 can suppress the outer carrier 8222 from producing rotational movement around the Z axis direction.

It is worth mentioning that in some implementations of the present application, the focusing elastic part 82411 and the image-stabilizing elastic part 82412 are completely separated to avoid interference between the focusing elastic part 82411 and the image-stabilizing elastic part 82412, thereby affecting the driving effect. In some other implementations of the present application, at least a part of the focusing elastic part 82411 and the image-stabilizing elastic part 82412 are interconnected, which, on the one hand, can make the installation of the driving device 820 simpler, and on the other hand, can improve the flatness of the first elastic assembly 8241 to reduce the tilt tolerance of the driving device 820 and improve the assembly accuracy of the camera module.

Correspondingly, in some implementations of the present application, the first elastic assembly 8241 further includes an elastic connection portion 82413 connecting the focusing elastic part 82411 and the image-stabilizing elastic part 82412. One end of the elastic connection portion 82413 is connected to the focusing elastic part 82411, and the other end of the elastic connection portion 82413 is connected to the image-stabilizing elastic part 82412, as shown in FIG. 24. The elastic connection portion 82413 includes a plurality of bending sections along the X-axis direction or the Y-axis direction, and the extending direction of the plurality of bending sections of the elastic connection portion 82413 is perpendicular to the extending direction of the bending sections of the focusing elastic deformation portion adjacent thereto. In a specific example of the present application, the plurality of bending sections of the elastic connection portion 82413 extend along the X-axis direction, and the bending sections of the focusing elastic deformation portion adjacent thereto extend along the Y-axis direction. Such an arrangement can provide more extension space for the bending sections of the elastic connection portion 82413 and the bending sections of the focusing elastic deformation portion, so that the elastic connection portion 82413 and the focusing elastic deformation portion can be provided with more bending sections. Such an arrangement can also avoid interference between the elastic connection portion 82413 and the focusing elastic deformation portion.

In some implementations of the present application, the two focusing elastic units of the focusing elastic part 82411 and at least two image-stabilizing elastic units of the image-stabilizing elastic part 82412 are interconnected, the elastic connection portion 82413 includes a first elastic connection unit 8700 and a second elastic connection unit 8800, and the first elastic connection unit 8700 and the second elastic connection unit 8800 are rotationally symmetrically disposed relative to the Z axis.

In a specific example of the present application, the first image-stabilizing elastic unit 8300 is connected to the first focusing elastic unit 8100, the third image-stabilizing elastic unit 8500 is connected to the second focusing elastic unit 8200, the first elastic connection unit 8700 is disposed between the first image-stabilizing elastic unit 8300 and the first focusing elastic unit 8100, and the second elastic connection unit 8800 is disposed between the third image-stabilizing elastic unit 8500 and the second focusing elastic unit 8200.

In this specific example, one end of the first elastic connection unit 8700 is connected to the first image-stabilizing elastic inner contour portion 8310, and the other end of the first elastic connection unit 8700 is connected to the first focusing elastic inner contour portion 8110. One end of the second elastic connection unit 8800 is connected to the second image-stabilizing elastic inner contour portion 8410, and the other end of the second elastic connection unit 8800 is connected to the second focusing elastic inner contour portion 8210. Through the first elastic connection unit 8700 and the second elastic connection unit 8800, two image-stabilizing elastic units disposed at opposite corners in the image-stabilizing elastic unit and the two focusing elastic units are connected to each other. Such an arrangement can not only simplify the installation of the first elastic assembly 8241, but also give the first elastic assembly 8241 a circuit conduction function, making the circuit conduction of the driving device 820 simpler.

In another specific example of the present application, the elastic connection portion 82413 further includes a third elastic connection unit and a fourth elastic connection unit, and the third elastic connection unit and the fourth elastic connection unit are disposed to be rotationally symmetrical with respect to the Z axis. The third elastic connection unit is connected between the first focusing elastic unit 8100 and the second image-stabilizing elastic unit 8400, and the fourth elastic connection unit is connected between the second focusing elastic unit 8200 and the fourth image-stabilizing elastic unit 8600.

In a specific example of the present application, one end of the third elastic connection unit is connected to the second image-stabilizing elastic inner contour portion 8410, and the other end of the third elastic connection unit is connected to the first focusing elastic inner contour portion 8110. One end of the fourth elastic connection unit is connected to the fourth image-stabilizing elastic inner contour portion 8610, and the other end of the fourth elastic connection unit is connected to the second focusing elastic inner contour portion 8210. Such an arrangement divides the first elastic assembly 8241 into two parts, so that the first elastic assembly 8241 maintains good consistency, and the entire plane of the first elastic assembly 8241 can be mounted in the lens driving device with a relatively small tilt tolerance.

It is worth mentioning that in the embodiment of the present application, the focusing elastic inner contour is fixedly mounted on the top surface of the inner carrier 8221 by means of adhesive bonding or hot riveting, the focusing elastic outer contour is fixedly mounted on the top surface of the outer carrier 8222 by means of adhesive bonding or hot riveting, the image-stabilizing elastic inner contour is fixedly mounted on the top surface of the outer carrier 8222 by means of adhesive bonding or hot riveting, and the image-stabilizing elastic outer contour is fixedly mounted on the top surface of the base pillar(s) 82112 by means of adhesive bonding or hot riveting. The top surfaces of the elastic mechanism mounting positions corresponding to the focusing elastic inner contour portion, the focusing elastic outer contour portion, the image-stabilizing elastic inner contour portion, and the image-stabilizing elastic outer contour portion are on the same plane, so that the first elastic assembly 8241 can be mounted on a flat mounting surface.

It is also worth mentioning that in the embodiment of the present application, the focusing elastic part 82411 and the image-stabilizing elastic part 82412 in the first elastic assembly 8241 are each implemented as a spring sheet. The optical lens image-stabilizing function is achieved by replacing a traditional suspension wire with the image-stabilizing elastic part 82412 implemented as the spring sheet. The image-stabilizing elastic part 82412 can generate a force on the acted object to restore it, so as to ensure that a relatively stable state is maintained between the outer carrier 8222 and the base 8211.

The image-stabilizing elastic part 82412 is disposed on the top of the outer carrier 8222 (or the inner carrier 8221) and the base 8211 as a part of the first elastic assembly 8241, extends between the outer carrier 8222 and the base 8211 and is connected to the outer carrier 8222 and the base 8211. Such an arrangement allows the driving device 820 to be assembled sequentially along the optical axis direction during the assembly process, which can not only make the assembly of the driving device 820 simpler and save cost, but also reduce the assembly tolerance of the driving device 820 during the assembly process, and make the accuracy of the driving device 820 higher.

Figure 25:
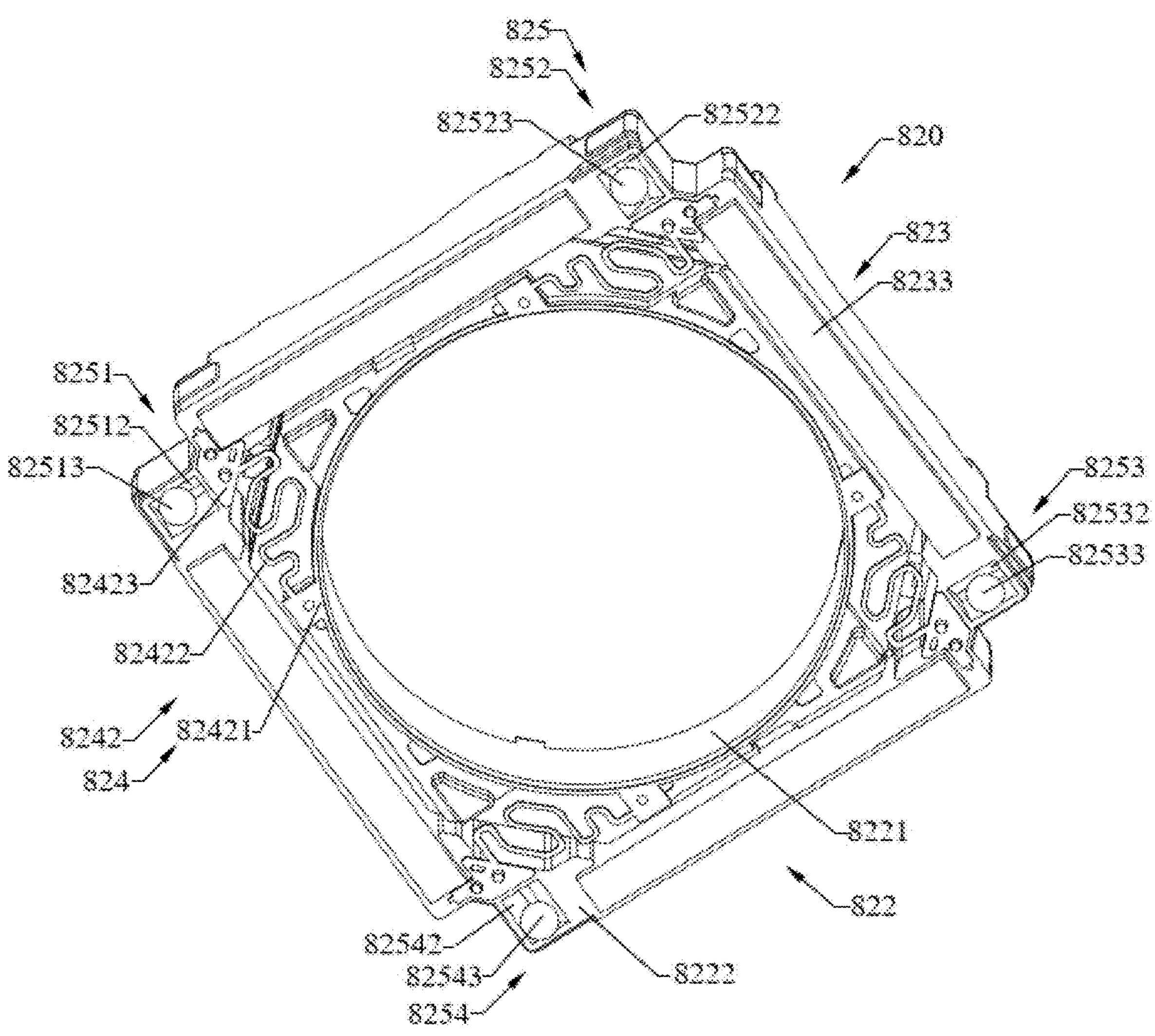
FIG. 25 illustrates still another partial three-dimensional schematic view of the driving device according to an embodiment of the present application.
Figure 26:
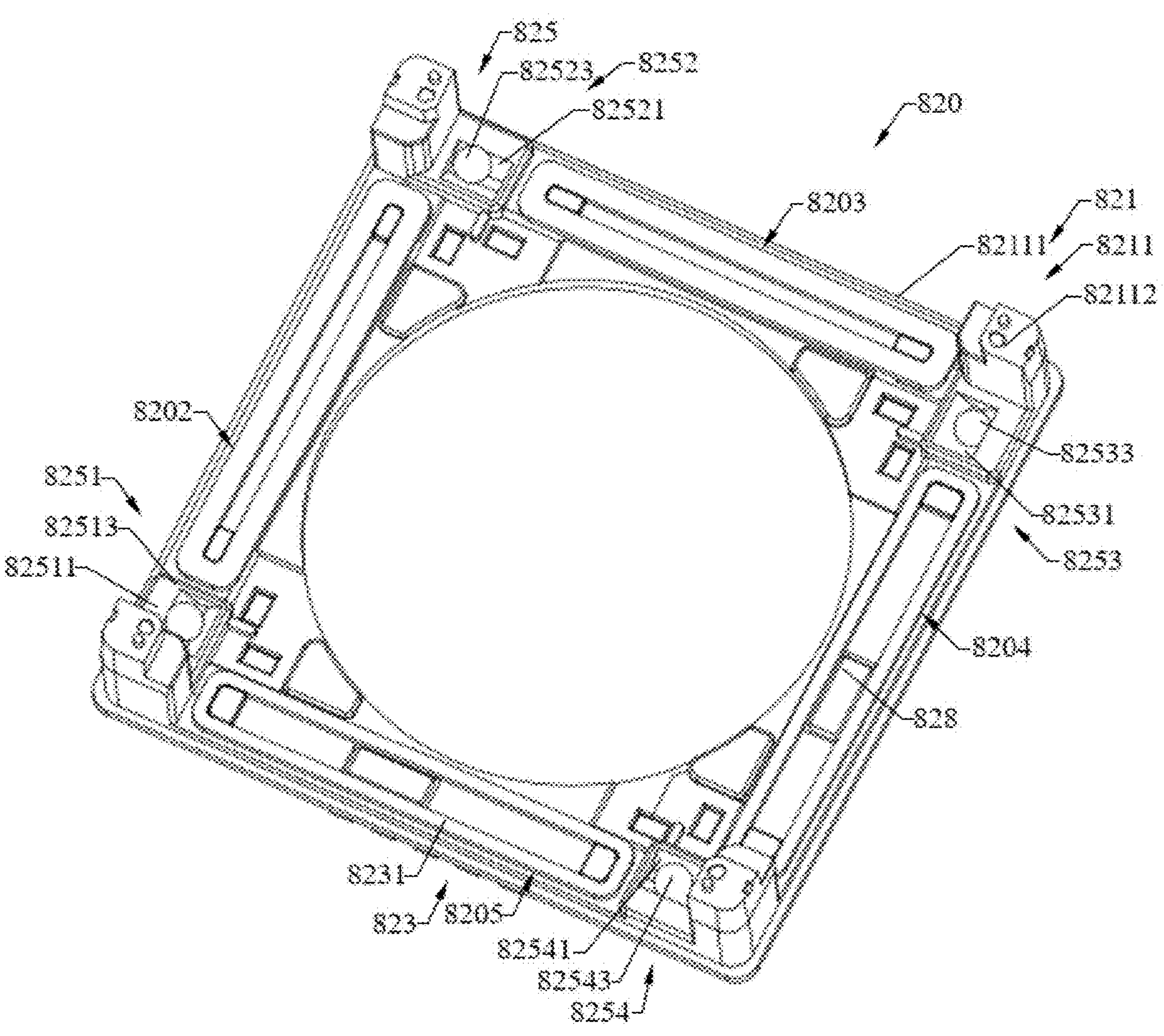
FIG. 26 illustrates still another partial three-dimensional schematic view of the driving device according to an embodiment of the present application.
Figure 27:
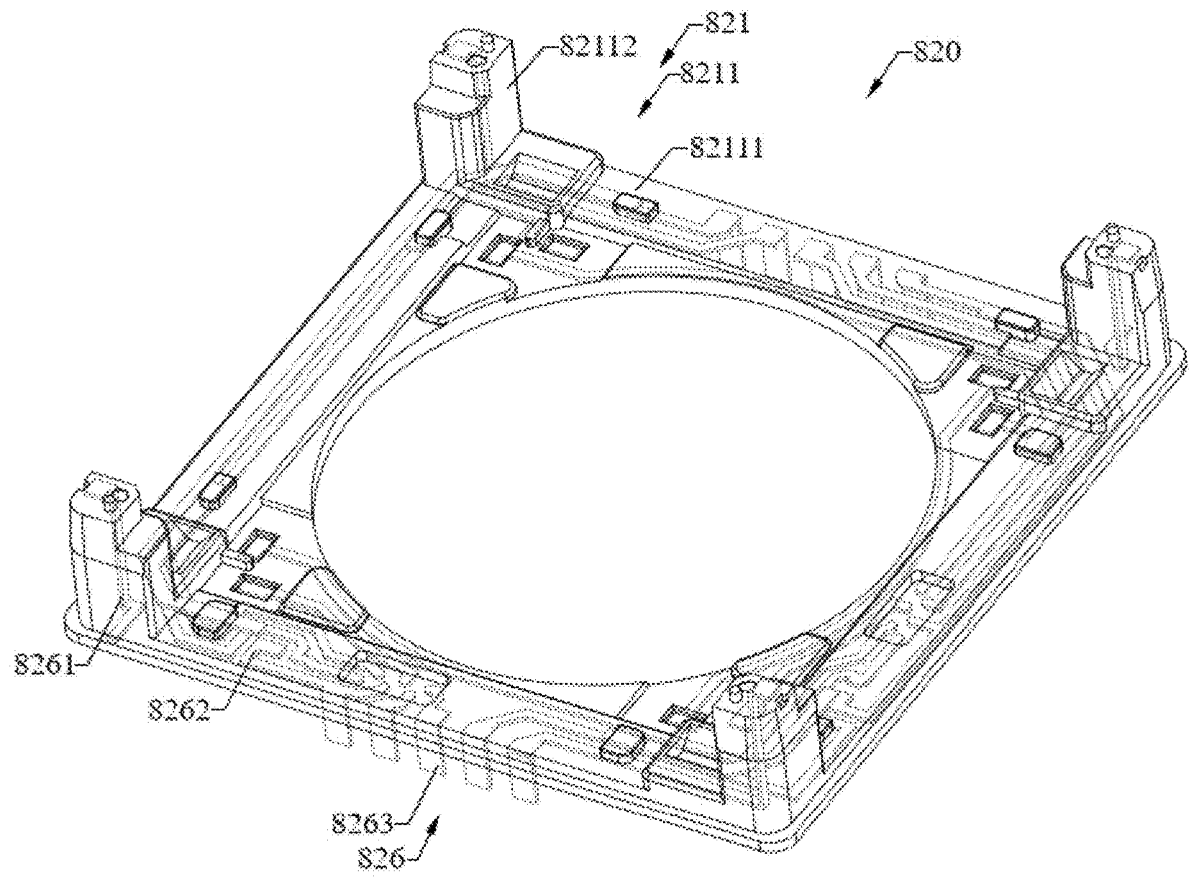
FIG. 27 illustrates a partial perspective schematic view of the driving device according to an embodiment of the present application.
Figure 28:
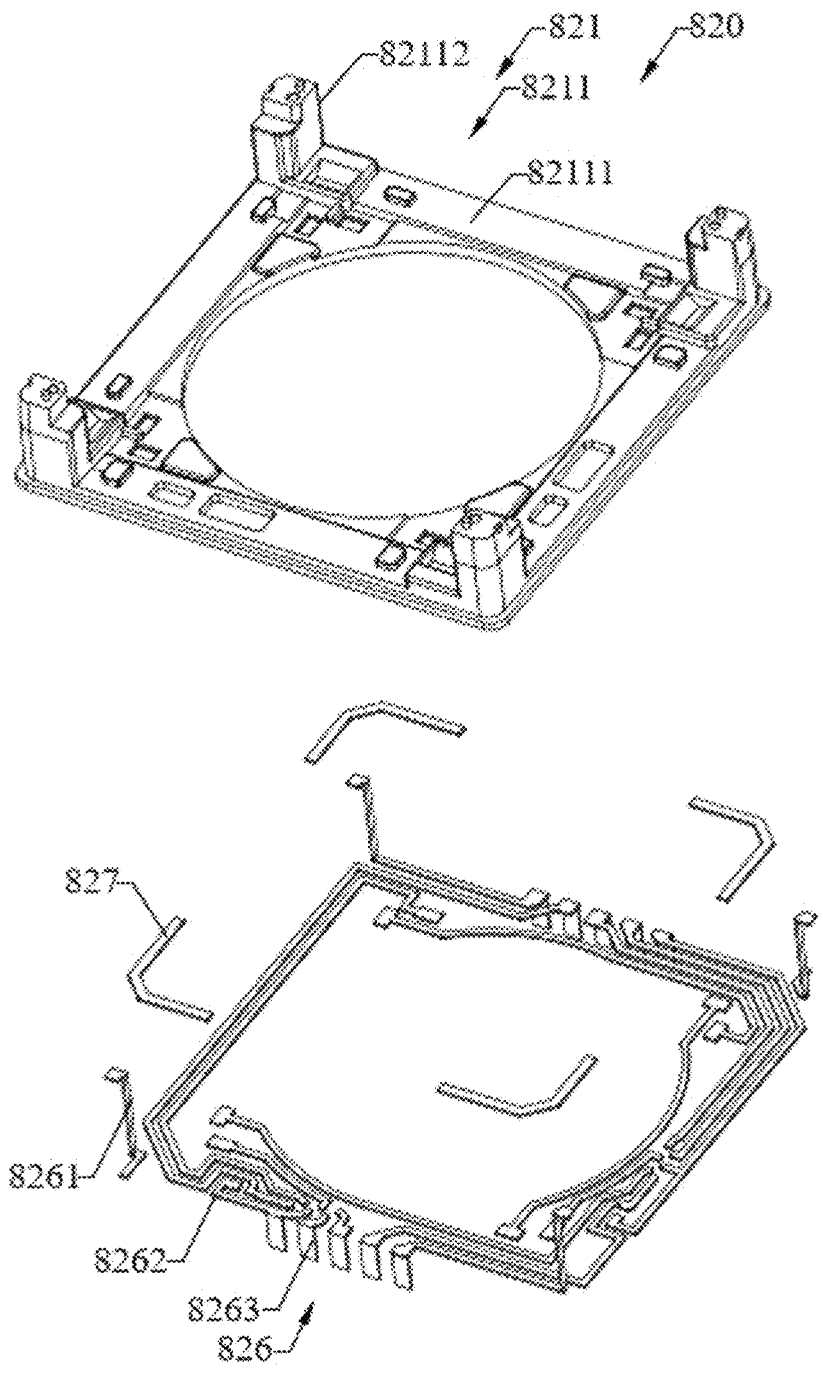
FIG. 28 illustrates a partial disassembled schematic view of the driving device according to an embodiment of the present application.
Figure 29:
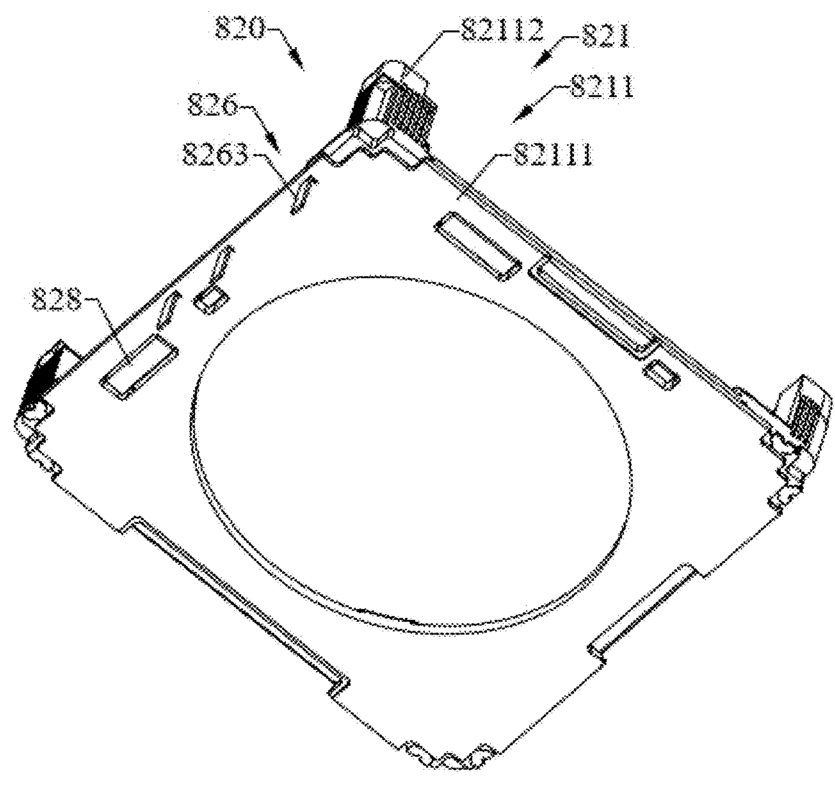
FIG. 29 illustrates still another partial three-dimensional schematic view of the driving device according to an embodiment of the present application.
Figure 30:
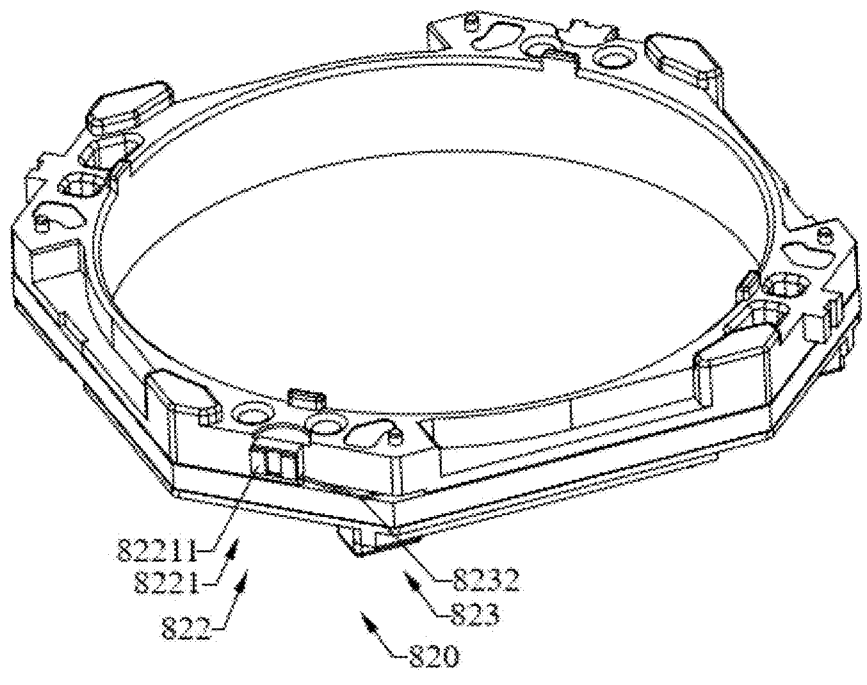
FIG. 30 illustrates still another partial three-dimensional schematic view of the driving device according to an embodiment of the present application.

In the embodiment of the present application, the second elastic assembly 8242 is a thin sheet-like structure, and the second elastic assembly 8242 includes a second elastic inner contour portion 82421 fixed to the inner carrier 8221, a second elastic outer contour portion 82423 fixed to the outer carrier 8222, and a second elastic deformation portion 82422 extending between the second elastic inner contour portion 82421 and the second elastic outer contour portion 82423, as shown in FIG. 25. The bottom surfaces of the inner carrier 8221 and the outer carrier 8222 are provided with elastic mechanism mounting positions, the second elastic outer contour portion 82423 is fixedly connected to the elastic mechanism mounting position on the bottom surface of the outer carrier 8222, and the second elastic inner contour portion 82421 is fixedly connected to the elastic mechanism mounting position on the bottom surface of the inner carrier 8221. Such an arrangement enables the inner carrier 8221 to be clamped between the focusing elastic part 82411 of the first elastic assembly 8241 and the second elastic assembly 8242, thereby causing the inner carrier 8221 to be suspended in the outer carrier 8222.

Specifically, the second elastic outer contour portion 82423 and the second elastic inner contour portion 82421 of the second elastic assembly 8242 may be fixed to the outer carrier 8222 and the inner carrier 8221 by means of, but not limited to, adhesive bonding, hot riveting, etc. The second elastic inner contour portion 82421 forms a hollow annular structure, and the second elastic outer contour portion 82423 is disposed at the four corners of the outer carrier 8222, and is connected to the second elastic inner contour portion 82421 through the second elastic deformation portion 82422. In a specific example of the present application, the second elastic assembly 8242 is arranged in a rotationally symmetrical manner around the optical axis.

It is worth mentioning that in the embodiment of the present application, the first elastic assembly 8241 and the second elastic assembly 8242 of the elastic member 824 are fixed to the top surfaces and the bottom surfaces of the inner carrier 8221 and the outer carrier 8222, respectively, to support and limit the movement of the inner carrier 8221 and the outer carrier 8222, which not only helps to improve the structural stability of the driving device 820, but also enables the inner carrier 8221 and the outer carrier 8222 to move within a certain range of stroke.

It is also worth mentioning that, in a specific example of the present application, the first elastic assembly 8241 has a split structure, and the second elastic assembly 8242 has an integrated structure, so that when the second elastic assembly 8242 is mounted on the outer carrier 8222, the second elastic assembly 8242 can always maintain good consistency, causing the entire plane of the second elastic assembly 8242 to have a smaller installation tolerance. The first elastic assembly 8241 is used to achieve circuit conduction. In another specific example of the present application, the first elastic assembly 8241 and the second elastic assembly 8242 are each disposed as a split structure, so that the first elastic assembly 8241 and the second elastic assembly 8242 can both be used for circuit conduction, simplifying the electrical connection of the driving device 820.

Figure 22:
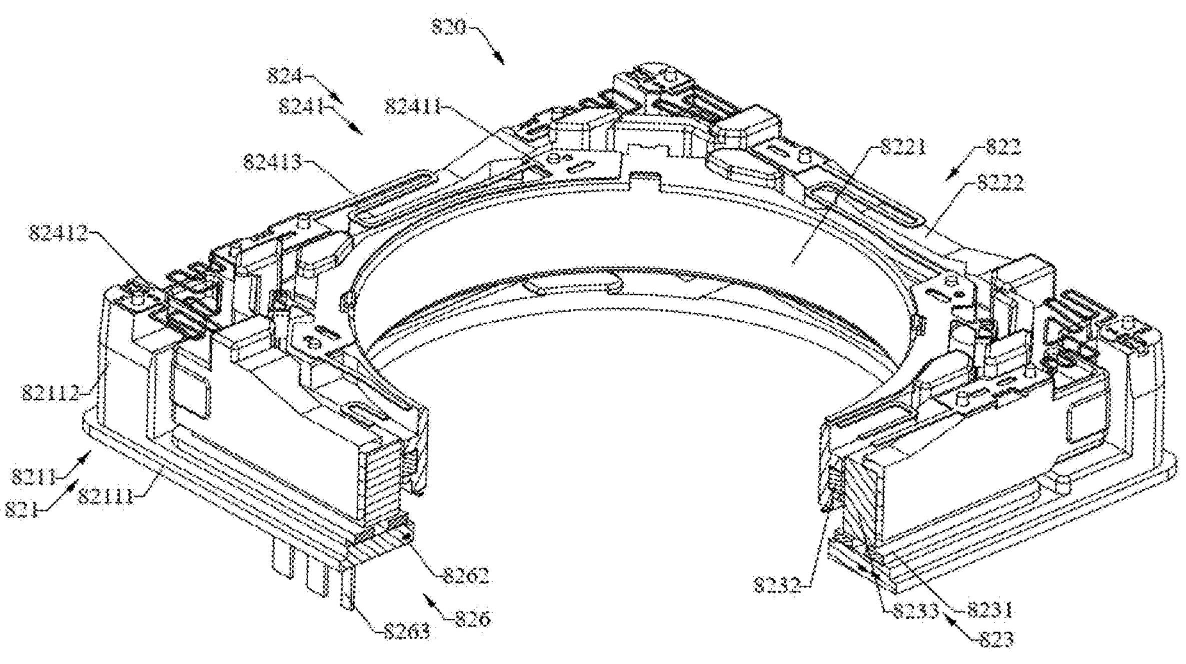
FIG. 22 illustrates a partial cross-sectional schematic view of the driving device according to an embodiment of the present application.

In the embodiment of the present application, the driving portion 823 may drive the inner carrier 8221 to move alone, or may drive the inner carrier 8221 and the outer carrier 8222 to move together. The driving portion 823 includes at least one magnet 8233, at least one first focusing coil 8231 and a second coil 8232, as shown in FIG. 22. In a specific example of the present application, the magnet 8233 is disposed on the outer carrier 8222, the first coil 8231 is disposed on the fixed portion 821 and corresponds to the magnet 8233, and the second coil 8232 is disposed on the inner carrier 8221 and corresponds to the magnet 8233.

The second coil 8232 is adapted to drive the inner carrier 8221 to move relative to the outer carrier 8222 along a direction set by the optical axis to perform optical focusing. Specifically, the magnet 8233 and the second coil 8232 correspond to each other in a first direction, and the second coil 8232 interacts with the magnet 8233 to generate an electromagnetic force for driving the inner carrier 8221 to move along the direction set by the optical axis to achieve the optical focusing function.

The first coil 8231 is adapted to drive the outer carrier 8222 to take along the inner carrier 8221 carrying the optical lens to move in a plane perpendicular to the optical axis to perform optical image-stabilizing. Specifically, As shown in FIGS. 19 and 170, the first coil 8231 is disposed on the base 8211 of the fixed portion 821, and the magnet 8233 and the first coil 8231 correspond to each other in a second direction, wherein the first direction is perpendicular to the second direction, the first coil 8231 interacts with the magnet 8233 to generate an electromagnetic force for driving the outer carrier 8222 to move in a plane perpendicular to the optical axis to achieve the optical image-stabilizing function.

It is worth mentioning that in the embodiment of the present application, the driving device mainly increases the placement space of the driving component by reasonably arranging the driving component of the driving portion 823 (for example, the first coil 8231) and the guide support structure 825 that plays a supporting and guiding function as described below, and can increase the driving force of the driving portion 823 without adding components, so as to simplify the design scheme for increasing the driving force of the driving portion 823 and avoid complicating the structure of the driving portion 823.

In the embodiment of the present application, the first coil 8231 extends on the fixed portion 821 along a direction set by a side of the fixed portion 821, and the extending direction of the guide support structure 825 on the fixed portion is consistent with the extending direction of the first coil 8231. This arrangement can provide a larger placement space for the first coil 8231, so that the first coil 8231 can be designed to be as large as possible, so as to generate a greater driving force during the interaction between the first coil 8231 and the magnet 8233.

In a specific example of the present application, the first coil 8231 is located on a side of the fixed portion 821. Specifically, the first coil 8231 is disposed on the base 8211, and the base 8211 has a first side 8202, a second side 8203, a third side 8204, and a fourth side 8205 that mutually enclose a rectangle, as shown in FIG. 170. The first side 8202 and the third side 8204 extend along the X-axis direction set by the X-axis, and the second side 8203 and the fourth side 8205 extend along the Y-axis direction set by the Y-axis.

The number of first coils 8231 is at least two, and the first coils 8231 and the magnets 8233 interact with each other to generate driving forces along the X-axis direction and the Y-axis direction, thereby driving the outer carrier 8222 to move along the X-axis direction and the Y-axis direction. In a specific example of the present application, the number of first coils 8231 is four, and the four first coils 8231 are disposed opposite to the four magnets 8233. The four first coils 8231 are disposed at the four sides of the base body 82111.

Correspondingly, at least one first coil 8231 includes four first coils 8231, and the four first coils 8231 are located at the first side 8202, the second side 8203, the third side 8204 and the fourth side 8205, respectively, and extend along the first side 8202, the second side 8203, the third side 8204 and the fourth side 8205, respectively.

The second coil 8232 is disposed on an outer side wall of the inner carrier 8221. The specific structure and formation manner of the second coil 8232 are not limited in the present application. In a specific example of the present application, the second coil 8232 is wound around the outer side wall of the inner carrier 8221 in multiple turns and multiple layers. In another specific example of the present application, the second coil 8232 is pre-processed into a hollow planar coil, and the second coil 8232 may be flatly attached to the outer side wall of the inner carrier 8221.

It is worth mentioning that in the embodiment of the present application, as shown in FIG. 174, the outer side wall of the inner carrier 8221 is provided with columnar protrusions 82221, and the columnar protrusions 82221 extend outward from the side wall of the inner carrier 8221. In a specific example of the present application, the number of the columnar protrusions 82221 is 82, and they are disposed on two opposite sides of the inner carrier 8221. End portions of the second coil 8232 may be wound around the columnar protrusions 82221, that is, one end (a starting end portion) of the second coil 8232 is wound around one of the columnar protrusions 82221, a body portion of the second coil 8232 is wound around the outer periphery of the inner carrier 8221, and the other end (an ending end portion) of the second coil 8232 is wound around another columnar protrusion 82221. In a specific example of the present application, the columnar protrusion 82221 is a T-shaped structure, that is, the top end (outer end) of the columnar protrusion 82221 is thicker than other positions to prevent the second coil 8232 from falling off during the winding process.

Specifically, the magnet 8233 and the second coil 8232 are disposed on the inner side wall of the outer carrier 8222 opposite to each other. In a specific example of the present application, the inner side wall of the outer carrier 8222 has openings facing the optical axis and the photosensitive assembly 810. A side of the magnet 8233 close to the optical axis and a side thereof close to the photosensitive assembly 810 are not blocked by the outer carrier 8222, so that the side of the magnet 8233 close to the optical axis can directly face the second coil 8232, and the side of the magnet 8233 close to the photosensitive assembly 810 can directly face the first coil 8231.

The number of magnets 8233 is at least three, that is, the number of magnets 8233 is greater than or equal to 83. At least one magnet 8233 among three magnets 8233 can interact with the second coil 8232 to generate a driving force along the Z-axis direction, and at least two magnets 8233 among the three magnets 8233 can interact with the first coil 8231 to generate driving forces along the X-axis direction and the Y-axis direction.

In a specific example of the present application, the number of magnets 8233 is four. The four magnets 8233 may be disposed at the four sides of the outer carrier 8222, or the four magnets 8233 may be disposed at the four corners of the outer carrier 8222. In this regard, it is not limited in the present application. In this specific example, a side of the magnet 8233 facing the second coil 8232 is an N pole, and a side away from the second coil 8232 is an S pole.

In the embodiment of the present application, in order to improve the stability of the movement of the driving device 820 during the optical image-stabilizing process, improving the imaging quality, the driving device 820 further includes a guide support structure 825 disposed between the fixed portion 821 and the movable portion 822. In a specific example of the present application, the optical image-stabilizing function is achieved by driving the outer carrier 8222 to move, and the guide support structure 825 is disposed between the outer carrier 8222 and the base body 82111, so that the guide support structure 825 can always guide and support the outer carrier 8222 during the movement of the outer carrier 8222 relative to the base 8211, enabling the outer carrier 8222 to move smoothly. In another specific example of the present application, the optical image-stabilizing function is achieved by driving the inner carrier 8221 to move, and the guide support structure 825 is disposed between the inner carrier 8221 and the base 8211. The present application does not impose any limitation on this.

The guide support structure 825 is disposed between the base 8211 and the outer carrier 8222 (or the inner carrier 8221), so that the base 8211 and the guide support structure 825, and the outer carrier 8222 (or the inner carrier 8221) and the guide support structure 825 always maintain frictional contact. When the first coil 8231 is energized, the first coil 8231 interacts with the magnet 8233 to drive the outer carrier 8222 (or the inner carrier 8221) to move along the X-axis direction and the Y-axis direction. During this process, the image-stabilizing elastic part 82412 is deformed. When the first coil 8231 stops being energized, the image-stabilizing elastic part 82412 returns/restores to its original state and drives the outer carrier 8222 to restore.

Specifically, the guide support structure 825 is implemented as a mechanism having a rail-ball structure, and the guide support structure 825 includes a rail disposed between the movable portion 822 and the fixed portion 821 and a ball disposed in the rail, as shown in FIGS. 18 and 25. Since the ball is disposed in the rail, the movement trajectory of the ball is limited in the rail, and the ball can move in the rail according to a preset movement mode, so as to provide a certain moving space for moving of the outer carrier 8222.

More specifically, the rail includes a lower rail and an upper rail, wherein the lower rail is disposed on the top surface of the base body 82111 of the base 8211, the upper rail is disposed on the bottom surface of the outer carrier 8222, and the position of the upper rail corresponds to the position of the lower rail. The ball is accommodated between the upper rail and the lower rail, and is allowed to move along the lower rail and the upper rail, so that the ball is movably maintained between the outer carrier 8222 and the base 8211, and is assembled between the outer carrier 8222 and the base 8211 in such a manner that the outer carrier 8222 is suspended in the base 8211.

In the embodiment of the present application, the guide support structure 825 includes a first guide support unit 8251, a second guide support unit 8252, a third guide support unit 8253 and a fourth guide support unit 8254 respectively corresponding to the four first coils. The first guide support unit 8251 includes a first lower rail 82511 recessedly formed on the first side 8202 of the base 8211, a first upper rail 82512 recessedly formed on the outer carrier and corresponding to the first lower rail 82511, and at least one first ball 82513 erected between the first upper rail 82512 and the first lower rail 82511. The second guide support unit 8252 includes a second lower rail 82521 recessedly formed on the second side 8203 of the base 8211, a second upper rail 82522 recessedly formed on the outer carrier and corresponding to the second lower rail 82521, and at least one second ball 82523 erected between the second upper rail 82522 and the second lower rail 82521. The third guide support unit 8253 includes a third lower rail 82531 recessedly formed on the third side 8204 of the base 8211, a third upper rail 82532 recessedly formed on the outer carrier and corresponding to the third lower rail 82531, and at least one third ball 82533 erected between the third upper rail 82532 and the third lower rail 82531. The fourth guide support unit 8254 includes a fourth lower rail 82541 recessedly formed on the fourth side 8205 of the base 8211, a fourth upper rail 82542 recessedly formed on the outer carrier and corresponding to the fourth lower rail 82541, and at least one fourth ball 82543 erected between the fourth upper rail 82542 and the fourth lower rail 82541.

It is worth mentioning that the guide support structure 825 of the driving device cooperates with the first coil 8231 of the driving portion 823. The reasonable arrangement of the driving components of the driving portion 823 can not only increase the driving force of the driving portion 823, but also avoid mutual interference between the components of the guide support structure 825 and other components.

Specifically, the first coil and the rail having the same length extending direction are disposed on the same side of the base 8211 along the direction. For example, the first coil having the length extending direction in the X-axis direction and the rail corresponding thereto are both disposed on the side of the base 8211 in the X-axis direction, and the first coil having the length extending direction in the Y-axis direction and the rail corresponding thereto are both disposed on the side of the base 8211 in the Y-axis direction. In this way, it is avoided that the rail extends inwards and then interferes with the second elastic assembly.

In the embodiment of the present application, the extending direction of the lower rail of each guide support unit of the guide support structure 825 is consistent with the extending direction of the corresponding first coil 8231. Correspondingly, the at least one first coil 8231 includes a first sub-coil, a second sub-coil, a third sub-coil and a fourth sub-coil, the extending direction of the first lower rail 82511 is consistent with the extending direction of the first sub-coil, the extending direction of the second lower rail 82521 is consistent with the extending direction of the second sub-coil, the extending direction of the third lower rail 82531 is consistent with the extending direction of the third sub-coil, and the extending direction of the fourth lower rail 82541 is consistent with an extending direction of the fourth sub-coil.

The length extending directions of the upper rail and lower rail of each guide support unit of the guide support structure 825 are perpendicular to each other, so as to form a "cross" shape. The length extending directions of the upper rail and the lower rail are perpendicular to each other, which can avoid mutual interference when the outer carrier 8222 moves along the X-axis direction and the Y-axis direction.

Correspondingly, the extending direction of the first upper rail 82512 is perpendicular to the extending direction of the first lower rail 82511, the extending direction of the second lower rail 82521 is perpendicular to the extending direction of the second upper rail 82522, the extending direction of the third lower rail 82531 is perpendicular to the extending direction of the third upper rail 82532, and the extending direction of the fourth lower rail 82541 is perpendicular to the extending direction of the fourth upper rail 82542.

The upper rail or the lower rail of each guide support unit of the guide support structure 825 has both a rail extending along the X-axis direction and a rail extending along the Y-axis direction. That is, in the lower rail located on the top surface of the base body 82111 of the base 8211, there are both a lower rail extending along the X-axis direction and a lower rail extending along the Y-axis direction. In the upper rail located on the bottom surface of the outer carrier 8222, there are both an upper rail extending along the X-axis direction and an upper rail extending along the Y-axis direction. Such an arrangement can prevent the ball from rotating during optical image-stabilizing, thereby affecting the driving effect. Further, the rails with different extending directions are located on the adjacent sides of the base 8211 to provide a larger installing positional space for the first coil 8231.

The first lower rail 82511, the second lower rail 82521, the third lower rail 82531 and the fourth lower rail 82541 are rotationally symmetric with respect to the optical axis. The first upper rail 82512, the second upper rail 82522, the third upper rail 82532 and the fourth upper rail 82542 are rotationally symmetric with respect to the optical axis.

In the embodiment of the present application, the driving device 820 further includes an electrical connection member 826, as shown in FIG. 18. The electrical connection member 826 is disposed on the base 8211 of the fixed portion 821 and is electrically connected to the elastic member 824, so as to provide working power to the second coil 8232 and the first coil 8231 through the electrical connection member 826 and the elastic member 824. As shown in FIGS. 171 and 172, the electrical connection member 826 includes an upper end portion 8261, a middle portion 8262 and a lower end portion 8263. The upper end portion 8261, the middle portion 8262 and the lower end portion 8263 are conducted to each other to achieve electrical connection with external power supply equipment through the electrical connection member 826, so as to supply power to the driving device 820.

Specifically, in the embodiment of the present application, the middle portion 8262 of the electrical connection member 826 is disposed in the base body 82111, the upper end portion 8261 of the electrical connection member 826 integrally extends upward from the base pillar(s) 82112 (as shown in FIGS. 171 and 172), and the lower end portion 8263 of the electrical connection member 826 extends downward from the base body 82111 (as shown in FIG. 173) to achieve electrical conduction with electronic components outside the driving device 820. The middle portion 8262 of the electrical connection member 826 includes a plurality of electrical connection elements, at least one of which integrally extends upward to the top end of the base pillar(s) 82112 to form the upper end portion 8261 of the electrical connection member 826, and at least one of which integrally extends downward out of the base body 82111 to form the lower end portion 8263 of the electrical connection member 826.

Correspondingly, in the embodiment of the present application, the focusing elastic part 82411 of the first elastic assembly 8241 further includes a conductive end, wherein the conductive end extends outward from the focusing elastic inner contour portion. In a specific example of the present application, the number of conductive ends is two, the positions of the conductive ends correspond to the columnar protrusions 82221 of the inner carrier 8221, and the conductive ends are electrically connected to the second coils 8232 wound on the columnar protrusions 82221 of the inner carrier 8221.

The number of upper end portions 8261 of the electrical connection member 826 is at least two, and the at least two upper end portions 8261 of the electrical connection member 826 are electrically connected to the image-stabilizing elastic outer contour portion, so that the electric energy provided by the external power supply equipment can pass through the lower end portion 8263, the middle portion 8262, the upper end portion 8261, the image-stabilizing elastic part 82412, and the focusing elastic part 82411 of the electrical connection member 826 in sequence to reach the second coil 8232, thereby driving the inner carrier 8221.

In a specific example of the present application, the number of upper end portions 8261 of the electrical connection member 826 is four, and they are disposed at the four base pillars 82112, respectively. In a specific example of the present application, among the four upper end portions 8261 of the electrical connection member 826, only the upper end portion 8261 that is electrically connected to the image-stabilizing elastic part 82412 and the focusing elastic part 82411 at the same time achieves circuit conduction. Of course, it will be appreciated that the four upper end portions 8261 of the electrical connection member 826 may all achieve circuit conduction, and the present application does not impose any limitation on this.

In a specific example of the present application, the first elastic assembly 8241 has a split structure, the second elastic assembly 8242 has an integrated structure, and the two electrical connection points of the second coil 8232 are electrically connected to the first elastic assembly 8241 to achieve electrical conduction of the second coil 8232. In another specific example of the present application, the first elastic assembly 8241 has a split structure, the second elastic assembly 8242 has a split structure, and the two electrical connection points of the second coil 8232 may achieve circuit conduction by being electrically connected to the first elastic assembly 8241, or may achieve electrical conduction of the second coil 8232 by being electrically connected to the second elastic assembly 8242. In still another specific example of the present application, the first elastic assembly 8241 has an integrated structure, the second elastic assembly 8242 has an integrated structure, and the two electrical connection points of the second coil 8232 cannot be electrically connected to the first elastic assembly 8241 at the same time. Therefore, the two electrical connection points of the second coil 8232 need to be electrically connected to the first elastic assembly 8241 and the second elastic assembly 8242, respectively, to achieve electrical conductivity of the second coil 8232.

The formation manner of the electrical connection member 826 is not limited in the present application. In a specific example of the present application, the electrical connection member 826 is integrally molded on the base 8211 by means of insert injection molding. That is, the middle portion 8262 of the electrical connection member 826 is integrally molded in the base body 82111, the upper end portion 8261 of the electrical connection member 826 is integrally molded on the respective base pillar 82112, and the lower end portion 8263 of the electrical connection member 826 extends downward from the base body 82111 out of the base 8211 and is exposed outside the base body 82111. In another specific example of the present application, the electrical connection member 826 is molded on the surface of the base 8211 by means of affixing and attaching.

In the embodiment of the present application, the driving device 820 further includes a magnetic conductive member 827, as shown in FIG. 172. The magnetic conductive member 827 is disposed opposite to the magnet 8233 along a preset direction (for example, a height direction). The formation manner of the magnetic conductive member 827 is not limited in the present application. In a specific example of the present application, the magnetic conductive member 827 is integrally formed on the base body 82111 of the base 8211 by an insert injection molding process. In another specific example of the present application, the magnetic conductive member 827 is fixed to the base body 82111 of the base 8211 by means of gluing, so that the magnetic conductive member 827 can be opposite to the magnet 8233.

The magnetic conductive member 827 and the electrical connection member 826 should avoid mutual interference, which may be achieved in a variety of manners. For example, the magnetic conductive member 827 may be disposed at the upper end or lower end of the middle portion 8262 of the electrical connection member 826 to avoid interference between the magnetic conductive member 827 and the electrical connection member 826. The magnetic conductive member 827 and the electrical connection member 826 may use different materials to avoid mutual interference. For example, the magnetic conductive member 827 is made of a magnetic conductive material so that the magnetic conductive member 827 can generate magnetic attraction with the magnet 8233, and the electrical connection member 826 is made of a non-magnetic conductive material that can achieve signal conduction, so as to achieve the independence between the magnetic conductive function and the electrical connection function of the driving device 820 and simplify assembly.

The magnetic conductive member 827 is disposed at the corner of the base 8211, so that one magnetic conductive member 827 can simultaneously correspond to two adjacent magnets 8233. Through the magnetic attraction force generated between the magnetic conductive member 827 and the magnets 8233, the guide support structure 825 can always be clamped between the base 8211 and the outer carrier 8222 (or the inner carrier 8221). During the optical image-stabilizing process, the guide support structure 825 can always maintain friction contact with the base 8211 and the outer carrier 8222 (or the inner carrier 8221). Furthermore, a magnetic attraction force is generated between the magnetic conductive member 827 and the magnet 8233 along the Z-axis direction to maintain the stability of the movement of the outer carrier 8222 (or the inner carrier 8221), maintain the centering effect of the outer carrier 8222 (or the inner carrier 8221), and effectively prevent the outer carrier 8222 (or the inner carrier 8221) from falling off due to the shaking or inversion of the camera module.

In the embodiment of the present application, the driving device 820 further includes a position sensing element 828, as shown in FIG. 170. The position sensing element 828 is disposed opposite to the magnet 8233, and the position sensing element 828 is disposed on the base 8211. When the outer carrier 8222 moves, the relative position of the position sensing element 828 and the magnet 8233 changes. According to the strength of the magnetic field of the magnet 8233 sensed by the position sensing element 828, the position of the outer carrier 8222 can be determined, and then the current of the first coil 8231 is adjusted so that the outer carrier 8222 moves to a required position. In the embodiment of the present application, the position sensing element 828 may be a Hall element, a driver integrated circuit (driver IC) or a tunnel magneto resistance (TMR).

The specific position of the position sensing element 828 is not limited in the present application. In a specific example of the present application, the top surface of the position sensing element 828 is not higher than the top surface of the first coil 8231. On the one hand, the height of the driving device 820 can be reduced, and on the other hand, the position sensing element 828 can be protected to prevent the position sensing element 828 from being hit during movement. In another specific example of the present application, the position sensing element 828 is disposed on the bottom surface of the base 8211, as shown in FIG. 173.

The position sensing element 828 is electrically connected to the electrical connection member 826, and the specific implementation for realizing the electrical connection between the position sensing element 828 and the electrical connection member 826 is not limited in the present application. In a specific example of the present application, the base body 82111 of the base 8211 is provided with an opening at the position of the position sensing element 828 as a placement position of the position sensing element 828, so that the position sensing element 828 can be directly connected to the electrical connection member 826 through the opening. Moreover, as the height of the placement position of the position sensing element 828 is reduced, the height of the placement position of the first coil 8231 can also be reduced accordingly. This arrangement not only simplifies the circuit conduction manner of the driving device 820, but also can further reduce the height of the driving device 820.

In summary, the camera module based on the embodiment of the present application is explained, wherein the driving device 820 mainly increases the placement space of the driving portion 823 by reasonably arranging the driving portion 823 and the guide support structure 825, and can increase the driving force of the driving portion 823 without adding components, so as to simplify the design scheme of increasing the driving force of the driving portion 823 and avoid complicating the structure of the driving portion 823.

Exemplary Method for Assembling Driving Device

As shown in FIG. 15, a method for assembling a driving device according to an embodiment of the present application is explained, and the method for assembling the driving device includes: S110, assembling a semi-finished driving device, wherein the semi-finished driving device includes a base 7211, an image-stabilizing coil 7231 disposed on the base 7211, an outer carrier 7222, an inner carrier 7221 mounted to the outer carrier 7222, a magnet 7233 disposed on the outer carrier 7222, a focusing coil 7232 disposed on the inner carrier 7221, and a second elastic assembly 7242 extending between a bottom surface of the inner carrier 7221 and a bottom surface of the outer carrier 7222, the inner carrier 7221 is adapted to mount an optical lens thereon, and the optical lens is provided with an optical axis; and S120, mounting a first elastic assembly on a top surface of the inner carrier 7221, a top surface of the outer carrier 7222 and a top surface of the base 7211, wherein the first elastic assembly 7241 includes a focusing elastic part 72411 extending between the top surface of the outer carrier 7222 and the top surface of the inner carrier 7221, and an image-stabilizing elastic part 72412 extending between the top surface of the outer carrier 7222 and the top surface of the base 7211, and the focusing elastic part 72411 and the image-stabilizing elastic part 72412 extend in a height plane perpendicular to the optical axis, and wherein the focusing elastic part 72411 is arranged in a rotationally symmetrical manner relative to the optical axis, and the image-stabilizing elastic part 72412 is arranged in an axially symmetrical manner relative to the optical axis.

It should be understood by those skilled in the art that the embodiments of the present application shown in the above description and the drawings are only used as examples and do not limit the present application. The objects of the present application have been fully and effectively achieved. The function and structural principles of the present application have been presented and described in the embodiments, and the implementations of the present application may be varied or modified without departing from the principles.

What is claimed is:

1. A driving device, comprising:

a fixed portion having an accommodating cavity;

an elastic member disposed in the accommodating cavity;

a movable portion movably suspended in the accommodating cavity through the elastic member, wherein the movable portion is adapted to mount an optical lens therein, and the optical lens is provided with an optical axis; and a driving portion for driving the movable portion to move relative to the fixed portion;

wherein the elastic member comprises a first elastic assembly extending between the fixed portion and the movable portion, the first elastic assembly comprises a focusing elastic part and an image-stabilizing elastic part, and the focusing elastic part and the image-stabilizing elastic part extend in a plane perpendicular to the optical axis; and wherein the focusing elastic part is arranged in a rotationally symmetrical manner relative to the optical axis, and the image-stabilizing elastic part is arranged in an axially symmetrical manner relative to the optical axis;

wherein the movable portion comprises an outer carrier and an inner carrier movably mounted to the outer carrier, and the inner carrier is adapted to mount the optical lens therein, wherein the focusing elastic part extends between the inner carrier and the outer carrier and the image-stabilizing elastic part extends between the outer carrier and the fixed portion; and wherein the driving portion is adapted to drive the inner carrier to move relative to the outer carrier along a direction set by the optical axis to perform optical focusing, and the driving portion is adapted to drive the outer carrier to take along the inner carrier carrying the optical lens to move in a plane perpendicular to the optical axis to perform optical image-stabilizing.

2. The driving device according to claim 1, wherein the first elastic assembly further comprises an elastic connecting portion connecting the focusing elastic part and the image-stabilizing elastic part.

3. The driving device according to claim 1, wherein the fixed portion comprises an upper cover and a base which are engaged with each other to form the accommodating cavity, and wherein the image-stabilizing elastic part extends between the outer carrier and the base.

4. The driving device according to claim 3, wherein at least a part of the focusing elastic part and the image-stabilizing elastic part are connected to each other.

5. The driving device according to claim 4, wherein the focusing elastic part comprises a first focusing elastic unit and a second focusing elastic unit, and the first focusing elastic unit and the second focusing elastic unit are rotationally symmetric with respect to the optical axis; and wherein the first focusing elastic unit comprises a first focusing elastic inner contour portion fixed to the inner carrier, a first focusing elastic outer contour portion fixed to the outer carrier, and a first focusing elastic deformation portion extending between the first focusing elastic inner contour portion and the first focusing elastic outer contour portion, and the second focusing elastic unit comprises a second focusing elastic inner contour portion fixed to the inner carrier, a second focusing elastic outer contour portion fixed to the outer carrier, and a second focusing elastic deformation portion extending between the second focusing elastic inner contour portion and the second focusing elastic outer contour portion.

6. The driving device according to claim 5, wherein the first focusing elastic deformation portion and/or the second focusing elastic deformation portion comprises a plurality of bending sections extending along an X-axis direction set by an X-axis or a Y-axis direction set by a Y-axis.

7. The driving device according to claim 6, wherein the image-stabilizing elastic part comprises a first image-stabilizing elastic unit and a fourth image-stabilizing elastic unit which are symmetrically distributed with respect to the X-axis, and a second image-stabilizing elastic unit and a third image-stabilizing elastic unit which are symmetrically distributed with respect to the X-axis; and wherein the first image-stabilizing elastic unit and the second image-stabilizing elastic unit are symmetrically distributed with respect to the Y-axis, the third image-stabilizing elastic unit and the fourth image-stabilizing elastic unit are symmetrically distributed with respect to the Y-axis, the first image-stabilizing elastic unit is connected to the first focusing elastic unit, and the third image-stabilizing elastic unit is connected to the second focusing elastic unit.

8. The driving device according to claim 7, wherein the first image-stabilizing elastic unit, the second image-stabilizing elastic unit, the third image-stabilizing elastic unit and the fourth image-stabilizing elastic unit are located at four corners of the driving device.

9. The driving device according to claim 7, wherein the first image-stabilizing elastic unit comprises a first image-stabilizing elastic inner contour portion fixed to the outer carrier, a first image-stabilizing elastic outer contour portion fixed to the base, and a first image-stabilizing elastic deformation portion integrally connecting the first image-stabilizing elastic inner contour portion and the first image-stabilizing elastic outer contour portion; the second image-stabilizing elastic unit comprises a second image-stabilizing elastic inner contour portion fixed to the outer carrier, a second image-stabilizing elastic outer contour portion fixed to the base, and a second image-stabilizing elastic deformation portion integrally connecting the second image-stabilizing elastic inner contour portion and the second image-stabilizing elastic outer contour portion; the third image-stabilizing elastic unit comprises a third image-stabilizing elastic inner contour portion fixed to the outer carrier, a third image-stabilizing elastic outer contour portion fixed to the base, and a third image-stabilizing elastic deformation portion integrally connecting the third image-stabilizing elastic inner contour portion and the third image-stabilizing elastic outer contour portion; and the fourth image-stabilizing elastic unit comprises a fourth image-stabilizing elastic inner contour portion fixed to the outer carrier, a fourth image-stabilizing elastic outer contour portion fixed to the base, and a fourth image-stabilizing elastic deformation portion integrally connecting the fourth image-stabilizing elastic inner contour portion and the fourth image-stabilizing elastic outer contour portion.

10. The driving device according to claim 1, wherein the elastic member further comprises a second elastic assembly extending between the inner carrier and the outer carrier, and the first elastic assembly and the second elastic assembly are oppositely disposed on two opposite sides of the movable portion.

11. The driving device according to claim 1, wherein the driving portion comprises a magnet disposed on the outer carrier, a focusing coil disposed on the inner carrier and corresponding to the magnet, and an image-stabilizing coil disposed on the fixed portion and corresponding to the magnet.

12. The driving device according to claim 11, wherein the magnet and the focusing coil correspond to each other in a first direction, and the magnet and the image-stabilizing coil correspond to each other in a second direction, wherein the first direction is perpendicular to the second direction.

13. A camera module, comprising:

an optical lens; and a photosensitive assembly; and the driving device of claim 1, wherein the optical lens is mounted in the driving device and maintained on an optical path of the photosensitive assembly.

14. A driving device comprising:

a fixed portion having an accommodating cavity;

an elastic member disposed in the accommodating cavity;

movable portion movably suspended in the accommodating cavity through the elastic member, wherein the movable portion is adapted to mount an optical lens therein, and the optical lens is provided with an optical axis; and a driving portion for driving the movable portion to move relative to the fixed portion;

wherein the elastic member comprises a first elastic assembly extending between the fixed portion and the movable portion, the first elastic assembly comprises a focusing elastic part and an image-stabilizing elastic part, and the focusing elastic part and the image-stabilizing elastic part extend in a plane perpendicular to the optical axis; and wherein the focusing elastic part is arranged in a rotationally symmetrical manner relative to the optical axis, and the image-stabilizing elastic part is arranged in an axially symmetrical manner relative to the optical axis;

wherein the elastic member further comprises a second elastic assembly extending between the inner carrier and the outer carrier, and the first elastic assembly and the second elastic assembly are oppositely disposed on two opposite sides of the movable portion;

wherein the second elastic assembly comprises a second elastic inner contour portion fixed to the inner carrier, a second elastic outer contour portion fixed to the outer carrier, and a second elastic deformation portion extending between the second elastic inner contour portion and the second elastic outer contour portion.

15. A driving device, comprising:

a fixed portion having an accommodating cavity;

an elastic member disposed in the accommodating cavity;

a movable portion movably suspended in the accommodating cavity through the elastic member, wherein the movable portion is adapted to mount an optical lens therein, and the optical lens is provided with an optical axis; and a driving portion for driving the movable portion to move relative to the fixed portion;

a guide support structure formed between the movable portion and the fixed portion;

wherein the driving portion comprises at least one magnet disposed on the movable portion and at least one first coil disposed on the fixed portion and corresponding to the at least one magnet, and wherein the at least one first coil extends on the fixed portion along a direction set by a side of the fixed portion, and an extending direction of the guide support structure on the fixed portion is consistent with an extending direction of the at least one first coil;

wherein the at least one first coil is located on a side of the fixed portion; and wherein the fixed portion comprises an upper cover and a base which are engaged with each other to form the accommodating cavity, the movable portion comprises an outer carrier and an inner carrier which is movably mounted to the outer carrier, and the inner carrier is adapted to mount the optical lens therein, wherein the at least one first coil is disposed on the base, and the at least one magnet is disposed on the outer carrier, and wherein the at least one first coil and the at least one magnet of the driving portion are adapted to drive the outer carrier to take along the inner carrier carrying the optical lens to move in a plane perpendicular to the optical axis to perform optical image-stabilizing.

16. The driving device according to claim 15, wherein the driving portion further comprises a second coil disposed on the inner carrier and corresponding to the magnet, and the at least one magnet and the second coil of the driving portion are adapted to drive the inner carrier to move relative to the outer carrier along a direction set by the optical axis to perform optical focusing.

* * * * *